United States Patent
Ito

(10) Patent No.: US 7,630,031 B2
(45) Date of Patent: Dec. 8, 2009

(54) OPTICAL COMPENSATION FILM, POLARIZING PLATE AND LIQUID CRYSTAL DISPLAY

(75) Inventor: Yoji Ito, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 173 days.

(21) Appl. No.: 11/990,230

(22) PCT Filed: Aug. 16, 2006

(86) PCT No.: PCT/JP2006/316441

§ 371 (c)(1),
(2), (4) Date: Feb. 8, 2008

(87) PCT Pub. No.: WO2007/021028

PCT Pub. Date: Feb. 22, 2007

(65) Prior Publication Data

US 2009/0122234 A1     May 14, 2009

(30) Foreign Application Priority Data

Aug. 16, 2005   (JP) .................... 2005-235804

(51) Int. Cl.
  *G02F 1/1335* (2006.01)
  *C09K 19/00* (2006.01)
  *G02B 1/06* (2006.01)
(52) U.S. Cl. .................... 349/96; 359/500; 428/1.3
(58) Field of Classification Search .............. None
  See application file for complete search history.

(56) References Cited

U.S. PATENT DOCUMENTS

2004/0124557 A1 *   7/2004   Yamada ................... 264/239

FOREIGN PATENT DOCUMENTS

| EP | 0 911 656 A2 | 4/1999 |
|---|---|---|
| JP | 2587398 B2 | 2/1996 |
| JP | 9-211444 | 8/1997 |
| JP | 11-316378 A | 11/1999 |
| JP | 2002-71957 | 3/2002 |
| JP | 2002-139621 A | 5/2002 |
| JP | 2002-169023 A | 6/2002 |
| JP | 2004-54257 A | 2/2004 |
| JP | 2005-37904 A | 2/2005 |
| JP | 2005-99191 A | 4/2005 |
| JP | 2005-115341 A | 4/2005 |

OTHER PUBLICATIONS

PCT/ISA/210.
PCT/ISA/237.

* cited by examiner

*Primary Examiner*—Tina M Wong
(74) *Attorney, Agent, or Firm*—Buchanan Ingersoll & Rooney PC

(57) ABSTRACT

An optical compensation film is provided and includes a cellulose acylate film and an optically anisotropic layer containing a liquid crystalline compound. The cellulose acylate film satisfies specific conditions in relation to substitution degrees of hydroxyl groups in glucose units constituting cellulose of the cellulose acylate film, and has a thickness of 40 to 85 μm.

8 Claims, No Drawings

OPTICAL COMPENSATION FILM, POLARIZING PLATE AND LIQUID CRYSTAL DISPLAY

TECHNICAL FIELD

The present invention relates to an optical compensation film, and a polarizing plate and a liquid crystal display each using the optical compensation film.

BACKGROUND ART

Liquid crystal displays are widely used in personal computers, mobile equipment monitors and televisions since they have various advantages, e.g., in their low voltage and low consumption power and high possibility for reduction in size and profile. Although a variety of modes depending on how liquid crystalline molecules are aligned in a liquid crystal cell have been proposed for such liquid crystal displays, the dominating mode has hitherto been a TN mode in which liquid crystalline molecules are in an aligned state that their orientations twist by about 90° toward an upper side substrate from a lower side substrate.

In general a liquid crystal display is made up of a liquid crystal cell, an optical compensation film and a polarizer. The optical compensation film is used for dissolution of coloring of images and expansion of a viewing angle, and a stretched birefringent film or a transparent film coated with a liquid crystal is employed as the optical compensation film. For instance, Japanese Patent No. 2587398 discloses the art of expanding a viewing angle by applying to a TN-mode liquid crystal cell the optical compensation film formed by coating a discotic liquid crystal on a triacetyl cellulose film, forcing the liquid crystal into an aligned state and fixing the aligned state. However, liquid crystal displays for television use, which are supposed to be equipped with big screens and to be viewed from various angles, have stringent demands on viewing angle dependence, so even the foregoing art cannot satisfy such demands. Under these circumstances, liquid crystal displays employing modes different from the TN mode, such as an IPS (In-Plane Switching) mode, an OCB (Optically Compensatory Bend) mode and a VA (Vertically Aligned) mode, have been studied. Since the OCB mode in particular offers a high response speed and has a high suitability for moving images, attention is being given to this mode as an operation mode of liquid crystal displays for TV use.

Cellulose acylate films have a feature that they are high in optical isotropy (low in retardation value), compared with other polymer films. Accordingly, it is a general rule that cellulose acetate film is used for applications requiring optical isotropy, such as for polarizing plates.

By contrast, optical anisotropy (high retardation value) is required of optical compensation films (retardation films) used in liquid crystal displays. The optical compensation films for OCB-mode in particular are required to have an in-plane retardation (Re) of 20 nm to 100 nm and a thickness-direction retardation (Rth) of 70 nm to 400 nm.

Hitherto, it has been a general rule in the technical field of optical materials that synthetic polymer films are used in the case of requiring for polymer films to have optical anisotropy (high retardation values Re and Rth), whereas cellulose acetate film is used in the case of requiring for polymer films to have optical isotropy (low retardation values).

EP-A-911656 discloses the cellulose acetate film having high retardation values which, though against the rule hitherto regarded as general, is also usable for applications requiring optical anisotropy. In EP-A-911656, a compound having at least two aromatic rings, notably a compound having a 1,3,5-triazine ring, is added and stretch processing is performed in order to achieve high retardation values in the case of using cellulose acetate.

Although it is generally known that cellulose acetate is a polymer material hard to stretch and its birefringence factor is difficult to increase, the patent document cited makes it possible to increase the birefringence factor through simultaneous alignment of the additive molecules by stretch processing and achieves high retardation values. Such a film can also serve as protective film of a polarizing plate, so it has an advantage in its suitability for offering thin liquid crystal displays at low prices.

JP-A-2002-71957 discloses the optical film which contains a cellulose ester having acyl groups having 2-4 carbon atoms as substituents and satisfying both the relations $2.0 \leq A+B \leq 3.0$ and $A<2.4$ when the degree of acetyl-group substitution is taken as A and the degree of propionyl- or butyryl-group substitution is taken as B, and further satisfying the relation $0.0005 \leq Nx-Ny \leq 0.0050$ when the refractive index in the direction of a slow axis and the refractive index in the direction of a fast axis at the wavelength of 590 nm are taken as Nx and Ny, respectively.

JP-A-9-211444 and JP-A-11-316378 achieve wide viewing angles in the polarizing plates used for OCB-mode liquid crystal displays by application of optical compensation films having layers made from liquid crystalline compounds.

The methods disclosed in the documents cited above are effective in allowing low-profile liquid crystal displays to be produced at low prices. In recent years, however, there has been a growth in the use of liquid crystal displays under a wide variety of circumstances, and it has become a problem that the cellulose ester films utilizing the foregoing arts changed their optical compensation performance under those circumstances. More specifically, the problem is in that those cellulose ester films are affected by changes of circumstances, notably humidity, especially when each film is stacked on a liquid crystal cell, and they change their Re and Rth retardation values to result in changes of their optical compensation capabilities. Therefore, it has been requested to solve such a problem.

With the upsizing of liquid crystal displays, on the other hand, there has been a growing need for improvements in light leakage occurring from the periphery of the display screen by change in circumstances, which has become a big problem in addition to the circumstances-causing changes in optical properties. Descriptions about such light leakage can be found in JP-A-2002-139621 and JP-A-2002-169023.

DISCLOSURE OF THE INVENTION

An object of an illustrative, non-limiting embodiment of the invention is to provide an optical compensation film using a cellulose acylate film that can show excellent in-plane retardation and thickness-direction retardation characteristics and is reduced in retardation changes depending on ambient humidity and light leakage from the periphery of a display screen, and further to provide a polarizing plate using such an optical compensation film.

Another object of an illustrative, non-limiting embodiment of the invention is to provide a liquid crystal display reduced in changes of viewing angle characteristics.

These objects can be attained by the following embodiments of the invention.

(1) An optical compensation film comprising:
a cellulose acylate film having a thickness of 40 to 85 μm, the cellulose acylate film comprises cellulose having a glucose unit, wherein a hydroxyl group of the glucose unit is substituted with an acyl group having at least two carbon atoms, and the cellulose acylate film satisfies relations (I) and (II):

$$2.0 \leq DS2+DS3+DS6 \leq 3.0 \quad \text{(I)}$$

$$DS6/(DS2+DS3+DS6) \geq 0.315 \quad \text{(II)}$$

wherein DS2 stands for a substitution degree of the hydroxyl group at 2-position of the glucose unit with the acyl group, DS3 stands for t a substitution degree of the hydroxyl group at 3-position of the glucose unit with the acyl group, and DS6 stands for a substitution degree of the hydroxyl group at 6-position of the glucose unit with the acyl group; and an optically anisotropic layer comprising a liquid crystalline compound (2) The optical compensation film as described in (1), wherein the cellulose acylate film has an Re retardation value and an Rth retardation value satisfying relations (V) and (VI), respectively:

$$20 \text{ nm} \leq Re(550) \leq 50 \text{ nm} \quad \text{(V)}$$

$$160 \text{ nm} \leq Rth(550) \leq 250 \text{ nm} \quad \text{(VI)}$$

wherein $Re(\lambda)$ is an in-plane retardation value expressed in the unit nm at a wavelength of $\lambda$ nm, and $Rth(\lambda)$ is a thickness-direction retardation value expressed in the unit nm at a wavelength of $\lambda$ nm.

(3) The optical compensation film as described in (1) or (2), wherein the cellulose acylate film comprising a retardation developer, the retardation developer being at least one of a rod-shaped compound and a discotic compound.

(4) The optical compensation film as described in any one of (1) to (3), wherein the cellulose acylate film has a ΔRe (Re10% RH-Re80% RH) of 12 nm or below and a ΔRth (Rth10% RH-Rth80% RH) of 32 nm or below, wherein the ΔRe(Re10% RH-Re80% RH) represents a difference between Re(550) values of the cellulose acylate film under 25° C.-10% RH and 25° C.-80% RH, the ΔRth(Rth10% RH-Rth80% RH) represents a difference between Rth (550) values of the cellulose acylate film under 25° C.-10% RH and 25° C.-80% RH conditions, $Re(\lambda)$ is an in-plane retardation value expressed in the unit nm at a wavelength of $\lambda$ nm, and $Rth(\lambda)$ is a thickness-direction retardation value expressed in the unit nm at a wavelength of $\lambda$ nm.

(5) The optical compensation film as described in any one of (1) to (4), wherein the liquid crystalline compound is a discotic liquid crystalline compound.

(6) A polarizing plate comprising: a polarizer; and an optical compensation film as described in any one of (1) to (5).

(7) A liquid crystal display comprising: a liquid crystal cell; and at least one of an optical compensation film as described in any one of (1) to (5) and a polarizing plate as described in (6).

(8) The liquid crystal display as described in (7), which is of an OCB mode.

In the invention, the followings are also exemplary embodiments.

(9) The optical compensation film as described in any one of (1) to (5), wherein the acyl group in the cellulose acylate film is an acetyl group.

(10) The optical compensation film as described in any one of (1) to (5), wherein the cellulose acylate film further comprises at least one additive selected from the group consisting of a plasticizer, an ultraviolet absorbent and a parting accelerator.

(11) The optical compensation film as described in (10), wherein the cellulose acylate film has the additive in an amount of 10 to 30% by mass (weight) of the cellulose acylate film.

(12) The optical compensation film as described in any of (1) to (5), wherein the cellulose acylate film has an equilibrium moisture content of 3.4% or below at a temperature of 25° C. and a humidity of 80% RH.

(13) The optical compensation film as described in any of (1) to (5), wherein a moisture permeability of the cellulose acylate film under conditions of 60° C., 95% RH and 24 hours is from 400 g/m²·24 hr to 2,300 g/m²·24 hr (calculated in terms of film thickness of 80 μm).

(14) The optical compensation film as described in any of (1) to (5), wherein the cellulose acylate film has a mass change (weight change) of 0 to 5% when allowed to stand for 48 hours under conditions of 80° C. and 90% RH.

(15) The optical compensation film as described in any of (1) to (5), wherein a dimensional change caused in the cellulose acylate film by 24-hour standing under conditions of 60° C. and 95% RH and a dimensional change caused in the cellulose acylate film by 24-hour standing under conditions of 90° C. and 5% RH are both in a range of 0% to 5%.

(16) The optical compensation film as described in any of (1) to (5), wherein the cellulose acylate film has a glass transition temperature Tg of 80° C. to 180° C.

(17) The optical compensation film as described in any of (1) to (5), wherein the cellulose acylate film has an elasticity modulus of 1,500 MPa to 5,000 MPa.

(18) The optical compensation film as described in any of (1) to (5), wherein the cellulose acylate film has a photoelasticity coefficient of $50 \times 10^{-13}$ dyne/cm² ($5 \times 10^{-3}$ N/m²) or below.

(19) The optical compensation film as described in any of (1) to (5), wherein the cellulose acylate film has a haze of 0.01% to 2%.

(20) The optical compensation film as described in any of (1) to (5), wherein the cellulose acylate film contains fine particles of silicon dioxide ranging from 0.2 μm to 1.5 μm in average diameter of secondary particles.

(21) The optical compensation film as described in any of (1) to (16), wherein the liquid crystalline compound is a discotic liquid crystalline compound.

(22) The polarizing plate as described in (6), which satisfies at least one of expressions (a) to (d)

$$40.0 \leq TT \leq 45.0 \quad \text{(a)}$$

$$30.0 \leq PT \leq 40.0 \quad \text{(b)}$$

$$CT \leq 2.0 \quad \text{(c)}$$

$$95.0 \leq P \quad \text{(d)}$$

wherein TT, PT, CT and P represents a single plate transmittance, parallel transmittance, cross transmittance and polarization degree of the polarizing plate, respectively, when measured under conditions of 25° C. and 60% RH

(23) The polarizing plate as described in (6), which satisfies at least one of expressions (e), (f) and (g):

$$CT_{(380)} \leq 2.0 \quad \text{(e)}$$

$$CT_{(410)} \leq 1.0 \quad \text{(f)}$$

$$CT_{(700)} \leq 0.5 \quad \text{(g)}$$

wherein $CT_{(\lambda)}$ represents a cross transmittances of the polarizing plate, measured at a wavelength $\lambda$ nm.

(24) The polarizing plate as described in (6), which satisfies at least one of expressions (j) and (k):

$$-6.0 \leqq \Delta CT \leqq 6.0 \quad \text{(j)}$$

$$-10.0 \leqq \Delta P \leqq 0.0 \quad \text{(k)}$$

wherein ΔCT represents an amount of change in a cross transmittance of the polarizing plate when the polarizing plate is allowed to stand for 500 hours under conditions of 60° C. and 95% RH, ΔP represents an amount of change in a polarization degree f the polarizing plate when the polarizing plate is allowed to stand for 500 hours under conditions of 60° C. and 95% RH, and each amount of change is defined as a value obtained by subtracting a measurement value before testing from a measurement value after testing.

(25) The polarizing plate as described in (6), which has at least one layer of a hard coating layer, an antiglare layer and an antireflective layer on a surface of a protective film to be positioned opposite to a liquid crystal cell.

(26) The polarizing plate as described in (6), which is packaged in a moisture-proof bag having an inside humidity adjusted to a range of 43% RH to 65% RH at 25° C.

(27) the polarizing plate as described in (6), which is packaged in a moisture-proof bag having an inside humidity adjusted so as to differ by 15% RH or below from the ambient humidity at which the polarizing plate is stacked on a liquid crystal panel.

In accordance with an aspect of the invention, it is possible to provide an optical compensation film which uses a cellulose acylate film showing excellent in-plane and thickness-direction retardation characteristics and is reduced in retardation changes resulting from ambient humidity and in light leakage from the periphery of a screen, and further to provide a polarizing plate using such an optical compensation film.

Further, the invention can provide a liquid crystal display reduced in change of viewing angle characteristics.

DETAILED DESCRIPTION OF THE INVENTION

Exemplary embodiments of the invention is described below in detail.

(Cellulose Acylate)

In the first place, cellulose acylate suitable for use in the invention is described in detail. The glucose units constituting cellulose and linking with each other via β-1,4-bonding have free hydroxyl groups at their individual 2-, 3- and 6-positions. The cellulose acylate is a polymer prepared by esterifying part or all of those hydroxyl groups with acyl groups containing at least two carbon atoms. The degree of acyl substitution refers to the proportion of esterification with an acyl group at each of the 2-, 3- and 6-positions (when the proportion of esterification is 100%, the degree of substitution is 1).

In the cellulose acylate used in the invention, the total degree of acyl substitution, or DS2+DS3+DS6, is from 2.00 to 3.00, preferably from 2.22 to 2.90, far preferably from 2.40 to 2.82. In addition, DS6/(DS2+DS3+DS6) is 0.315 or above, preferably 0.322 or above, far preferably from 0.324 to 0.340. Herein, DS2 stands for the substitution degree on the 2-position hydroxyl groups of glucose units (hereinafter referred to as "2-position acyl substitution degree", too), DS3 stands for the substitution degree on the 3-position hydroxyl groups of glucose units (hereinafter referred to as "3-position acyl substitution degree", too), and DS6 stands for the substitution degree on the 6-position hydroxyl groups of glucose units (hereinafter referred to as "6-position acyl substitution degree", too).

Acyl groups used in the cellulose acylate according to the invention may be acyl groups of one kind alone, or made up of two or more kinds of acyl groups. When two or more kinds of acyl groups are used, one kind of them are preferably acetyl groups. When the total degree of substitution of acetyl groups for 2-position, 3-position and 6-position hydroxyl groups is denoted as DSA and the total degree of substitution of acyl groups other than acetyl groups for 2-position, 3-position and 6-position hydroxyl groups is denoted as DSB, the value of DSA+DSB is preferably from 2.2 to 2.86, particularly preferably from 2.40 to 2.80. In addition, the value of DSB is 1.50 or above, particularly preferably 1.7 or above. Further, at least 28% of the DSB value is the substitution degree on 6-position hydroxyl groups. Furthermore, the proportion of the substitution degree on 6-position hydroxyl groups in the DSB value is preferably 30% or above, far preferably 31% or above, particularly preferably 32% or above. Alternatively, it is possible to use a cellulose acylate film having at the 6-positions a DSA+DSB value of 0.75 or above, preferably 0.80 or above, particularly preferably 0.85 or above. These cellulose acylate films make it possible to prepare good solutions having favorable solubility, especially when chlorine-free organic solvents are used. In addition, solutions low in viscosity and high in filtration efficiency can be prepared by use of those films.

The acyl groups in cellulose acylate according to the invention, which have at least two carbon atoms per group, may be aliphatic or aromatic groups, and have no particular restrictions. The cellulose acylate may be an alkylcarbonyl or alkenylcarbonyl ester of cellulose, or an arylcarbonyl ester or aryl- and alkylcarbonyl ester of cellulose, which each may further have substituents. Suitable examples of such acyl groups include acetyl, propionyl, butanoyl, heptanoyl, hexanoyl, octanoyl decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl and cinnamoyl. Of these groups, acetyl, propionyl, butanoyl, dodecanoyl, octadecanoyl, t-butanoyl, oleoyl, benzoyl, naphthylcarbonyl and cinnamoyl are preferred over the others, and acetyl, propionyl and butanoyl in particular are favored.

(Synthesis Method of Cellulose Acylate)

The basic principles of cellulose acylate synthesis methods are described in Migita et al., *Mokuzai Kagaku* (Wood Chemistry), pages 180-190, Kyoritsu Shuppan Co., Ltd. (1968). A typical synthesis method is the liquid-phase acetylation method using a carboxylic anhydride, acetic acid and a sulfuric acid catalyst. More specifically, a cellulose raw material, such as cotton linters or wood pulp, is pretreated with an appropriate amount of acetic acid, and then esterified by its being charged into a precooled carboxylation mixture. Thus, fully acylated cellulose (the sum of acyl substitution degrees on the 2-, 3- and 6-position hydroxyl groups is close to 3.00) is synthesized. In general the carboxylation mixture contains acetic acid as a solvent, carboxylic anhydride as an esterification agent and sulfuric acid as a catalyst. The carboxylic anhydride is generally used in an amount stoichiometrically in excess of the sum of the amount of cellulose to react therewith and the water content in the reaction system. After the conclusion of the acylation reaction, an aqueous solution of neutralizing agent (e.g., a carbonate, acetate or oxide of calcium, magnesium, iron, aluminum or zinc) is added in order to hydrolyze excessive carboxylic anhydride remaining in the reaction system and neutralize part of the esterification catalyst. In the next place, the fully acylated cellulose is kept at a temperature of 50° C. to 90° C. in the present of a small amount of acetylation reaction catalyst (generally a sulfuric acid residue), thereby undergoing saponification ripening and being converted into a cellulose acylate having the intended acyl substitution degree aid polymerization degree. At the time when the intended cellulose acylate is produced, the catalyst remaining in the reaction system is completely neutralized with the neutralizing agent as recited above, or the cellulose acylate solution is poured into water or dilute sulfuric acid without undergoing neutralization (or water or dilute sulfuric acid is charged in the cellulose acylate solution); as a result, the cellulose acylate is isolated by flocculation. The cellulose acylate isolated is subjected to rinsing and stabilizing treatment. Thus, the intended cellulose acylate is obtained.

It is preferable that the film-forming polymer component of the present cellulose acylate film is in a substantial sense the cellulose acylate according to the definitions mentioned above. The expression "in a substantial sense" as used herein implies that the cellulose acylate defined above constitutes 55% by mass (weight) or more of the polymer component (preferably 70% by mass or more, far preferably 80% by mass or more, of the polymer component). As a starting material for film formation, cellulose acylate particles are suitably used. It is preferable that 90% by mass or more of the particles used are particles having their sizes in the 0.5- to 5-mm range. In addition, it is preferable that 50% by mass or more of the particles used are particles having their sizes in the 1- to 4-mm range.

The polymerization degree of cellulose acylate used advantageously in the invention is from 200 to 700, preferably from 250 to 550, far preferably from 250 to 400, especially preferably from 264 to 380, expressed in terms of viscosity-average polymerization degree. The average polymerization degree can be determined by a limit viscosity method by Uda et al. (Kazuo Uda and Hideo Saito, *Seni Gakkai-Shi* (Bulletin of The Society of Fiber Science and Technology, Japan), vol. 18, No. 1, pp. 105-120 (1962)). This method is also described in detail in JP-A-9-95538.

Removal of low-molecular components is beneficial because the resultant cellulose acylate can have lower viscosity than usual one although an increase in average molecular weight (polymerization degree) is caused. The cellulose acylate reduced in low-molecular components can be obtained by removing low-molecular components from cellulose acylate synthesized in a usual way. The removal of low-molecular components can be achieved by rinsing a cellulose acylate with an appropriate organic solvent. In the case of producing a cellulose acylate reduced in low-molecular components, it is preferable that the amount of sulfuric acid catalyst in acetylation reaction is controlled to the range of 0.5 to 25 parts by mass per 100 parts by mass of cellulose. The control of the amount of sulfuric acid catalyst to the foregoing range permits synthesis of cellulose acylate having an advantage in molecular-weight distribution (uniform in molecular-weight distribution) also. The water content in a cellulose acylate used in a production of a cellulose acylate film of the invention is preferably 2% by mass or below, far preferably 1% by mass or below, especially preferably 0.7%-by mass or below. Cellulose acylates are generally known to have their water contents in the range of 2.5% to 5% by mass. For adjustment of the water content in a cellulose acylate used in the invention to the preferred range, a drying operation is required. The drying operation has no particular restriction as to its method so long as the intended water content is attained.

Raw cotton materials and synthesis methods for those cellulose acylates according to the invention are described in detail in *JIII Journal of Technical Disclosure* No. 2001-1745, pages 7 to 12, Japan Institute of Invention and Innovation (Mar. 15, 2001).

(Additives)

To a cellulose acylate solution relating to the invention, a wide variety of additives (e.g., a plasticizer, a ultraviolet absorber, a deterioration inhibitor, a retardation (optical anisotropy) modifier, fine particles, a parting accelerator, an infrared absorber) can be added according to their uses in various steps in preparation process. Such additives may be solid matter or oily matter. In other words, they have no particular restrictions as to their melting or boiling points. For instance, ultraviolet absorbing materials having melting points higher and lower than 20° C., respectively, may be mixed, and plasticizers may be mixed as in the case of the ultraviolet absorbing materials. These cases are described, e.g., in JP-A-2001-151901. Examples of a parting accelerator include ethyl esters of citric acid. In addition, descriptions of infrared absorbing dyes can be found, e.g., in JP-A-2001-194522. Although addition timing of additives may be set at any stages in the process of dope preparation, the process for addition of additives may be appended to the end of dope preparation process. Further, each additive has no particular limitations as to its addition amount so far as its function develops. When the cellulose acylate film formed has a multilayer structure, the kinds and the amounts of additives added may be different from one layer to another. Examples of such a case are described, e.g., in JP-A-2001-151902. These are the arts hitherto known. By selecting the kinds and addition amounts of these additives, it is preferable that the glass transition temperature Tg of the cellulose acylate film is adjusted to a range of 80° C. to 180° C. and the elasticity modulus measured with a tensile tester is adjusted to a range of 1,500 MPa to 3,000 MPa.

As to details of those additives, materials described in detail in *JIII Journal of Technical Disclosure* No. 2001-1745, pages 16 and afterward, Japan Institute of Invention and Innovation (Mar. 15, 2001) can be used to advantage.

(Plasticizer)

The present film can contain a plasticizer. Compounds usable as the plasticizer have no particular restrictions, but they are preferably more hydrophobic than cellulose acylate and used alone or as combinations, with examples including phosphoric acid esters, such as triphenyl phosphate, tricresyl phosphate, cresyldiphenyl phosphate, octyldiphenyl phosphate, diphenylbiphenyl phosphate, trioctyl phosphate and tributyl phosphate; phthalic acid esters, such as diethyl phthalate, dimethoxyethyl phthalate, dimethyl phthalate, dioctyl phthalate, dibutyl phthalate and di-2-ethylhexyl phthalate; and glycolic acid esters, such as triacetin, tributyrin, butylphthalylbutyl glycolate, ethylphthalylethyl glycolate, methylphthalylethyl glycolate and butylphthalylbutyl glycolate. These plasticizers may be used alone or as combinations of two or more thereof, if needed.

(Retardation Developer)

In order to make the retardation values develop in the invention, a compound having at least two aromatic rings can be preferably used as a retardation developer. The amount of a retardation developer used is preferably from 0.05 to 20 parts by mass, far preferably from 0.1 to 10 parts by mass, further preferably from 0.2 to 5 parts by mass, particularly preferably from 0.5 to 2 parts by mass, per 100 parts by mass of polymer. Two or more of retardation developers may be used in combination.

It is favorable that the retardation developer used has its maximum absorption in a wavelength region of 250 nm to 400 nm and substantially no absorption in the visible region.

The term "aromatic rings" as used in the present specification is intended to include not only aromatic hydrocarbon rings but also aromatic heterocyclic rings.

It is especially preferable that the aromatic hydrocarbon rings are 6-membered rings (namely benzene rings).

The aromatic heterocyclic rings are generally unsaturated heterocyclic rings. They are preferably 5-, 6- or 7-membered rings, far preferably 5- or 6-membered rings. The aromatic heterocyclic rings each generally have the greatest possible number of double bonds. The hetero-atoms containable therein are preferably nitrogen, oxygen and sulfur atoms, notably nitrogen atom. Examples of an aromatic heterocyclic ring include a furan ring, a thiophene ring, a pyrrole ring, an oxazole ring, an isooxazole ring, a thiazole ring, an isothiazole ring, an imidazole ring, a pyrazole ring, a furazane ring, a trizole ring, a pyran ring, a pyridine ring, a pyridazine ring, a pyrimidine ring, a pyrazine ring and a 1,3,5-triazine ring.

Suitable examples of the aromatic ring include a benzene ring, a furan ring, a thiophene ring, a pyrrole ring, an oxazole ring, a thiazole ring, an imidazole ring, a triazole ring, a pyridine ring, a pyrimidine ring, a pyrazine ring and a 1,3,5-triazine ring. Of these rings, a 1,3,5-triazine ring in particular is used to advantage. More specifically, the compounds disclosed in JP-A-2001-166144 are used to advantage.

The number of carbon atoms in each of the aromatic rings the retardation developer has is preferably from 2 to 20, far preferably from 2 to 12, further preferably from 2 to 8, particularly preferably from 2 to 6.

The bonding relation between two aromatic rings can fall into (a) a case where the rings form a fused ring, (b) a case where the rings are directly bound by a single bond, or (c) a case where the rings are bonded via a linkage group (wherein it is impossible to form a spiro-bonding because the two rings are aromatic ones). The bonding relation herein may be any of (a) to (c).

Examples of a fused ring (formed from two or more aromatic rings) in the case (a) include an indene ring, a naphthalene ring, an azulene ring, a fluorene ring, a phenanthrene ring, an anthracene ring, an acenaphthylene ring, a biphenylene ring, a naphthacene ring, a pyrene ring, an indole ring, an isoindole ring, a benzofuran ring, a benzothiophene ring, an indolizine ring, a benzoxazole ring, a benzothiazole ring, a benzoimidazole ring, a benzotriazole ring, a purine ring, an indazole ring, a chromene ring, a quinoline ring, an isoquinoline ring, a quinolizine ring, a quinazoline ring, a cinnoline ring, a quinoxaline ring, a phthalazine ring, a pteridine ring, a carbazole ring, acridine ring, a phenanthridine ring, a xanthene ring, a phenazine ring, a phenothiazine ring, a phenoxthine ring, a phenoxazine ring and a thianthrene ring. Of these rings, a naphthalene ring, an azulene ring, an indole ring, a benzoxazole ring, a benzothiazole ring, a benzoimidazole ring, a benzotriazole ring and a quinoline ring are preferred over the others.

The single bond in the case (b) is preferably a carbon-carbon bond between two aromatic rings. The two aromatic rings may be bound by two or more single bonds to form an aliphatic ring or a non-aromatic heterocyclic ring between them.

It is preferable that the linkage group in the case (c) is also attached to carbon atoms of two aromatic rings. The linkage group is preferably an alkylene group, an alkenylene group, an alkynylene group, —CO—, —O—, —NH—, —S— or a combination of two or more thereof. Examples of a linkage group formed by combining any two or more of the above-recited ones are shown below. Additionally, each of the linkage groups recited below may be reversed left to right.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- The aromatic rings and the linkage groups may have substituents.

Examples of such substituents include halogen atoms (F, Cl, Br, I), a hydroxyl group, a carboxyl group, a cyano group, an amino group, a nitro group, a sulfo group, a carbamoyl group, a sulfamoyl group, a ureido group, an alkyl group, an alkenyl group, an alkynyl group, an aliphatic acyl group, an aliphatic acyloxy group, an alkoxy group, an alkoxycarbonyl group, an alkoxycarbonylamino group, an alkylthio group, all alkylsulfonyl group, an aliphatic amido group, an aliphatic sulfonamido group, an aliphatic substituted amino group, an aliphatic substituted carbamoyl group, an aliphatic substituted sulfamoyl group, an aliphatic substituted ureido group and non-aromatic heterocyclic group.

The number of carbon atoms in the alkyl group is preferably from 1 to 8. Linear alkyl groups are preferable to cycloalkyl groups, and straight-chain alkyl groups are especially preferred. These alkyl groups may further have substituents (such as hydroxyl, carboxyl, alkoxy and alkyl-substituted amino groups). Examples of such alkyl groups (including substituted alkyl groups) include methyl, ethyl, n-butyl, n-hexyl, 2-hydroxyethyl, 4-carboxybutyl, 2-methoxyethyl and 2-diethylaminoethyl groups.

The number of carbon atoms in the alkenyl group is preferably from 2 to 8. Linear alkenyl groups are preferable to cyclic alkenyl groups, and straight-chain alkenyl groups are especially preferred. These alkenyl groups may further have substituents. Examples of such alkenyl groups include vinyl, allyl and 1-hexenyl groups.

The number of carbon atoms in the alkynyl group is preferably from 2 to 8. Linear alkynyl groups are preferable to cyclic alkynyl groups, and straight-chain alkynyl groups are especially preferred. These alkynyl groups may further have substituents. Examples of such alkynyl groups include ethynyl, 1-butynyl and 1-hexynyl groups.

The number of carbon atoms in the aliphatic acyl group is preferably from 1 to 10. Examples of such an aliphatic acyl group include acetyl, propanoyl and butanoyl groups.

The number of carbon atoms in the aliphatic acyloxy group is preferably from 1 to 10. Examples of such an aliphatic acyloxy group include an acetoxy group.

The number of carbon atoms in the alkoxy group is preferably from 1 to 8. Such an alkoxy group may further have a substituent (such as an alkoxy group). Examples of the alkoxy group (including a substituted alkoxy group) include methoxy, ethoxy, butoxy and methoxyethoxy groups.

The number of carbon atoms in the alkoxycarbonyl group is preferably from 2 to 10. Examples of such an alkoxycarbonyl group include methoxycarbonyl and ethoxycarbonyl groups.

The number of carbon atoms in the alkoxycarbonylamino group is preferably from 2 to 10. Examples of such an alkoxycarbonylamino group include methoxycarbonylamino and ethoxycarbonylamino groups.

The number of carbon atoms in the alkylthio group is preferably from 1 to 12. Examples of such an alkylthio group include methylthio, ethylthio and octylthio groups.

The number of carbon atoms in the alkylsulfonyl group is preferably from 1 to 8. Examples of such an alkylsulfonyl group include methanesulfonyl and ethanesulfonyl groups.

The number of carbon atoms in the aliphatic amido group is preferably from 1 to 10. Examples of such an amido group include an acetamido group.

The number of carbon atoms in the aliphatic sulfonamido group is preferably from 1 to 8. Examples of such an aliphatic sulfonamido group include methanesulfonamido, butanesulfonamido and n-octanesulfonamido groups.

The number of carbon atoms in the aliphatic substituted amino group is preferably from 1 to 10. Examples of such an aliphatic substituted amino group include dimethylamino, diethylamino and 2-carboxyethylamino groups.

The number of carbon atoms in the aliphatic substituted carbamoyl group is preferably from 2 to 10. Examples of such an aliphatic substituted carbamoyl group include methylcarbamoyl and diethylcarbamoyl groups.

The number of carbon atoms in the aliphatic substituted sulfamoyl group is preferably from 1 to 8. Examples of such an aliphatic substituted sulfamoyl group include methylsulfamoyl and diethylsulfamoyl groups.

The number of carbon atoms in the aliphatic substituted ureido group is preferably from 2 to 10. Examples of such an aliphatic substituted ureido group include a methylureido group.

Examples of the non-aromatic heterocyclic group include piperidino and morpholino groups.

The molecular weight of retardation developer is preferably from 300 to 800.

In the invention, as a retardation developer, at least one of rod-shaped compounds and discotic compounds is preferably used. Further, a rod-shaped compound having a linear molecular structure as well as a compound having a 1,3,5-triazine ring can be used to advantage. The term "linear molecular structure" means that the molecular structure of a rod-shaped compound in thermodynamically most stable conformation is linear. The thermodynamically most stable conformation can be determined by crystal structure analysis or molecular orbital calculation. For instance, the molecular orbital calculations can be made using a software program for molecular orbital calculations (e.g., WinMOPAC2000, produced by Fujitsu) and thereby the molecular structure capable of minimizing the heat for forming the intended compound can be determined. The expression "the molecular structure is linear" means that the main chain of molecular structure in the thermodynamically most stable conformation forms an angle of 140 degrees or above.

As a rod-shaped compound having at least two aromatic rings, those represented by the following formula (1) are suitable.

$$Ar^1\text{-}L^1\text{-}Ar^2 \qquad \text{Formula (1)}$$

In the above formula (1), $Ar^1$ and $Ar^2$ each represent an aromatic group independently.

The term "aromatic group" as used herein is intended to include aryl groups (aromatic hydrocarbon groups), substituted aryl groups, aromatic heterocyclic groups and substituted aromatic heterocyclic groups.

Aryl groups and substituted aryl groups are preferable to aromatic heterocyclic groups and substituted aromatic heterocyclic groups. The heterocyclic rings of aromatic heterocyclic groups are generally unsaturated rings, and they are preferably 5-, 6- or 7-membered rings, far preferably 5- or 6-membered rings. The aromatic heterocyclic rings each generally have the greatest possible number of double bonds. The hetero-atom containable therein is preferably a nitrogen, oxygen or sulfur atom, far preferably a nitrogen or sulfur atom.

Examples of the aromatic ring in an aromatic group include a benzene ring, a furan ring, a thiophene ring, a pyrrole ring, an oxazole ring, a thiazole ring, an imidazole ring, a trizole ring, a pyridine ring, a pyrimidine ring and a pyrazine ring. Of these rings, a benzene ring is preferred over the others.

Examples of substituents present in the substituted aryl group and the substituted aromatic heterocyclic group include halogen atoms (F, Cl, Br, I), a hydroxyl group, a carboxyl group, a cyano group, an amino group, alkylamino groups (e.g., methylamino, ethylamino, butylamino, dimethylamino), a nitro group, a sulfo group, a carbamoyl group, alkylcarbamoyl groups (e.g., N-methylcarbamoyl, N-ethylcarbamoyl, N,N-dimethylcarbamoyl), a sulfamoyl group, alkylsulfamoyl groups (e.g., N-methylsulfamoyl, N-ethylsulfamoyl, N,N-dimethylsulfamoyl), an ureido group, alkylureido groups (e.g., N-methylureido, N,N-dimethylureido, N,N,N'-trimethylureido), alkyl groups (e.g., methyl, ethyl, propyl, butyl, pentyl, heptyl, octyl, isopropyl, s-butyl, t-amyl, cyclohexyl, cyclopentyl), alkenyl groups (e.g., vinyl, allyl, hexenyl), alkynyl groups (e.g., ethynyl, butynyl), acyl groups (e.g., formyl, acetyl, butyryl, hexanoyl, lauryl), acyloxy groups (e.g., acetoxy, butryloxy, hexanoyloxy, lauryloxy), alkoxy groups (e.g., methoxy, ethoxy, propoxy, butoxy, pentyloxy, heptyloxy, octyloxy), aryloxy groups (e.g., phenoxy), alkoxycarbonyl groups (e.g., methoxycarbonyl; ethoxycarbonyl, propoxycarbonyl, butoxycarbonyl, pentyloxycarbonyl, heptyloxycarbonyl), aryloxycarbonyl groups (e.g., phenoxycarbonyl), alkoxycarbonylamino groups (e.g., butoxycarbonylamino, hexyloxycarbonylamino), alkylthio groups (e.g., methylthio, ethylthio, propylthio, butylthio, pentylthio, heptylthio, octylthio), arylthio groups (e.g., phenylthio), alkylsulfonyl groups (e.g., methylsulfonyl, ethylsulfonyl, propylsulfonyl, butylsulfonyl, pentylsulfonyl, heptylsulfonyl, octylsulfonyl), amido groups (e.g., acetamido, butylamido, hexylamido, laurylamido), and non-aromatic heterocyclic groups (e.g., morpholino, pyrazinyl).

Of these substituents, halogen atoms, a cyano group, a carboxyl group, a hydroxyl group, an amino group, alkylamino groups, acyl groups, acyloxy groups, amido groups, alkoxycarbonyl groups, alkoxy groups, alkylthio groups and alkyl groups are preferred over the others.

The alkyl moieties of alkylamino, alkoxycarbonyl, alkoxy and alkylthio groups and the alkyl groups may further have substituents. Examples of substituents the alkyl moieties and alkyl groups may have include halogen atoms, a hydroxyl group, a carboxyl group, a cyano group, an amino group, alkylamino groups, a nitro group, a sulfo group, a carbamoyl group, alkylcarbamoyl groups, a sulfamoyl group, alkylsulfamoyl groups, a ureido group, alkylureido groups, alkenyl groups, alkynyl groups, acyl groups, acyloxy groups, alkoxy groups, aryloxy groups, alkoxycarbonyl groups, aryloxycarbonyl groups, alkoxycarbonylamino groups, alkylthio groups, arylthio groups, alkylsulfonyl groups, amido groups and non-aromatic heterocyclic groups. Of these substituents, halogen atoms, a hydroxyl group, an amino group, alkylamino groups, acyl groups, acyloxy groups, acylamino groups, alkoxycarbonyl groups and alkoxy groups are preferred over the others.

In formula (1), $L^1$ is a divalent linkage group selected from alkylene groups, alkenylene groups, alkynylene groups, —O—, —CO— or combinations of two or more of those groups. The alkylene groups may have cyclic structures. As cycloalkylene groups, cyclohexylene groups, especially 1,4-cyclohexylene, are suitable. As to open-chain alkylene groups, straight-chain alkylene groups are preferable to branched-chain alkylene groups.

The number of carbon atoms in such an alkylene group is preferably from 1 to 20, far preferably from 1 to 15, further preferably from 1 to 10, furthermore preferably from 1 to 8, especially preferably from 1 to 6.

The alkenylene and alkynylene groups having open-chain structures are preferable to those having cyclic structures, and further the alkenylene and alkynylene groups having straight-chain structures are preferable to those having branched-chain structures. It is appropriate that the number of carbon atoms in such an alkenylene group and that in such an alkynylene group be each from 2 to 10, preferably from 2 to 8, far preferably from 2 to 6, further preferably from 2 to 4, especially preferably 2 (vinylene and ethynylene).

The number of carbon atoms in such an arylene group is preferably from 6 to 20, far preferably from 6 to 16, further preferably from 6 to 12.

The angle that $Ar^1$ forms with $Ar^2$ in a state that they face each other across $L^1$ is preferably at least 140 degrees.

As the rod-shaped compound, compounds represented by the following formula (2) are more suitable.

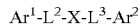

Formula (2)

In the above formula (2), $Ar^1$ and $Ar^2$ are aromatic groups independently. The definition and examples of the aromatic groups as $Ar^1$ and $Ar^2$ are the same as those in formula (1).

In formula (2), $L^2$ and $L^3$ each represent a divalent linkage group selected from an alkylene group, —O—, —CO— or a combination of two or more thereof.

As to the alkylene group, an alkylene group having an open-chain structure is preferable to an alkylene group having a cyclic structure, and further a straight-chain alkylene group is preferable to a branched-chain alkylene group.

The number of carbon atoms in such an alkylene group is preferably from 1 to 10, far preferably from 1 to 8, further preferably from 1 to 6, and especially preferably from 1 to 4. However, the best number is 1 or 2 (corresponding to methylene or ethylene).

As $L^2$ and $L^3$ each, —O—CO— or —CO—O— is most suitable.

In formula (2), X is a 1,4-cyclohexylene, vinylene or ethynylene group.

Examples of a compound represented by formula (1) are illustrated below.

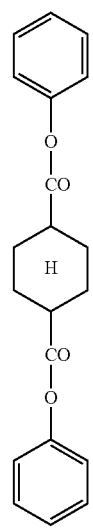

(1)

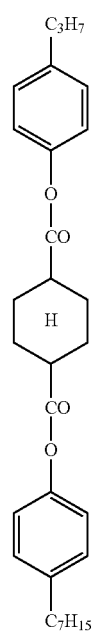

(2)

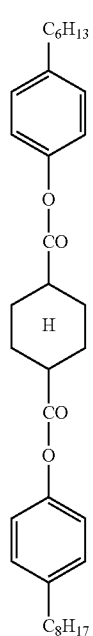
(3)
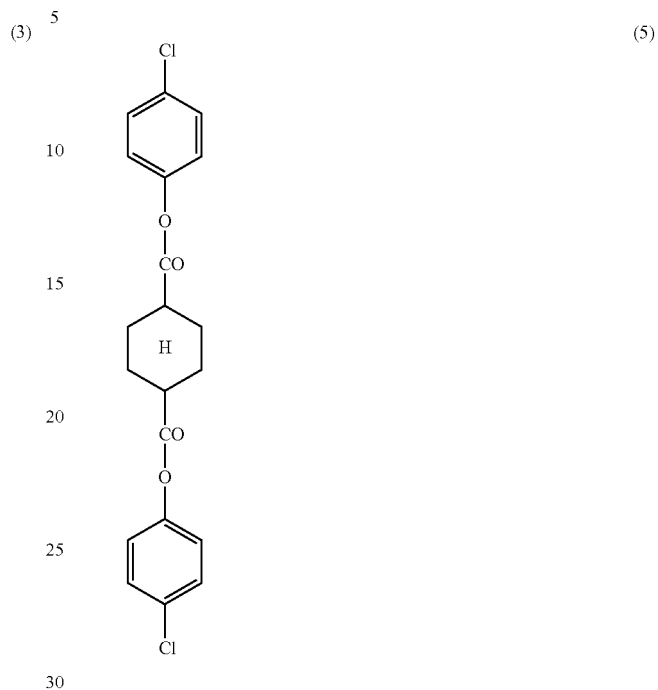
(5)
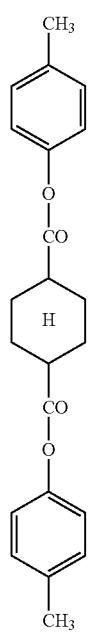
(4)
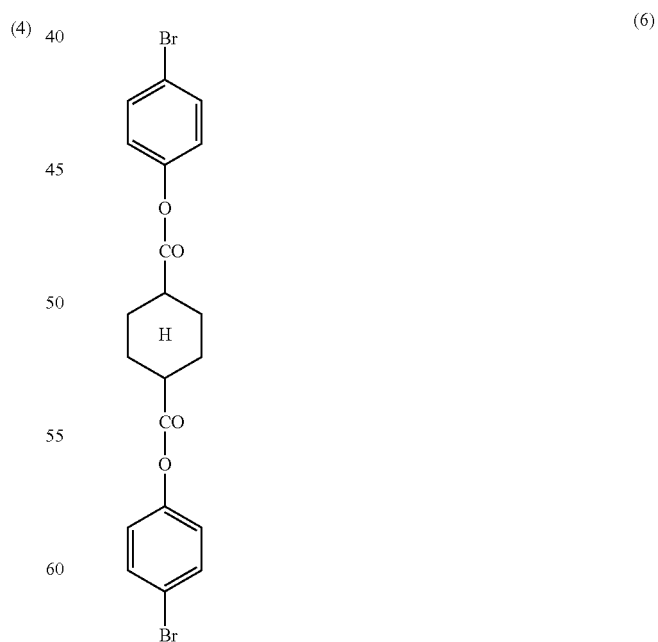
(6)

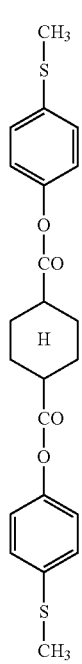
(7)
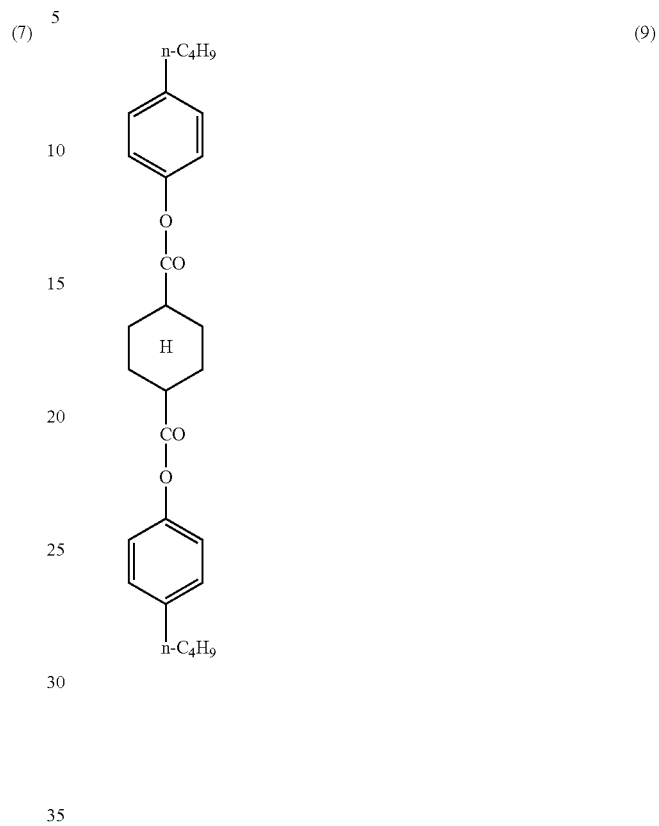
(9)
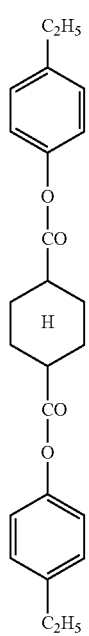
(8)
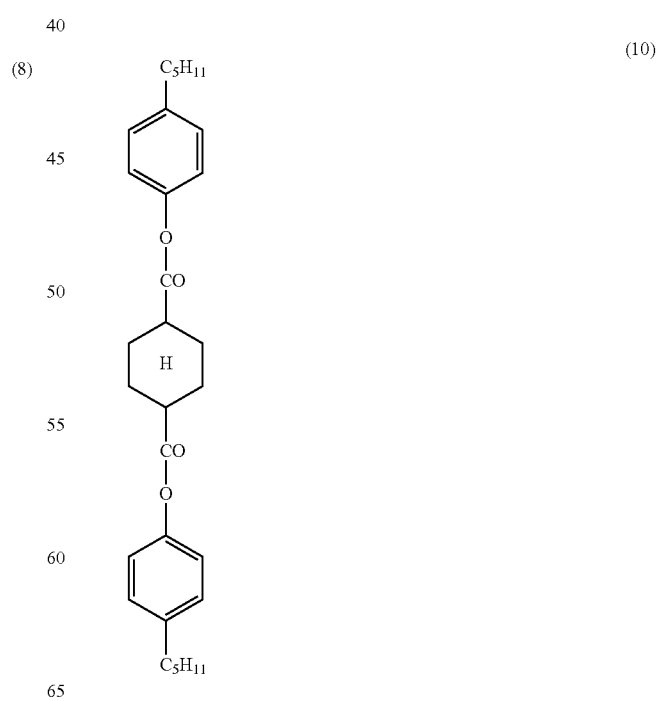
(10)

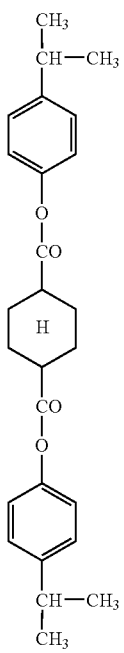
(11)
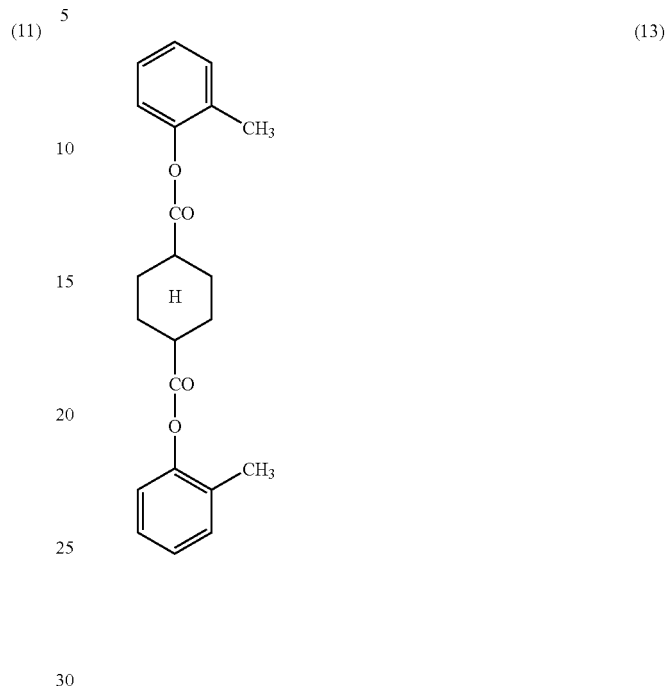
(13)
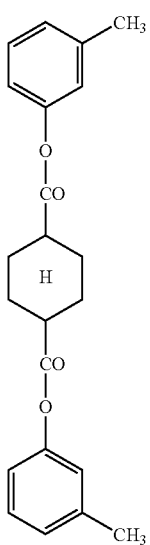
(12)
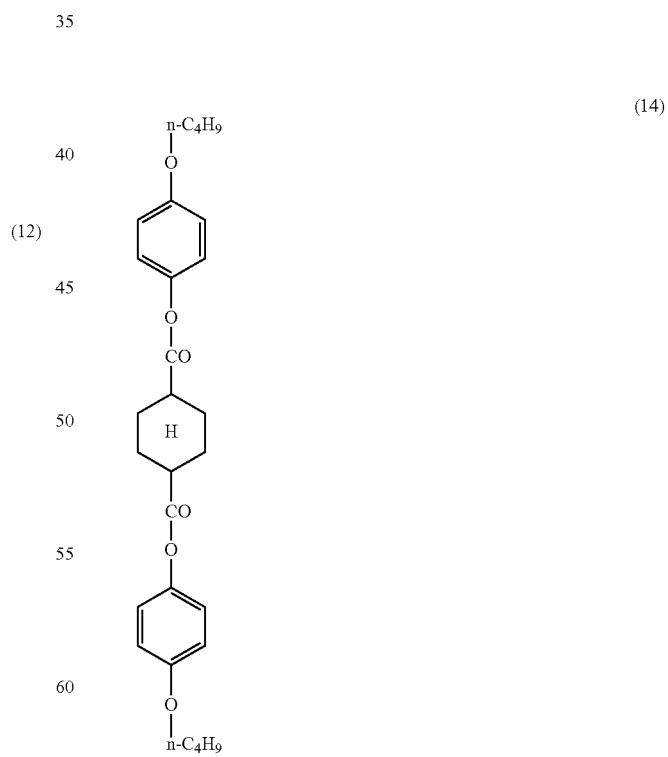
(14)

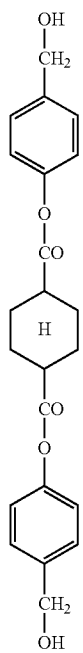
(15)
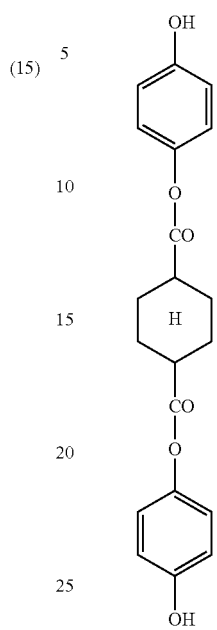
(17)
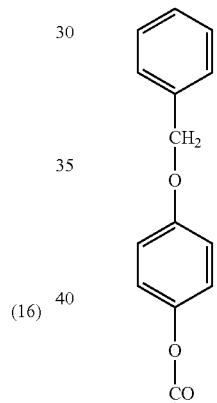
(16)
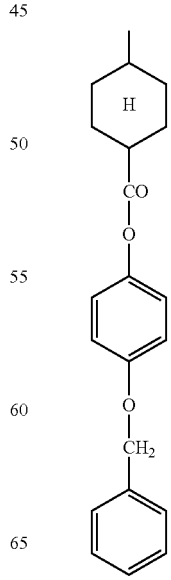
(18)

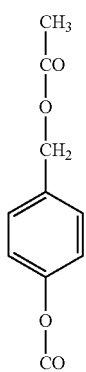
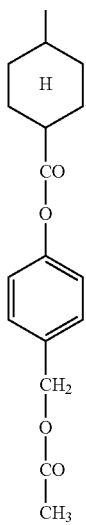
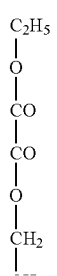
(19) 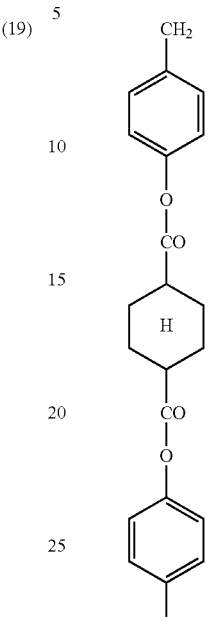
(20) 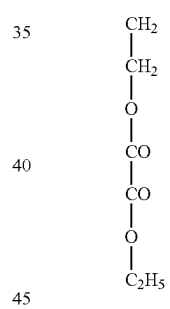
(21) 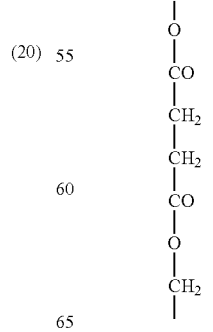

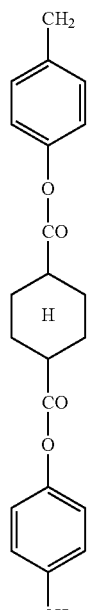
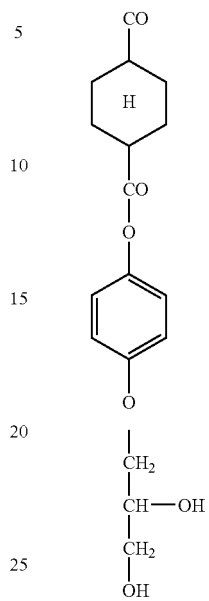
(23)
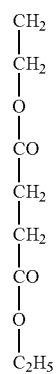
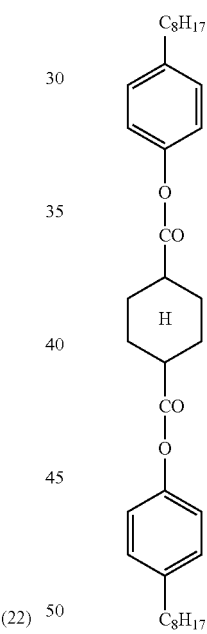
(22)
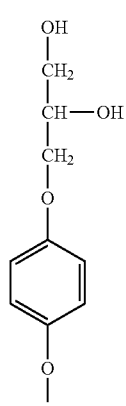
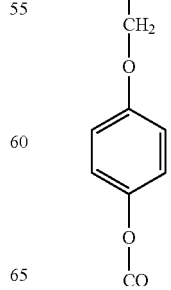
(24)

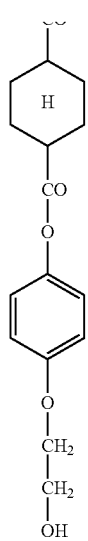
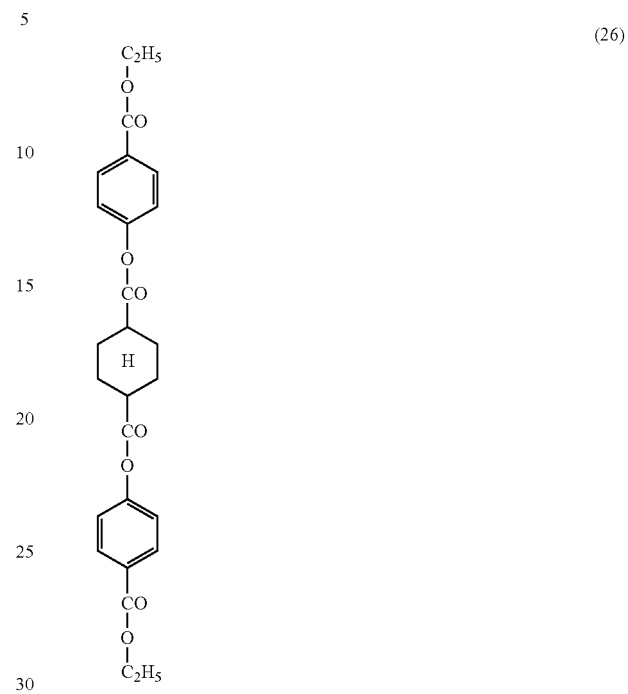
(26)
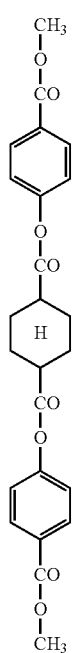
(25)
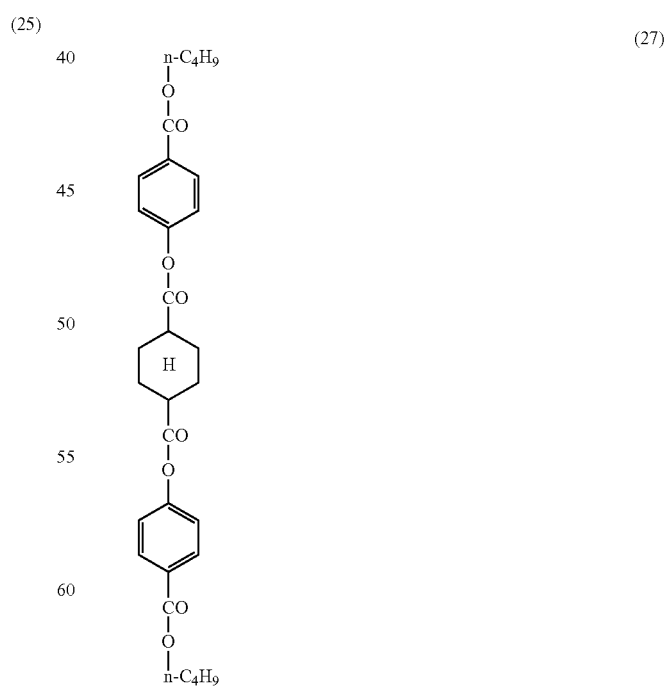
(27)

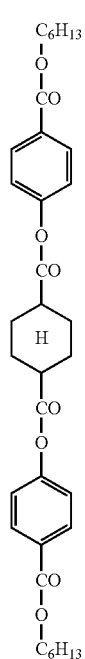
(28)
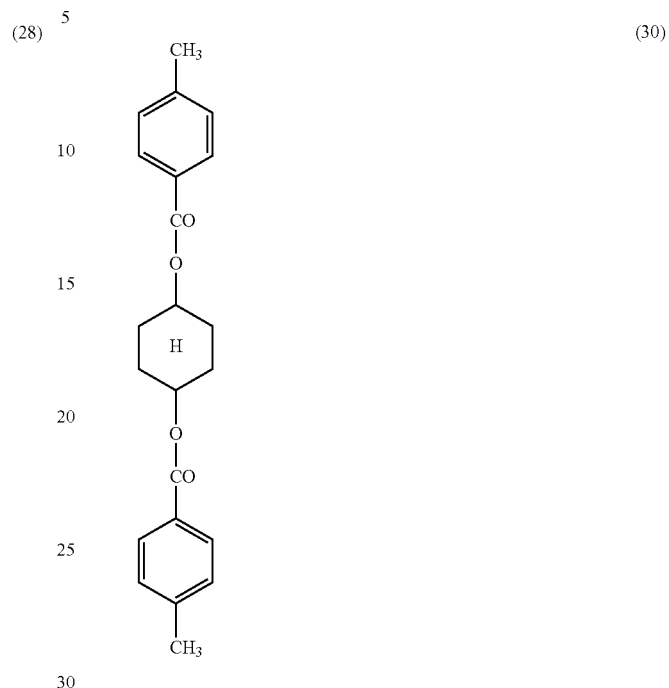
(29)
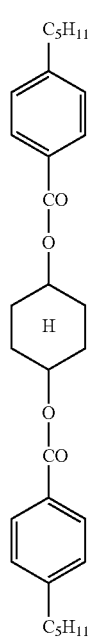
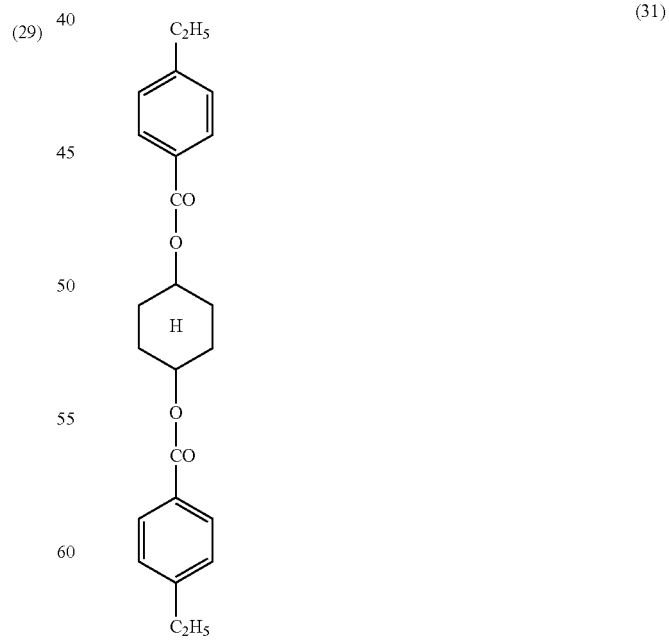

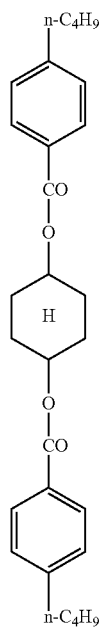
(32)
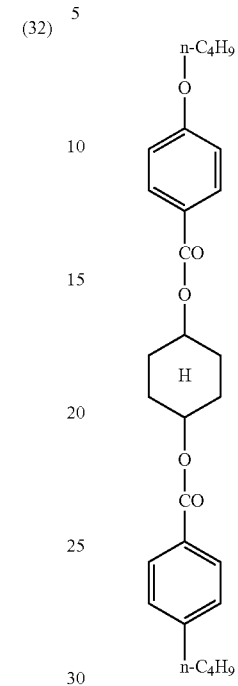
(34)
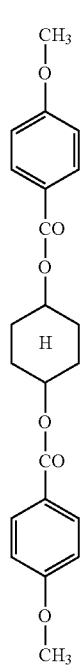
(33)
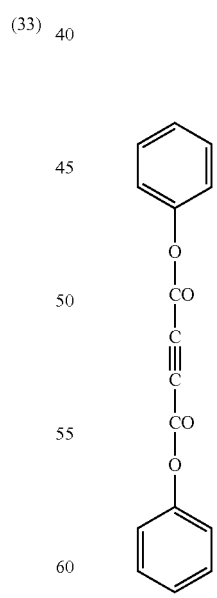
(35)

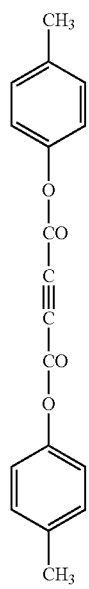 (36)
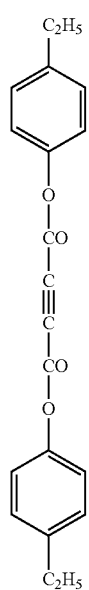 (37)
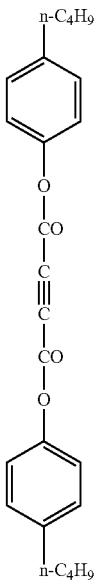 (38)
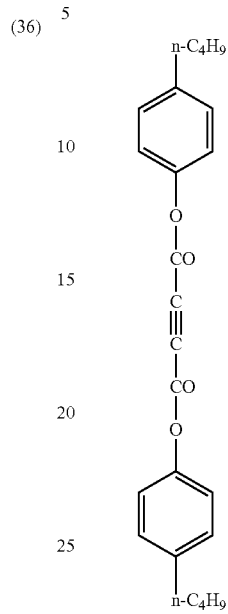 (39)

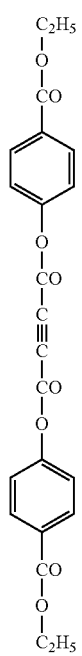 (40)
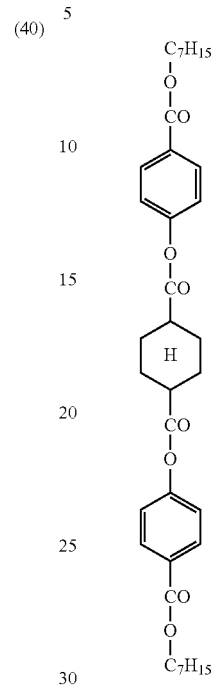 (42)
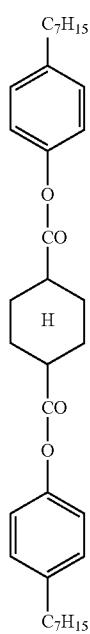 (41)
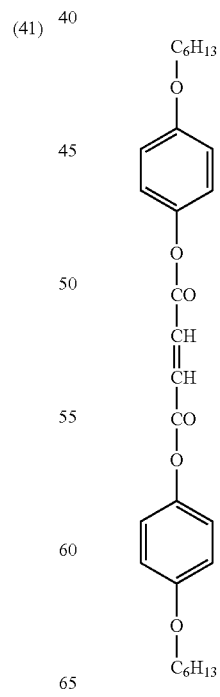 (43)

-continued

(44)
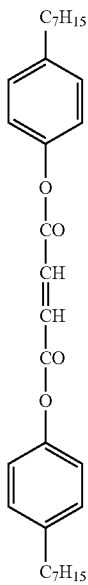

(45)
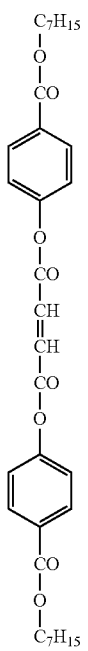

Exemplified Compounds (1) to (34), (41) and (42) each have two asymmetric carbon atoms at the 1- and 4-positions of the cyclohexane ring. However, the exemplified Compounds (1), (4) to (34), (41) and (42) have symmetric meso-form molecular structures, so none of them have optical isomers (optical activity) but each has only geometric isomers (trans-form and cis-form). The trans-form (1-trans) Exemplified Compound (1) and the cis-form (1-cis) Exemplified Compound (1) are illustrated below.

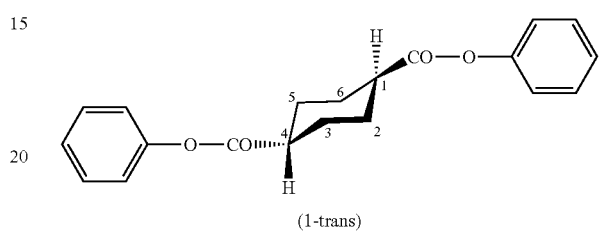

(1-trans)

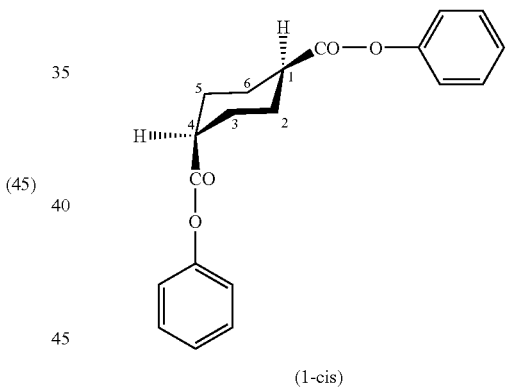

(1-cis)

As mentioned above, it is preferable that rod-shaped compounds for use in the invention have linear structures. Therefore, the trans-form compounds are preferable to the cis-form compounds.

The exemplified Compounds (2) and (3) each have optical isomers in addition to geometric isomers (a total of 4 isomers). As to the geometric isomers also, the trans-form is preferable to the cis-form as mentioned above. As to the optical isomers, however, it is not worth to mention that one is better than the other. So they may have any of dextro (D), levo (L) and racemic forms.

In each of the exemplified Compounds (43) to (45), the vinylene linkage at the center, though may have either trans or cis form, preferably has the trans form for the same reason as mentioned above.

In addition to the above, suitable compounds are illustrated below.
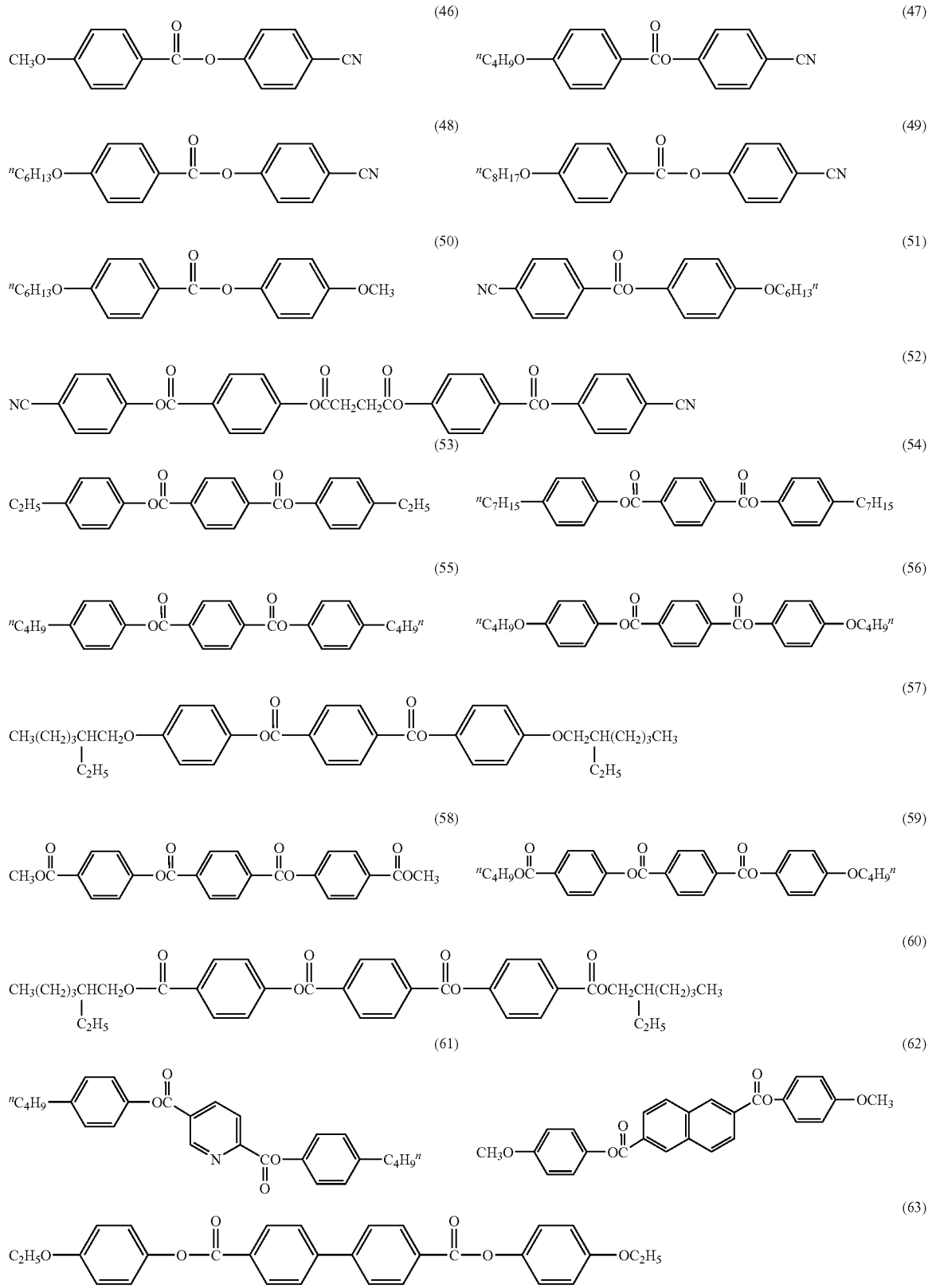

Two or more of rod-shaped compounds that show in the state of solutions ultraviolet absorption spectra wherein their maximum absorption wavelengths (λmax) are shorter than 250 nm may be used as a combination.

Then, organic solvents into which the cellulose acylate is dissolved are described.

(Chlorine-containing Solvent)

In preparing a cellulose acylate solution of the invention, it is preferable to use as a main solvent a chlorine-containing organic solvent. In the invention, no restriction is placed on the type of a chlorine-containing organic solvent used so long as the solvent can dissolve cellulose acylate and permits flow casting and film formation, and what's more objects of the invention can be attained. Such a chlorine-containing organic solvent is preferably dichloromethane and chloroform, and dichloromethane in particular is favorable. In addition, chlorine-containing organic solvents can be mixed with other organic solvent without any particular problems. In using such a solvent mixture, it is required to use dichloromethane in a proportion of at least 50% by mass. Chlorine-free organic solvents usable in combination with chlorine-containing organic solvents in the invention are described below. Specifically, solvents selected from 3-12C esters, ketones, ethers, alcohol compounds or hydrocarbons are preferably used as the chlorine-free organic solvents. Such esters, ketones, ethers and alcohol compounds may have cyclic structures. Compounds having any two or more of functional groups in esters, ketones and ethers (namely —O—, —CO— and —COO—) can also be used as the solvent. These compounds may further contain the other functional groups, such as an alcoholic hydroxyl group. In the case of a solvent having two or more types of functional groups, the solvent is usable as far as the number of carbon atoms in the solvent is within specified limits to the number of carbon atoms in a compound having any one of the functional groups. Examples of esters having 3 to 12 carbon atoms include ethyl formate, propyl formate, pentyl formate, methyl acetate, ethyl acetate and pentyl acetate. Examples of ketones having 3 to 12 carbon atoms include acetone, methyl ethyl ketone, diethyl ketone, diisobutyl ketone, cyclopentanone, cyclohexanone and methylcyclohexanone. Examples of ethers having 3 to 12 carbon atoms include diisopropyl ether, dimethoxymethane, dimethoxyethane, 1,4-dioxane, 1,3-dioxolane, tetrahydrofuran, anisole and phenetole. Examples of organic solvents having two or more functional groups per molecule include 2-ethoxyethyl acetate, 2-methoxyethanol and 2-butoxyethanol.

Alcohol usable in combination with chlorine-containing organic solvents may have any of straight-chain, branched-chain and cyclic forms, and preferably includes a saturated aliphatic hydrocarbon moiety. The hydroxyl group of alcohol may be any of primary, secondary and tertiary hydroxyl groups. Examples of such alcohol include methanol, ethanol, 1-propanol, 2-propanol, 1-butanol, 2-butanol, t-butanol, 1-pentanol, 2-methyl-2-butanol and cyclohexanol. Additionally, fluorine-containing alcohol can also be used. Examples of such alcohol include 2-fluoroethanol, 2,2,2-trifluoroethanol and 2,2,3,3-tetrafluoro-1-propanol. Hydrocarbons usable in combination with chlorine-containing organic solvents may have any of straight-chain, branched-chain and cyclic forms, and they may be aromatic or aliphatic hydrocarbons. The aliphatic hydrocarbons may be saturated or unsaturated. Examples of hydrocarbons include cyclohexane, hexane, benzene, toluene and xylene.

Suitable examples of a combination of a chlorine-containing organic solvent as main solvent and other solvents are recited below, but these examples should not be construed as limiting the scope of the invention.

Dichloromethane/methanol/ethanol/butanol (80/10/5/5, parts by mass)

Dichloromethane/acetone/methanol/propanol (80/10/5/5, parts by mass

Dichloromethane/methanol/butanol/cyclohexane (80/10/5/5, parts by mass)

Dichloromethane/methyl ethyl ketone/methanol/butanol (80/10/5/5, parts by mass)

Dichloromethane/acetone/methyl ethyl ketone/ethanol/isopropanol (75/8/5/5/7, parts by mass)

Dichloromethane/cyclopentanone/methanol/isopropanol (80/7/5/8, parts by mass)

Dichloromethane/methyl acetate/butanol (80/10/10, parts by mass),

Dichloromethane/cyclohexanone/methanol/hexane (70/20/5/5, parts by mass)

Dichloromethane/methyl ethyl ketone/acetone/methanol/ethanol (50/20/20/5/5, parts by mass), Dichloromethane/1,3-dioxolane/methanol/ethanol (70/20/5/5, parts by mass)

Dichloromethane/dioxane/acetone/methanol/ethanol (60/20/10/5/5, parts by mass)

Dichloromethane/acetone/cyclopentanone/ethanol/isobutailoUcyclohexane (65/10/10/5/5/5, parts by mass)

Dichloromethane/methyl ethyl ketone/acetone/methanol/ethanol (70/10/10/5/5, parts by mass)

Dichloromethane/acetone/ethyl acetate/ethanol/butanol/hexane (65/10/10/5/5/5, parts by mass)

Dichloromethane/methyl acetoacetate/methanol/ethanol (65/20/10/5 parts by mass)

Dichloromethane/cyclopentanone/ethanol/butanol (65/20/10/5, parts by mass)

(Chlorine-free Solvent)

Chlorine-free solvents used suitably in preparing cellulose acylate solutions of the invention are described below. In the invention, no restriction is placed on the type of a chlorine-free organic solvent used so long as the solvent can dissolve cellulose acylate and permits flow casting and film formation, and what's more objects of the invention can be attained. As the chlorine-free organic solvents used in the invention, solvents selected from 3-12C esters, ketones or ethers are suitable. Such esters, ketones and ethers may have cyclic structures. Compounds having any two or more of functional groups in esters, ketones and ethers (namely —COO—, —CO— and —O—) can also be used as main solvent. These compounds may further contain the other functional groups, such as an alcoholic hydroxyl group. In the case of a main solvent having two or more types of functional groups, the solvent is usable as far as the number of carbon atoms in the solvent is within specified limits to the number of carbon atoms in a compound having any one of the functional groups. Examples of esters having 3 to 12 carbon atoms include ethyl formate, propyl formate, pentyl formate, methyl acetate, ethyl acetate and pentyl acetate. Examples of ketones having 3 to 12 carbon atoms include acetone, methyl ethyl ketone, diethyl ketone, diisobutyl ketone, cyclopentanone, cyclohexanone and methylcyclohexanone. Examples of ethers having 3 to 12 carbon atoms include diisopropyl ether, dimethoxymethane, dimethoxyethane, 1,4-dioxane, 1,3-dioxolane, tetrahydrofuran, anisole and phenetole. Examples of organic solvents having two or more functional groups per molecule include 2-ethoxyethyl acetate, 2-methoxyethanol and 2-butoxyethanol.

A chlorine-free solvent used suitably for cellulose acylate, though chosen from various viewpoints as mentioned above, is as follows. The solvent suitable for the cellulose acylate according to the invention is a mixture of at least three different types of solvents. A first solvent is a single solvent or a mixture of solvents chosen from methyl acetate, ethyl acetate, methyl formate, ethyl formate, acetone, dioxolane or dioxane, a second solvent is chosen from ketones having 4 to 7 carbon atoms or acetoacetates, and a third solvent is chosen from 1-10C alcohol or hydrocarbons, preferably from 1-8C alcohol. When the first solvent is a mixture of two or more different types of solvent, the second solvent may be omitted. The first solvent is preferably methyl acetate, acetone, methyl formate, ethyl formate or a mixture of two or more thereof, and the second solvent is preferably methyl ethyl ketone, cyclopentanone, cyclohexanone or methyl acetoacetate, or it may be a mixture of two or more thereof.

The alcohol as the third solvent may have any of straight-chain, branched-chain and cyclic forms, and preferably includes a saturated aliphatic hydrocarbon moiety. The hydroxyl group of alcohol may be any of primary, secondary and tertiary hydroxyl groups. Examples of such alcohol include methanol, ethanol, 1-propanol, 2-propanol, 1-butanol, 2-butanol, t-butanol, 1-pentanol, 2-methyl-2-butanol and cyclohexanol. Additionally, fluorine-containing alcohol can also be used as alcohol. Examples of such alcohol include 2-fluoroethanol, 2,2,2-trifluoroethanol and 2,2,3,3-tetrafluoro-1-propanol. Further, the hydrocarbons may have any of straight-chain, branched-chain and cyclic forms, and they may be aromatic or aliphatic hydrocarbons. The aliphatic hydrocarbons may be saturated or unsaturated. Examples of hydrocarbons include cyclohexane, hexane, benzene, toluene and xylene. These alcohol compounds and hydrocarbons as the third solvent may be used alone or as mixtures of two or more thereof, and have no particular restrictions. Examples of an alcohol compound suitable as the third solvent include methanol, ethanol, 1-propanol, 2-propanol, 1-butanol, 2-butanol, cyclohexanol, cyclohexane and hexane. Of these alcohol compounds, methanol, ethanol, 1-propanol, 2-propanol and 1-butanol are especially preferred.

In the mixture of three types of solvents, it is preferable that the proportion of the first solvent is from 20% to 95% by mass, that of the second solvent from 2% to 60% by mass and that of the third solvent from 2% to 30% by mass. It is preferable by far that the mixture contains the first solvent in a proportion of 30% to 90% by mass, the second solvent in a proportion of 3% to 50% by mass and alcohol as the third solvent in a proportion of 3% to 25% by mass. Moreover, it is particularly favorable that the first solvent is contained in a proportion of 30% to 90% by mass, the second solvent is contained in a proportion of 3% to 30% by mass and the third solvent is alcohol and contained in a proportion of 3% to 15% by mass. In the case where the first solvent is a mixture and the second solvent is not used, it is preferable that the first solvent is contained in a proportion of 20% to 90% by mass and the third solvent in a proportion of 5% to 30% by mass, and it is preferable by far that the first solvent is contained in a proportion of 30% to 86% by mass and the third solvent in a proportion of 7% to 25% by mass. Those chlorine-free organic solvents usable in the invention are described in detail in *JIII Journal of Technical Disclosure* No. 2001-1745, pages 12 to 16, Japan Institute of Invention and Innovation (Mar. 15, 2001). Suitable examples of a combination of chlorine-free organic solvents are recited below, but these examples should not be construed as limiting the scope of the invention.

Methyl acetate/acetone/methanol/ethanol/butanol (75/10/5/5/5, parts by mass)
Methyl acetate/acetone/methanol/ethanol/propanol (75/10/5/5/5, parts by mass)
Methyl acetate/acetone/methanol/butanol/cyclohexane (75/10/5/5/5, parts by mass)
Methyl acetate/acetone/ethanol/butanol (81/8/7/4, parts by mass)
Methyl acetate/acetone/ethanol/butanol (82/10/4/4, parts by mass)
Methyl acetate/acetone/ethanol/butanol (80/10/4/6, parts by mass)
Methyl acetate/methyl ethyl ketone/methanol/butanol (80/10/5/5, parts by mass)
Methyl acetate/acetone/methyl ethyl ketone/ethanol/isopropanol (75/8/5/5/7, parts by mass)
Methyl acetate/cyclopentanone/methanol/isopropanol (80/7/5/8, parts by mass)
Methyl acetate/acetone/butanol (85/10/5, parts by mass),
Methyl acetate/cyclopentanone/acetone/methanol/butanol (60/15/14/5/6, parts by mass)
Methyl acetate/cyclohexanone/methanol/hexane (70/20/5/5, parts by mass)
Methyl acetate/methyl ethyl ketone/acetone/methanol/ethanol (50/20/20/5/5, parts by mass),
Methyl acetate/1,3-dioxolane/methanol/ethanol (70/20/5/5, parts by mass)
Methyl acetate/dioxane/acetone/methanol/ethanol (60/20/10/5/5, parts by mass)
Methyl acetate/acetone/cyclopentanone/ethanol/isobutanol/cyclohexane (65/10/10/5/5/5, parts by mass)
Methyl formate/methyl ethyl ketone/acetone/methanol/ethanol (50/20/20/5/5, parts by mass)
Methyl formate/acetone/ethyl acetate/ethanol/butanol/hexane (65/10/10/5/5/5, parts by mass)
Acetone/methyl acetoacetate/methanol/ethanol (65/20/10/5 parts by mass)
Acetone/cyclopentanone/ethanol/butanol (65/20/10/5, parts by mass)
Acetone/1,3-dioxolane/ethanol/butanol (65/20/10/5, parts by mass)
1,3-Dioxolane/cyclohexanone/methyl ethyl ketone/methanol/butanol (55/20/10/5/5/5, parts by mass)

Cellulose acylate solutions prepared in the following manners can also be used.

A cellulose acylate solution is prepared using a methyl acetate/acetone/ethanol/butanol (81/8/7/4, parts by mass) mixture as a solvent, filtrated and concentrated, and thereto 2 parts by mass of butanol is further added.

A cellulose acylate solution is prepared using a methyl acetate/acetone/ethanol/butanol (84/10/4/2, parts by mass) mixture as a solvent, filtrated and concentrated, and thereto 4 parts by mass of butanol is further added.

A cellulose acylate solution is prepared using a methyl acetate/acetone/ethanol (84/10/6, parts by mass) mixture as a solvent, filtrated and concentrated, and thereto 5 parts by mass of butanol is further added.

(Cellulose Acylate Solution Characteristics)

As to the cellulose acylate solution according to the invention, it is preferable that the cellulose acylate dissolves in an organic solvent in a concentration of 10% to 30% by mass, preferably 13% to 27% by mass, particularly preferably 15% to 25% by mass. With respect to a method of preparing a cellulose acylate solution having its concentration in the range as mentioned above, the intended concentration may be attained at the stage of cellulose acylate dissolution, or a cellulose acylate solution prepared in advance in a low concentration (e.g., 9 to 15% by mass) may be concentrated so as to have the intended high concentration by a concentration operation as described below. Alternatively, a cellulose acylate solution may be prepared in advance in a high concentration and the concentration thereof may be reduced to the intended low concentration by addition of various additives. There occurs no particular problem so far as the solution of cellulose acylate according to the invention is prepared so as to have its concentration in the range as specified above no matter what method is used for.

Further, it is preferable that the cluster molecular weight of cellulose acylate in a dilute solution obtained by diluting the cellulose acylate solution according to the invention with an organic solvent having the same composition to 0.1 to 5% by mass is within a range of one hundred fifty thousand to fifteen million. And it is preferable by far that the cluster molecular weight ranges from one hundred eighty thousand to nine million. The cluster molecular weight can be determined by a static light-scattering method. For this measurement, it is appropriate to dissolve cellulose acylate in a condition that the inertial square radii determined at the same time ranges from 10 to 200 nm, preferably from 20 to 200 nm. Moreover, it is preferable to dissolve cellulose acylate so that the second virial coefficient is from $-2 \times 10^{-4}$ to $4 \times 10^{-4}$, especially from $-2 \times 10^{-4}$ to $2 \times 10^{-4}$.

Now, definitions of the foregoing cluster molecular weight, inertial square radius and second virial coefficient are mentioned. These values are determined using a static light-scattering method under the following procedure. Although measurements are made in a dilute concentration range on account of the apparatus used, the measured values reflect behaviors of dope in a high concentration range according to the invention. First, cellulose acylate is dissolved in a solvent for dope use to prepare solutions having concentrations of 0.1%, 0.2%, 0.3% and 0.4% by weight, respectively. In order to avoid taking up moisture, cellulose acylate dried at 120° C. for 2 hours is used, and the weighting thereof is made under a 25° C.-10% RH condition. The thus dried cellulose acylate is dissolved in accordance with the method adopted in dope dissolution (a room-temperature dissolution method, a cooling dissolution method or a high-temperature dissolution method). Successively thereto, the solutions obtained and the same solvent as used therein are filtered through a 0.2-μm filter made of Teflon (registered trademark). The solutions thus filtered are examined for static light scattering at 10-degree intervals from 30 degrees to 140 degrees under a temperature of 25° C. by use of a light-scattering measurement device (DLS-700, made by Otsuka Electronics Co., Ltd.). The data thus obtained are analyzed in accordance with Berry plot method. As a refractive index required for this analysis, the solvent's value determined with an Abbe refractometer is used. And the concentration gradient (dn/dc) of refractive index is determined using the solvent and the solutions used in the light-scattering measurement and a differential refractometer (DRM-1021, made by Otsuka Electronics Co., Ltd.).

(Dope Preparation)

Preparation of a cellulose acylate solution (dope) in the invention is not particularly restricted as to the method of dissolving cellulose acylate, so the dissolution of cellulose acylate may be carried out at room temperature, or performed using a cooling dissolution method, a high-temperature dissolution method or a combination of these methods. More specifically, the methods for preparation of cellulose acylate solutions are disclosed, e.g., in JP-A-5-163301, JP-A-61-106628, JP-A-58-127737, JP-A-9-95544, JP-A-10-95854, JP-A-10-45950, JP-A-2000-53784, JP-A-11-322946, JP-A-11-322947, JP-A-2-276830, JP-A-2000-273239, JP-A-11-71463, JP-A-4-259511, JP-A-2000-273184, JP-A-11-323017 and JP-A-11-302388. These methods for dissolution of cellulose acylates in organic solvents can be applied appropriately to the invention as far as those techniques are within the scope of the invention. Details thereof, especially details of methods for using chlorine-free solvents, can be found in *JIII Journal of Technical Disclosure* No. 2001-1745, pages 22 to 25, Japan Institute of Invention and Innovation (Mar. 15, 2001). Further, although the dope solution of cellulose acylate used in the invention is generally concentrated and filtered, methods for these operations are also described in detail in *JIII Journal of Technical Disclosure* No. 2001-1745, page 25, Japan Institute of Invention and Innovation (Mar. 15, 2001). Additionally, in most of the cases where the dissolution is carried out at a high temperature, the temperature required is higher than the boiling point of an organic solvent used. So the dissolution is performed under a pressurized condition.

It is preferable that the cellulose acylate solution according to the invention has its viscosity and dynamic storage elasticity modulus in individually specified ranges. A 1-mL sample solution is withdrawn and the foregoing physical properties thereof are measured with a rheometer (CLS 500) equipped with a Steel Cone having a diameter of 4 cm/2° (which are both products of TA Instruments). Under a measurement condition that the temperature is changed from 40° C. to −10° C. at a rate of 2° C./min by means of Oscillation Step/Temperature Ramp, a static non-Newtonian viscosity at 40° C. (n*, units: Pa·s) and a storage elasticity modulus at −5° C. (G', units: Pa) are determined.

Additionally, the sample solution is previously kept at the measurement starting temperature until the solution temperature becomes constant, and then the measurement is made to start. It is preferable in the invention that the viscosity at 40° C. is from 1 Pa·s to 400 Pa·s and the dynamic storage elasticity modulus at 15° C. is 500 Pa or above, and it is preferable by far that the viscosity at 40° C. is from 10 Pa·s to 200 Pa·s and the dynamic storage elasticity modulus at 15° C. is from $1 \times 10^3$ to $1.00 \times 10^6$. Further, the greater the dynamic storage elasticity moduli at low temperatures, the better the results obtained. For instance, the dynamic storage elastic modulus in the case of using a flow casting support kept at −5° C. is preferably from $1.00 \times 10^4$ to $1.00 \times 10^6$ Pa at −5° C., and that in the case of using a flow casting support kept at −50° C. is preferably from $1.00 \times 10^4$ to $5.00 \times 10^6$ Pa at −50° C.

With respect to the concentration of a cellulose acylate solution, as mentioned above, the dope obtained is characterized by its high concentration and a cellulose acylate solution of high concentration and high stability can be obtained without recourse to concentration. For easier dissolution, cellulose acylate may be dissolved firstly in a low concentration, and then concentrated in a certain way. The concentration is not particularly restricted as to the method applied therefor, but the following methods can be adopted. For instance, the method in which a low concentration of solution is introduced into a space between a cylinder and a rotation trajectory of the perimeter of blades installed in the cylinder and rotating in the peripheral direction of the cylinder, and the solvent thereof is evaporated as a temperature difference is given between the solution and the space, thereby preparing a high concentration of solution (as disclosed, e.g., in JP-A-4-259511), or methods in which a heated solution of a low concentration is blown into a vessel from a nozzle, the solvent therein is flash-evaporated while the solution travels from the nozzle to the inner wall of the vessel aid at the same time the solvent vapor is purged from the vessel and a high concentration of solution is drawn from the bottom of the vessel (as disclosed, e.g., in U.S. Pat. Nos. 2,541,012, 2,858,229, 4,414,341 and 4,504,355) can be adopted.

Prior to flow casting, it is preferable that the solution is filtered with an appropriate filter material, such as gauze or flannel to eliminate extraneous matter, including undissolved matter, dirt and impurities. For filtration of the cellulose acylate solution, it is advantageous to use a filter with an absolute filtration accuracy of 0.1 to 100 μm, preferably 0.5 to 25 μm. The thickness of a filter used is preferably from 0.1 to 10 mm, far preferably from 0.2 to 2 mm. Herein, it is appropriate that the filtration be performed under a pressure of 16 kgf/cm$^2$ or below (1.57 MPa or below), preferably 12 kgf/cm$^2$ or below (1.18 MPa or below), far preferably 10 kgf/cm$^2$ or below (0.98 MPa or below), particularly preferably 2 kgf/cm$^2$ or below (0.20 MPa or below). Suitable examples of a filter material used herein include hitherto known materials, such as glass fiber, cellulose fiber, filter paper and fluoropolymers including tetrafluoroethylene resin. Of known materials, ceramics and metals in particular can be used to advantage.

The viscosity of the cellulose acylate solution just before film formation may be any value so long as it is within the range that the solution can be flow-cast at the time of film formation, and the solution is generally prepared so as to have its viscosity in a range of 10 Pa·s to 2,000 Pa·s, preferably 30 Pa·s to 1,000 Pa·s, far preferably 40 Pa·s to 500 Pa·s. The solution temperature just before film formation does not have any particular limitation other than being the temperature chosen for flow casting, but it is preferably from −5° C. to 70° C., far preferably from −5° C. to 55° C.

(Film Formation)

Film formation methods using a cellulose acylate solution are described below. As a method and apparatus for forming the present cellulose acylate film, the solution-casting film formation method and apparatus currently in use for formation of cellulose triacetate film can be employed. Specifically, a dope (cellulose acylate solution) prepared in a dissolving machine (boiler) is once stored in a storage pot in order to eliminate foams in the dope, and thereby the dope preparation is finished. The dope is fed from a dope port into a pressure die through a pressure metering gear pump ensuring a quantitative feed of high accuracy by its number of revolutions, and flow-cast evenly onto a metal support in a flow casting section which endlessly runs from a mouthpiece (slit) of the pressure die. At the strip-off point where the metal support makes a nearly one circuit, half-dried dope film (referred to as web, too) is stripped off the metal support. The web obtained is dried as it is conveyed with a tenter in a condition that the width of the web is kept by both web edges being pinched with clips, and then the web is conveyed with a group of rolls installed in a drier and thereby the drying thereof is completed. The completely dried web is wound in a desired length with a winder. The combination of a tenter and a group of rolls in a drier varies depending on its intended use. In the solution-casting film formation method applied to functional films for electronic displays, coating apparatus for surface processing of film, such as formation of a subbing layer, an antistatic layer, an antihalation layer and a protective film, is added in many cases besides the solution-casting film formation apparatus. Production processes each are briefly described below, but the scope of the invention is not limited to these processes.

In making a cellulose acylate film by a solvent cast method, the cellulose acylate solution (dope) is flow-cast onto a drum or a band and the solvent is made to evaporate, thereby forming a film. As to the dope before flow casting, it is preferable that the dope concentration is adjusted to the range of 5 to 40% by mass on a solids basis. The drum surface or the band surface is preferably polished to a mirror-smooth surface. Further, the dope is preferably flow-cast onto a drum or band having a surface temperature of 30° C. or below, and it is especially favorable that the metal support temperature is in the range of −10° C. to 20° C.

Moreover, the techniques disclosed in JP-A-2000-301555, JP-A-2000-301558, JP-A-7-032391, JP-A-3-193316, JP-A-5-086212, JP-A-62-037113, JP-A-2-276607, JP-A-55-014201, JP-A-2-111511 and JP-A-2-208650 can be applied to the invention.

(Multilayer Flow Casting)

The cellulose acylate solution may be flow-cast as a single-layer solution onto a smooth band or drum as a metal support, or a plurality of cellulose acylate solutions may be flow-cast in a multilayer form. In the case of flow-casting a plurality of cellulose acylate solutions, film may be formed as the solutions are flow-cast respectively from a plurality of casting ports provided at intervals along the traveling direction of the metal support and one solution layer is superimposed on another solution layer. To this case, the methods disclosed, e.g., in JP-61-158414, JP-A-1-122419 and JP-A-11-198285 are applicable.

In addition, the cellulose acylate solution may be formed into a film by flow casting from two casting ports. This film formation can be performed, e.g., according to the methods disclosed in JP-B-60-27562, JP-A-61-94724, JP-A-61-947245, JP-A-61-104813, JP-A-61-158413 and JP-A-6-134933. In accordance with another flow casting method disclosed in JP-A-56-162617, a cellulose acylate film may be formed by a flow of high-viscosity cellulose acylate solution being wrapped up in a low-viscosity cellulose acylate solution and both the high- and low-viscosity cellulose acylate solutions being extruded at the same time. As disclosed in JP-A-61-94724 and JP-A-61-94725, it is also a preferred mode that the outside solution contains an alcohol component as a poor solvent in a greater amount than the inside solution. In still another mode, it is possible to make a film by using two casting ports, forming a film on a metal support by use of a solution from the first casting port and stripping the film off the support, and flow-casting a solution from the second casting port onto the support-contact surface of the film. This mode accords with, e.g., the method disclosed in JP-B-44-20235. The cellulose acylate solutions used for the flow casting may be the same or different, and there is no particular limitations thereto. In order to impart functions to a plurality of cellulose acylate layers, it is enough to extrude cellulose acylate solutions having the corresponding functions from their respective casting ports. Additionally, the cellulose acylate solution can be flow-cast simultaneously with solutions for other functional layers (e.g., an adhesive layer, a dye layer, an antistatic layer, an antihalation layer, a UV absorbing layer, a polarization layer).

For achieving the required film thickness by a single-layer solution currently in use, it is necessary to extrude a cellulose acylate solution of high concentration and high viscosity. Since such a cellulose acylate solution is poor in stability, solid matter tends to develop therein and often causes a problem that the film formed has pimple trouble or poor planarity. An answer to such a problem consists in flow-casting a plurality of cellulose acylate solutions from casting ports, and thereby not only solutions of high viscosity can be extruded onto a metal support at the same time to result in formation of film with improved planarity and excellent surface quality, but also thick cellulose acylate solutions can be used to result in reduction in drying load and speedup in film production.

In the case of co-casting, the inner thickness and the outer thickness have no particular limitations, but it is appropriate that the outer thickness constitute 1 to 50%, preferably 2 to 30%, of the total film thickness. Herein, the outer thickness is defined as the sum total of the thickness of the layer brought into contact with a metal support and the thickness of the layer brought into contact with the air. In the co-casting, cellulose acylate solutions different in concentration of each additive, such as a plasticizer, a ultraviolet absorbent or a matting agent, can also be cast together, thereby forming a cellulose acylate film having a multilayer structure. For instance, it is possible to make a cellulose acylate film having a skin layer/core layer/skin layer structure. Herein, a matting agent, for example, can be added in a greater amount to the skin layers, or added only to the skin layers. On the other hand, a plasticizer and an ultraviolet absorbent can be added in greater amounts to the core layer than the skin layers, or added to the core layer alone. Further, the plasticizers added to the core layer and the skin layer may be different in type and the ultraviolet absorbent added thereto may also be different in type. For instance, a low-volatility plasticizer and/or ultraviolet absorbent can be incorporated into the skin layers, while a highly plastic plasticizer or a highly efficient ultraviolet absorbent can be added to the core layer. It is also a preferred embodiment that a parting accelerator is incorporated in only the skin layer on the metal support side. For gelling the solution by cooling the metal support in a cooled drum method, it is also favorable to add alcohol as a poor solvent in a greater amount to the skin layer. The skin layer and the core layer may have different Tg values, and it is preferable that the Tg of the core layer is lower than that of the skin layer. In addition, the viscosity of the cellulose acylate solution at casting-time may differ between the skin layer and the core layer, and it is preferable that the viscosity of the skin layer is lower than that of the core layer, but the viscosity of the core layer may be lower than that of the skin layer.

(Flow Casting)

Examples of a solution casting method include the method of extruding a prepared dope evenly onto a metal support from a pressure die, the method of using a doctor blade in which the thickness of a dope once cast onto a metal support is adjusted with the blade, and a method of using a reverse roll coater in which adjustment is made with a roll rotating reversely. Of these methods, the method of using a pressure die is preferable. The pressure die includes a coat hanger type and a T-die type, and both types are favorably used. In addition to those methods, various known methods for flow-casting cellulose triacetate solutions to make films can be applied, and the same effects as described in documents can be achieved by setting conditions with consideration given to differences, e.g., in boiling points of solvents used. An endlessly-traveling metal support used in forming the present cellulose acylate film is a drum whose surface is mirror-finished by chromium plating, or a stainless belt (which may be referred to as "band") whose surface is mirror-finished by surface polishing. As to the pressure die used in forming the present cellulose acylate film, only one or more than one pressure die may be placed above the metal support. Specifically, it is appropriate that one or two pressure dies be placed. When two or more pressure dies are placed, the dope may be allocated in different proportions to the respective dies, and fed to the pressure dies from a plurality of high-precision metering gear pumps in their respective proportions. The temperature of a cellulose acylate solution used for flow casting is preferably from −10° C. to 55° C., far preferably from 25° C. to 50° C. In the flow casting process, the temperature may be the same throughout the process, or different from one point to another in the process. In the case of differing in temperature, it is adequate for the intended purpose that the dope just before flow casting has the desired temperature.

(Drying)

Examples of a general method for drying a dope on a metal support in making a cellulose acylate film include a method of giving a hot air to the front side of the metal support (a drum or a belt), or exposing the surface of web on a metal support to a hot air; a method of giving a hot air to the back of a drum or a belt; and a liquid-heat transfer method in which a temperature-controlled liquid is brought into contact with the back of a belt or a drum, which is the side opposite to the dope-cast side of the drum or the belt, and heats the drum or the belt through heat transfer and thereby controls the surface temperature. Of these methods, the back liquid-heat transfer method is preferred. The metal support surface temperature before flow casting, though may be set at any value as far as it is below the boiling points of all solvents used for the dope, is preferably set at a temperature lower by 1 to 10 degrees than the lowest boiling point among those of all solvents used. Incidentally, the case of cooling a flow-cast dope and stripping it off without drying is free from such a restriction.

(Stretch Processing)

As to the cellulose acylate film according to the invention, retardation adjustments can be performed by stretch processing. Further, there are methods of positively stretching in the width direction. For instance, such methods are disclosed in JP-A-62-115035, JP-A-4-152125, JP-A-4-284211, JP-A-4-298310 and JP-A-11-48271. Therein, the films formed are stretched in order to impart high in-plane retardation values to the intended cellulose acylate films.

The film stretching is performed at room temperature or under a condition that the film be heated. The heating temperature is preferably the glass transition temperature of the film or below. The film stretching may be uniaxial stretching in a vertical or lateral direction alone, or simultaneous or sequential biaxial stretching. As to the stretching, 1% to 200% stretching is performed. Further, 1% to 100% stretching is preferable, and 1% to 50% stretching is especially preferable. To the birefringence of an optical film, it is appropriate that the refractive index in the width direction be greater than the refractive index in the length direction. Therefore, the film is preferably stretched to a greater extent in the width direction. Additionally, the stretch processing may be carried out in the midstream of film-formation process, or a base roll into which a film formed is wound may be subjected to stretch processing. In the former case, the film being worked on in formation may be stretched as it contains a residual solvent, and the stretching thereof can be preferably performed when the amount of solvent remaining is from 2% to 30%.

The thickness of the finished (dried) film of cellulose acylate according to the invention varies according to what purpose the film is used for, but it is preferably 85 μm or below from the viewpoint of preventing light leakage caused by change in environmental conditions. In addition, from the viewpoint of handling suitability in the manufacturing process, the film thickness is preferably 40 μm or above. On the other hand, it is also preferable that the film thickness is adjusted to 65 μm or above. This is because, by having its thickness in this range, the film becomes resistant to water penetration and has an advantage in the 500-hour, 60° C.-95% RH endurance test of a polarizing plate. Since the magnitude of an optical property is proportional to the film thickness and the moisture permeability varies inversely with the film thickness, it is thought that the moisture permeability becomes low by an increase in film thickness. From the viewpoints mentioned above, the most favorable film thickness is from 65 to 83 μm.

Film thickness adjustment to the desired value may be performed by controlling the concentration of solids in dope, the spacing of a die's mouthpiece slit, the extrusion pressure from a die and the metallic support speed. The width of the thus obtained cellulose acylate film is preferably from 0.5 m to 3 m, far preferably from 0.6 m to 2.5 m, further preferably from 0.6 m to 2.2 m. The length of the film to be wound into a roll is preferably from 100 m to 10,000 m, far preferably from 500 m to 7,000 m, further preferably from 1,000 m to 6,000 m. When the film is wound, it is preferable that at least one edge of the film is knurled. The knurling width is from 3 mm to 50 mm, preferably 5 mm to 30 mm, and the knurling height is from 0.5 μm to 500 μm, preferably from 1 μm to 200 μm. The knurling may be made by either single-sided or double-sided press. Variability of Re values throughout the width of the film is preferably ±5 nm, far preferably ±3 nm, and that of Rth values is preferably ±10 nm, far preferably ±5 nm. Variability of Re values and that of Rth values in the length direction are preferably within the ranges of those in the width direction, respectively. In order to maintain the clarity of the film, it is preferable that the haze is adjusted to a range of 0.01% to 2%. The haze can be rendered slight by thoroughly dispersing fine particles of the added matting agent to lessen the number of aggregated particles or by reducing the addition amount of a matting agent by using the agent in a skin layer alone.

(Optical Properties of Cellulose Acylate Film)

As to the optical properties of the present cellulose acylate film, it is preferable that an Re retardation value and an Rth retardation value satisfy the following expressions (V) and (VI), respectively;

$$20 \text{ nm} \leq Re(550) \leq 50 \text{ nm} \tag{V}$$

$$160 \text{ nm} \leq Rth(550) \leq 250 \text{ nm} \tag{VI}$$

In the above expressions, $Re(\lambda)$ is an in-plane retardation value (unit: run) at a wavelength λ run and $Rth(\lambda)$ is a thickness-direction retardation value (unit: nm) at a wavelength λ nm.

The retardation value $Re(\lambda)$ can be measured with KOBRA 21ADH (made by Oji Scientific Instruments) wherein light with a wavelength of λ nm is made to strike upon a film in the direction of the normal to the film surface. In addition, KOBRA 21ADH calculates the retardation value $Rth(\lambda)$ based on three retardation values measured in three different directions, namely the retardation value $Re(\lambda)$, a retardation value measured under conditions that the in-plane slow axis is taken as an axis of tilt (rotation axis) and light with a wavelength of λnm is made to strike from a direction tilting to +40° with respect to the direction of the normal to the film and a retardation value measured under conditions that the in-plane slow axis is taken as an axis of tilt and light with a wavelength of λnm is made to strike from a direction tilting to −40° with respect to the direction of the normal to the film. In the calculation, the value 1.48 assumed as the average refractive index and the film thickness are input to the KOBRA.

It is preferable by far that the retardation values satisfy the following expressions (VII) and (VIII);

$$30 \text{ nm} \leq Re(550) \leq 50 \text{ nm} \tag{VII}$$

$$170 \text{ nm} \leq Rth(550) \leq 220 \text{ nm} \tag{VIII}$$

In this specification, the wavelength λ nm is 550 nm unless otherwise noted.

The optical property values Re and Rth vary as the mass and dimensions are changed by a humidity change and a lapse of time under high temperatures. The smaller the changes in Re and Rth values, the more suitable the film is for use. For reduction of changes caused in optical properties by humidity, cellulose acylate having a high degree of acyl substitution at the 6-position is used, and besides, the moisture permeability and equilibrium moisture content of the film are lowered by use of hydrophobic additives (including a plasticizer, a retardation developer and an ultraviolet absorbent). In the invention, it is preferable that the difference between the Re values of the cellulose acylate film under 25° C.-10% RH and 25° C.-80% RH conditions, ΔRe(Re10% RH-Re80% RH), is 12 nm or below and the difference between the Rth values under 25° C.-10% RH and 25° C.-80% RH conditions, ΔRth (Rth10% RH-Rth80% RH), is 32 nm or below. The suitable moisture permeability is from 400 g/m² to 2,300 g/m² as measured under conditions of 60° C., 95% RH and 24 hours. As to the equilibrium moisture content, the suitable value, as measured under 25° C. and 80% RH, is 3.4% or below. The variations caused in optical properties by changing the humidity from 100% RH to 80% RH are preferably 12 nm or below as expressed in Re value and 32 nm or below as expressed in Rth value. The suitable amount of additives used is from 10% to 30% by mass, preferably from 12% to 25% by mass, particularly preferably from 14.5% to 20% by mass, of the amount of cellulose acylate used. When the film suffers changes in mass and dimensions because the additives mixed therein have volatility or decomposibility, changes are caused in its optical properties. Therefore, it is preferable that the amount of the mass change caused in the film after a lapse of 48 hours at 80° C. and 90% RH is 5% or below. Likewise, the amount of the dimensional change caused in the film after a lapse of 24 hours at 60° C. and 95% RH is preferably 5% or below. In addition, the amount of the dimensional change after a lapse of 24 hours at 90° C. and 5% RH is preferably 5% or below. On the other hand, even when there are a little dimensional change and a little mass change, the amount of the changes in optical properties becomes small so far as the photo-elastic modulus of the film is small. Therefore, it is preferable that the photo-elastic modulus of the film is $50 \times 10^{-13}$ dyne/cm² ($5 \times 10^{-13}$ N/m²) or below. In addition, the glass transition temperature Tg of the cellulose acylate film is preferably from 80° C. to 180° C. Further, the elasticity modulus of the cellulose acylate film is preferably from 15.00 MPa to 5,000 MPa. Furthermore, it is preferable that the cellulose acylate film contains silicon dioxide particles having an average secondary particle size of 0.2 μm to 1.5 μm.

(Optically Anisotropic Layer)

An optically anisotropic layer is made from a liquid crystalline compound. The optically anisotropic layer can be formed directly on the surface of a transparent substrate (cellulose acylate film). It is also allowable to form an alignment layer on a transparent substrate and then to form the optically anisotropic layer on the alignment layer. Alternatively, the optically anisotropic layer is formed from a liquid crystalline compound on a separate substrate, and then transferred to a transparent substrate, thereby making an optical compensation film. The transparent substrate to which the optically anisotropic layer is transferred may be provided in advance with a pressure-adhesive layer.

As the liquid crystalline compound, a rod-shaped liquid crystalline compound and a disc-shaped (discotic) liquid crystalline compound are both suitable. The rod-shaped liquid crystalline compound and the discotic liquid crystalline compound may be a macromolecular liquid crystal. In forming the optically anisotropic layer, the liquid crystalline compound may lose its liquid crystallinity by undergoing polymerization or cross-linking.

Examples of a rod-shaped liquid crystal compound include azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolans and alkenylcyclohexylbenzonitriles. Further, metal complexes are also included in rod-shaped liquid crystalline compounds. In addition, it is possible to use liquid crystalline polymers the repeating units of which contain molecular structures corresponding to rod-shaped liquid crystalline compounds. In other words, rod-shaped liquid crystalline compounds may form liquid crystalline polymers by combining with polymers.

Descriptions of rod-shaped liquid crystalline compounds can be found, e.g., in *Kikan Kagaku Sosetsu* (Quarterly Review of Chemistry), volume 22 (entitled "Ekisho no Kagaku" (Chemistry of Liquid Crystals), chapters 4, 7 and 11, The Chemical Society of Japan (1994), and *Ekisho Debaisu Handobukku* (Handbook of Liquid Crystal Devices), chapter 3, The 142-th Committee of Japan Society for the Promotion of Science.

The birefringence factors of rod-shaped liquid crystalline compounds are preferably in the range of 0.001 to 0.7.

For fixation of their aligned state, it is appropriate that the rod-shape liquid crystalline compounds have polymerizable groups. The polymerizable groups are preferably unsaturated polymerizable groups or epoxy groups, far preferably unsaturated polymerizable groups, particularly preferably ethylenic unsaturated polymerizable groups.

The disc-shaped (discotic) liquid crystalline compounds include the benzene derivatives described in the research report of C. Destrade et al., *Mol. Cryst.*, vol. 71, p. 111 (1981), the truxene derivatives described in the research reports of C. Destrade et al., *Mol. Cryst.*, vol. 122, p. 141 (1985) and *Physics lett. A*, vol. 78, p. 82 (1990), the cyclohexane derivatives described in the research report of B. Kohne et al., *Angew. Chem.*, vol. 96, p. 70 (1984), and the azacrown macrocycles and the phenylacetylene macrocycles described in the research report of J. M. Lehn et al., *J. Chem. Commun.*, p. 1794 (1985), and the research report of J. Zhang et al., *J. Am. Chem. Soc.*, vol. 116, p. 2655 (1994).

In general a discotic liquid crystalline compound has a structure that side chains (such as linear alkyl groups, alkoxy groups or substituted benzoyloxy groups) are attached radially to its mother nucleus situated at the molecular center. And it is preferable that each individual molecule or molecular self-assembly of a discotic liquid crystalline compound has rotational symmetry and the discotic liquid crystalline compound is a compound capable of giving a definite orientation.

When an optically anisotropic layer is formed from a discotic liquid crystalline compound, the compound contained finally in the optically anisotropic layer is no longer required to exhibit liquid crystallinity. For instance, when a low-molecular discotic liquid crystal compound has a group capable of reacting to heat or light, an optically anisotropic layer can be formed by the compound being converted into a high-molecular compound through polymerization reaction or cross-linking reaction under exposure to heat or light. It is a general rule that a discotic liquid crystalline compound loses its liquid crystallinity by conversion into a high-molecular compound. Discotic liquid crystalline compounds usable to advantage are disclosed in JP-A-8-50206. As to the polymerization of discotic liquid crystalline compounds, descriptions thereof can be found in JP-A-8-27284.

For fixation of a discotic liquid crystalline compound by polymerization, it is required to combine polymerizable groups as substituents with the discotic core of the discotic liquid crystalline compound. However, direct binding of polymerizable groups to the discotic core makes it difficult to keep the aligned state of the discotic core during the polymerization reaction. Therefore, linkage groups are introduced between the discotic core and polymerizable groups. Under these circumstances, it is appropriate that the discotic liquid crystalline compound having polymerizable groups be a compound represented by the following formula:

D(-L-Q)$_n$ wherein D is a discotic core, L is a divalent linkage group, Q is a polymerizable group and n is an integer of 4 to 12.

Examples of a discotic core (D) are illustrated below. In each of the following examples, LQ (or QL) means a combination of a divalent linkage group (L) and a polymerizable group (Q).

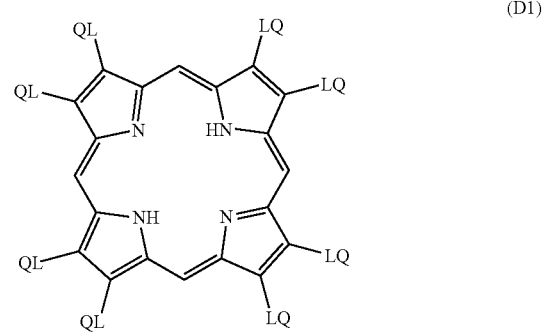

(D1)

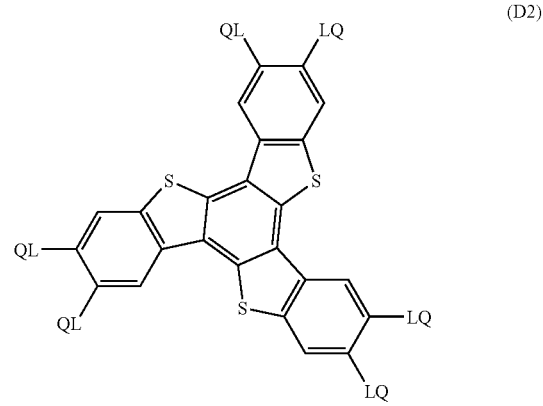

(D2)

(D3) 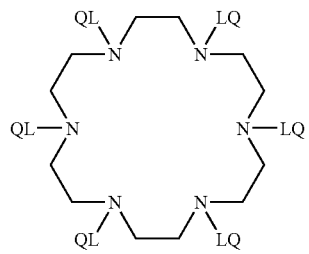
(D4) 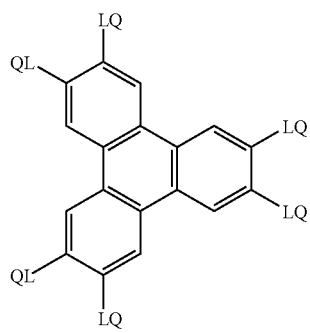
(D5) 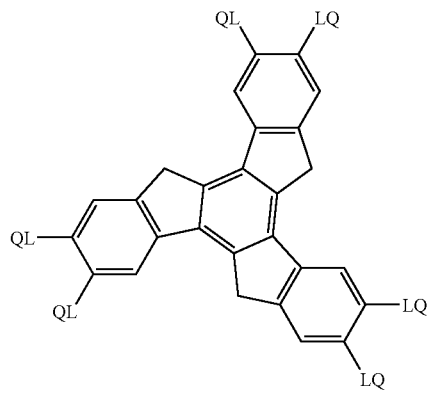
(D6) 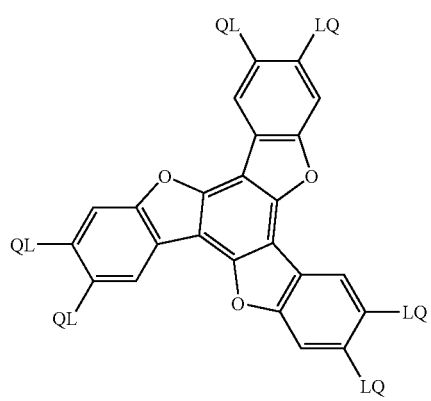
(D7) 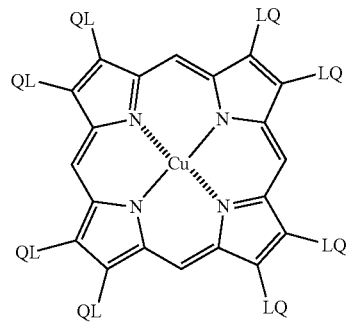
(D8) 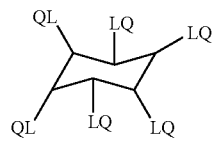
(D9) 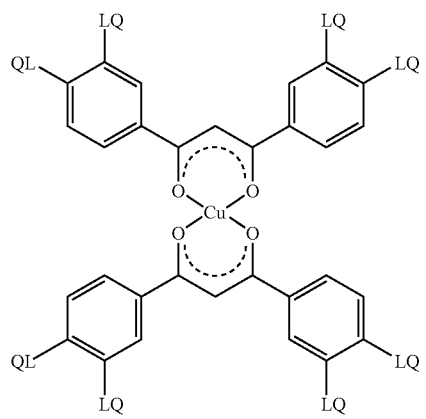
(D10) 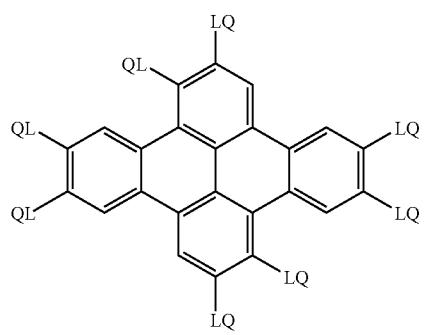

-continued

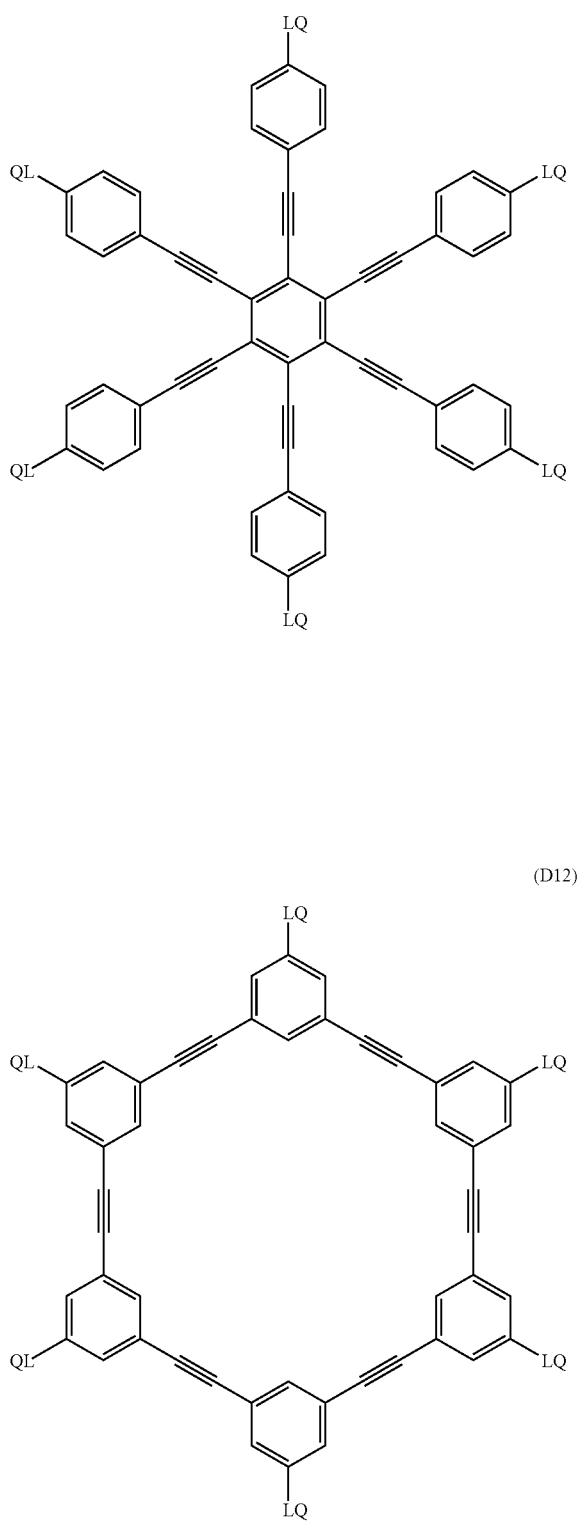

(D11)

(D12)

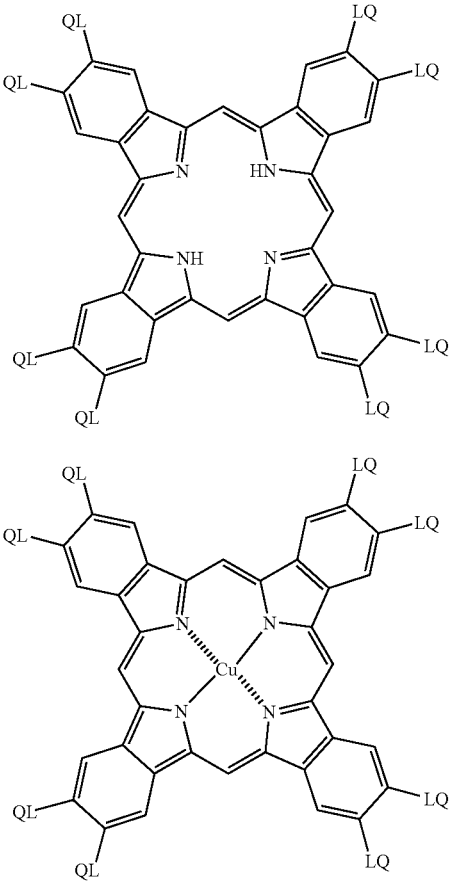

(D13)

(D14)

(D15)

In the foregoing formula, the divalent linkage group (L) is preferably a divalent linkage group selected from alkylene groups, alkenylene groups, arylene groups, —CO—, —NH—, —O—, —S— or combinations of two or more of those groups. And it is preferable by far that the divalent linkage group (L) is a divalent linkage group formed by combining at least two divalent linkage groups selected from alkylene groups, arylene groups, —CO—, —NH—, —O— or —S—. Of these divalent linkage groups, those formed by combining at least two divalent linkage groups selected from alkylene groups, arylene groups, —CO— or —O— are especially preferred as the divalent linkage group (L). The suitable number of carbon atoms contained in each alkylene group is from 1 to 12, that in each alkenylene group is from 2 to 12, and that in each arylene group is from 6 to 10.

Examples of a divalent linkage group (L) are shown below. Each of the following linkage groups is bound to a discotic core (D) at the left side, and it is bound to a polymerizable group at the right side. AL stands for an alkylene or alkenylene group, and AR stands for an arylene group. Additionally, the alkylene, alkenylene and arylene groups may have substituents (such as alkyl groups).

L1: -AL-CO—O-AL-
L2: -AL-CO—O-AL-O—
L3: -AL-CO—O-AL-O-AL-
L4: -AL-CO—O-AL-O—CO—
L5: —CO-AR—O-AL-
L6: —CO-AR—O-AL-O—
L7: —CO-AR—O-AL-O—CO—
L8: —CO—NH-AL-
L9: —NH-AL-O—
L10: —NH-AL-O—CO—
L11: —O-AL-
L12: —O-AL-O—
L13: —O-AL-O—CO—
L14: —O-AL-O—CO—NH-AL-
L15: —O-AL-S-AL-
L16: —O—CO-AR—O-AL-CO—
L17: —O—CO-AR—O-AL-O—CO—
L18: —O—CO-AR—O-AL-O-AL-O—CO—
L19: —O—CO-AR—O-AL-O-AL-O-AL-O—CO—
L20: —S-AL-
L21: —S-AL-O—
L22: —S-AL-O—CO—
L23: —S-AL-S-AL-
L24: —S-AR-AL-

The polymerizable group (Q) in the foregoing formula is chosen according to the type of polymerization reaction employed. Specifically, the polymerizable group (Q) is preferably an unsaturated polymerizable group or an epoxy group, far preferably an unsaturated polymerizable group, especially preferably an ethylenic unsaturated polymerizable group.

In the foregoing formula, n is an integer of 4 to 12. The specific figure is determined according to the type of a discotic core (D) employed. A plurality of L-Q combinations may be the same or different, but it is preferable that they are the same.

As to the alignment of liquid crystalline compound molecules, it is preferable that the average direction of molecular symmetry axes in the optically anisotropic layer forms an angle of 43° to 47° with respect to the length direction.

In a hybrid alignment, the angles that symmetry axes of liquid crystalline compound molecules make with the substrate surface increase or decrease with increase in distance from the substrate surface in the depth direction of the optically anisotropic layer. However, it is preferable that the angles decrease with increase in the distance. The angles may change in various states, such as a state of continuous increase, a state of continuous decrease, a state of intermittent increase, a state of intermittent decrease, a state including continuous increase and continuous decrease, and a state of intermittent change including increases and decreases. The intermittent change includes zones having no change in tilt angle at midpoints in the thickness direction.

As far as the angles are, on the whole, in an increased or decreased state, zones having no angle change may be included. However, it is preferable that the angles are in a continuously changed state.

The average direction of symmetry axes of liquid crystalline compound molecules can be generally controlled by selection of an appropriate liquid crystalline compound or material for the alignment film, or by choice of a proper rubbing treatment method. In the case of an optical compensation film wherein the slow axis of the transparent substrate is neither orthogonal nor parallel to the slow axis of the optically anisotropic layer, the direction of the slow axis of the optically anisotropic layer can be adjusted by performing rubbing treatment in a direction different from the slow axis of the transparent substrate.

The directions of symmetry axes of liquid crystalline compound molecules on the surface side (air side) of the optically anisotropic layer can be generally controlled by properly selecting the species of a liquid crystalline compound or the kinds of additives with which the liquid crystalline compound is used in combination. Examples of additives usable in combination with the liquid crystalline compound include a plasticizer, a surfactant, a polymerizable monomer and a polymer. The degree of a change in alignment directions of molecular symmetry axes, similarly to the above, can be controlled by the selection of a liquid crystalline compound and additives. In selecting a surfactant, it is preferable to secure coordination with its surface tension controlling effect on a coating solution.

As to the plasticizer, the surfactant and the polymerizable monomer with which the liquid crystalline compound is used in combination, it is preferable that they have compatibility with the liquid crystalline compound and can impart a tilt angle change to the liquid crystalline compound or have no hindrance to alignment. Of these additives, the polymerizable monomer (such as a compound containing, a vinyl group, a vinyloxy group, an acryloyl group or a methacryloyl group) is preferred. The addition amount of such a compound is preferably from 1% to 50% by mass, far preferably from 5% to 30% by mass, of the liquid crystalline compound used. In addition, mixing of a monomer having 4 or more polymerizable functional groups in the additives can heighten adhesion between an alignment film and an optically anisotropic layer.

When the liquid crystalline compound used is a discotic liquid crystalline compound, it is preferable that a polymer having a measure of compatibility with the discotic liquid crystalline compound and capable of imparting a tilt angle change to the discotic liquid crystalline compound is added to the optically anisotropic layer.

As the polymer added, cellulose ester and cellulose ether are suitable, and cellulose ester is preferable to cellulose ether. Examples of cellulose ester include cellulose acetate, cellulose acetate propionate and cellulose acetate butyrate. In examples of cellulose ether, hydroxypropyl cellulose is included. The addition amount of such a polymer is adjusted so as not to hinder alignment of discotic liquid crystalline compound molecules. Specifically, the amount of a polymer added is preferably from 0.1% to 10% by mass, far preferably from 0.1% to 8% by mass, further preferably from 0.1% to 5% by mass, based on the discotic liquid crystalline compound.

The temperature of discotic nematic liquid crystal phase-solid phase transition in the discotic liquid crystalline compound is preferably from 70° C. to 300° C., far preferably from 70° C. to 170° C.

The thickness of the optically anisotropic layer is preferably from 0.1 μm to 20 μm, far preferably from 0.5 μm to 15 μm, further preferably from 1 μm to 10 μm.

(Alignment Film)

It is preferable that an alignment film is provided between the transparent substrate and the optically anisotropic layer.

The alignment film is preferably a layer made up of cross-linked polymers. For formation of such a layer, cross-linkable polymers can be used. For instance, polymers having cross-linkable functional groups are made to react with each other by application of light or heat or by changing pH, resulting in formation of cross-links. Alternatively, polymers may be cross-linked by use of a cross-linking agent. The cross-linking agent used is a highly reactive compound, and linkage groups derived from the cross-linking agent are introduced between polymers to form cross-links between polymers.

The alignment film made up of cross-linked polymers can be generally formed by coating on a transparent substrate a layer of coating solution containing cross-linkable polymers or a mixture of a polymer and a cross-linking agent, and then by subjecting the coating layer to processing, such as exposure to light or heat, or pH adjustment.

For dust prevention during the process of rubbing the alignment film, it is appropriate that the cross-linking degree of the alignment film be heightened in advance. When the value obtained by subtracting a ratio of the amount of a cross-linking agent remaining after cross-linking treatment (Ma) to the amount of the cross-linking agent added to a coating solution (Mb), an Ma/Mb ratio, from 1, namely the value of (1−(Ma/Mb)), is defined as a cross-linking degree, the cross-linking degree is preferably from 50% to 100%, far preferably from 65% to 100%, especially preferably from 75% to 100%.

Examples of a polymer usable in the alignment film include polymethyl methacrylate, polyacrylic acid, polymethacrylic acid, polystyrene, polymaleinimide, polyvinyl alcohol, modified polyvinyl alcohol, poly(N-methylolacrylamide), polyvinyl toluene, chlorosulfonated polyethylene, nitrocellulose, polyvinyl chloride, chlorinated polyolefin, polyester, polyimide, polyvinyl acetate, polyethylene, carboxymethyl cellulose, gelatin, polypropylene, polycarbonate and copolymers of monomers constituting any two of the polymers recited above (such as acrylic acid-methacrylic acid copolymer, styrene-maleinimide copolymer, styrene-vinyltoluene copolymer, vinyl acetate-vinyl chloride copolymer and ethylene-vinyl acetate copolymer). Silane coupling agents can also be used as the polymers. As the polymers used for the alignment film, water-soluble polymers are suitable.

Of those polymers, poly(N-methylolacrylamide), carboxymethyl cellulose, gelatin, polyvinyl alcohol and modified polyvinyl alcohol are preferred over the others, gelatin, polyvinyl alcohol and modified polyvinyl alcohol are far preferred, and polyvinyl alcohol and modified polyvinyl alcohol in particular are favored.

The saponification degree of polyvinyl alcohol and that of modified polyvinyl alcohol are preferably from 70% to 100%, far preferably from 80% to 100%, further preferably from 85% to 95%. The polymerization degree of polyvinyl alcohol and that of modified polyvinyl alcohol are preferably from 100 to 3,000.

In modification of polyvinyl alcohol, modifying groups may be introduced by any of copolymerization modification, chain transfer modification and block polymerization modification. Examples of a modifying group introduced by copolymerization include —COONa, —Si(OX)$_3$ (wherein X is a hydrogen atom or an alkyl group), —N(CH$_3$)$_3$.Cl, —C$_9$H$_{19}$, —COO, —SO$_3$Na and —C$_{12}$H$_{25}$. Examples of a modifying group introduced by chain transfer include —COONa, —SH and —C$_{12}$H$_{25}$. Examples of a modifying group introduced by block polymerization include —COOH, —CONH$_2$, —COOR (wherein R is an alkyl group) and —C$_6$H$_5$. In addition, alkylthio groups are also suitable modifying groups.

Descriptions of modified polyvinyl alcohol can be found in JP-A-8-338913.

When a hydrophilic polymer like polyvinyl alcohol is used in the alignment film, it is appropriate to control the percentage of moisture content from the viewpoint of film hardness. The percentage of moisture content is preferably from 0.4% to 2.5%, far preferably from 0.6% to 1.6%. The percentage of moisture content can be measured with a commercially available moisture-percentage measuring device utilizing the Karl Fischer technique.

It is preferable that the alignment film has a thickness of 10 µm or below.

(Production of Optical Compensation Film)

The optical compensation film is generally produced in the form of a roll. It is preferable to produce the rolled optical compensation film by continuously performing the following processes (1) to (4):

(1) a process that rubbing treatment with a rubbing roller is given to the surface of a long length of transparent substrate traveling in the length direction or the surface of an alignment film formed on the transparent substrate, (2) a process that a coating solution containing a liquid crystalline compound is applied to the surface having undergone the rubbing treatment, (3) a process that molecules of the liquid crystalline compound are made to align by heating at a temperature not lower than the transition temperature of the liquid crystalline compound simultaneously with or subsequently to the drying of the coating solution applied, and the aligned state is fixed to form an optically anisotropic layer, and (4) a process that a long length of the layer product having the thus formed optically anisotropic layer is wound into a roll.

In the process (3), it is preferable that the film-surface velocity of a wind blowing in the liquid crystalline compound surface from directions other than the direction of the rubbing treatment while the liquid crystalline molecules are made to align at a temperature not lower than the transition temperature thereof satisfies the following mathematical expression:

$$0 < V < 5.0 \times 10^{-3} \times \eta$$

wherein V is the film-surface velocity (m/sec) of a wind blowing in the liquid crystalline compound surface and η is the viscosity (cp) of the optically anisotropic layer at the alignment temperature of the liquid crystalline compounds.

The most suitable range of V is from 0 to $2.5 \times 10^{-3} \times \eta$.

By undergoing the processes (1) to (4), it becomes possible to achieve continuous and consistent production of an optical compensation film in which the average direction of the orthogonal projection of symmetry axes of liquid crystalline compound molecules on the transparent substrate (the average direction of molecular symmetry axes in the optically anisotropic layer) is different from the in-plane, slow axis of the transparent support (the length direction of the transparent substrate), and besides, in which the angle between the average direction of molecular symmetry axes and the rubbing direction is from −2° to +2°, preferably from −1° to +1°, substantially 0. In other words, the production method including the processes (1) to (4) is suitable for mass production.

When the optical compensation film is applied in an OCB-mode liquid crystal display, it is appropriate that the angle which the average direction of molecular symmetry axes forms with the in-plane slow axis of the transparent substrate (the length direction of the transparent substrate) be substantially 45°.

As the liquid crystalline compound in the process (2), a polymerizable liquid crystalline compound having a crosslinkable functional groups is used. In the process (3), the polymerizable liquid crystalline compound is cured by polymerization as the coating layer is continuously exposed to light, resulting in fixation of the aligned state. Successively thereto, the process (4) can be carried out.

In the process (1), the rubbing treatment with a rubbing roller can be carried out as dust is removed from the surface of the transparent substrate or the alignment film.

Prior to the process (2), dust may be removed from the rubbing-treated surface of the transparent substrate or alignment film.

Prior to the process (4), an examination process for examining the optically anisotropic layer formed in the process (3) by continuously measuring its optical properties may be performed.

Detailed descriptions of the processes (1) to (4) each can be found in JP-A-9-73081.

From the viewpoints of handling suitability and cloth life, the diameter of a rubbing roller used in the process (1) is preferably from 100 mm to 500 mm, far preferably from 200 mm to 400 mm. The width of the rubbing roller is required to be wider than the width of the traveling film, and it is preferably the film width$\times 2^{1/2}$ or above. The number of revolutions of the rubbing roller is preferably controlled to a low value from the viewpoint of preventing dust from rising. Depending on the orienting property of the liquid crystalline compound, the revs is preferably from 100 rpm to 1,000 rpm, far preferably from 250 rpm to 850 rpm.

For retaining the orienting property of a liquid crystalline compound even when the revs of the rubbing roller is set at a low value, it is appropriate that the transparent substrate or the alignment film be heated under rubbing. The heating temperature as measured at the surface of the transparent substrate or alignment film, is preferably from (the glass transition temperature of the material $-50°$ C.) to (the glass transition temperature of the material$+50°$ C.). In the case of using an alignment film made from polyvinyl alcohol, it is preferable to control the ambient humidity under rubbing. The relative humidity at $25°$ C. is preferably from 25% to 70%, far preferably from 30% to 60%, especially preferably from 35% to 55%.

From the viewpoints of productivity and orienting property of the liquid crystal, the feeding speed of the transparent substrate is preferably from 10 m/min to 100 m/min, far preferably from 15 m/min to 80 m/min. For the feeding, various devices hitherto used for feeding of films can be utilized. The way of feeding has no particular restrictions.

The alignment film can be formed by a coating solution prepared by dissolving a material, such as polyvinyl alcohol, in water or an organic solvent being applied to a transparent substrate and then dried. The formation of alignment film can be carried out prior to the series of processes. Alternatively, the alignment film may be formed continuously on the surface of a long length of transparent substrate under feeding.

In the process (2), the coating solution containing a liquid crystalline compound is applied to the rubbing-treated surface. The solvent of the coating solution is preferably an organic solvent. Examples of such an organic solvent include amides (such as N,N-dimethylformamide), sulfoxides (such as dimethyl sulfoxide), heterocyclic compounds (such as pyridine), hydrocarbons (such as benzene and toluene), alkyl halides (such as chloroform, dichloromethane and tetrachloroethane), esters (such as methyl acetate and butyl acetate), ketones (such as acetone and methyl ethyl ketone) and ethers (such as tetrahydrofuran and 1,2-dimethoxyethane). Of these solvents, alkyl halides and ketones are preferred over the others. Two or more of the organic solvents may be used in combination.

For formation of a highly uniform optically anisotropic layer, it is appropriate that the surface tension of the coating solution be from 25 mN/m or below, preferably 22 mN/m or below.

For achievement of a low surface tension, it is suitable to add a surfactant to the coating solution for the optically anisotropic layer. The surfactant is preferably a fluorine-containing surfactant, far preferably a surfactant of fluorine-containing polymer type, especially preferably a surfactant including a polymer having fluoroaliphatic groups. The fluorine-containing polymer may be a copolymer constituted of fluorine-containing repeating units and other repeating units (e.g., those derived from polyoxyalkylene (meth)acrylates).

The mass average molecular weight of the fluorine-containing polymer is preferably from 3,000 to 100,000, far preferably 6,000 to 80,000. The amount of the fluorine-containing polymer added is preferably from 0.005% to 8% by mass, far preferably from 0.01% to 1% by mass, especially preferably from 0.05% to 0.5% by mass, based on the coating composition containing the liquid crystalline compound as a main component (coating components other than the solvent).

The application of the coating solution to the rubbing-treated surface can be carried out using any of known methods (such as a wire bar coating method, an extrusion coating method, a direct gravure coating method, a reverse gravure coating method and a die coating method). The amount of the coating solution applied can be determined appropriately on the basis of the thickness of the optically anisotropic layer.

In the process (3), the liquid crystalline compound molecules are made to align at a temperature not lower than the transition temperature thereof simultaneously with or subsequently to the drying of the coating solution applied, and the aligned state is fixed to result in formation of an optically anisotropic layer. By the heating during or after the drying, the liquid crystalline compound becomes oriented in the intended direction. It is possible to determine the drying temperature with consideration given to the boiling point of a solvent used in the coating solution and materials used for the transparent substrate and the alignment film. The orientation temperature can be determined on a basis of the liquid crystal phase-solid phase transition temperature of the liquid crystalline compound used. When the liquid crystalline compound used is a discotic liquid crystalline compound, the orientation temperature is preferably chosen from the range of $70°$ C. to $300°$ C., far preferably from the range of $70°$ C. to $170°$ C.

The viscosity in a liquid crystalline state is preferably from 10 cp to 10,000 cp, far preferably from 100 cp to 1,000 cp. When the viscosity is too low, the liquid crystalline molecules are susceptible to the wind blowing at the time of alignment, so very precise velocity/direction control of the wind is required for continuous production. On the other hand, when the viscosity is high, liquid crystalline molecules become less sensitive to the wind, but alignment thereof becomes slow and a considerable drop in productivity is caused.

The viscosity of the liquid crystal layer can be controlled by the molecular structure given to the liquid crystalline compound. It is also possible to adjust the viscosity by using additives (cellulose polymers in particular) for use in the optically anisotropic layer and a gelling agent in appropriate amounts.

The heating can be performed by blasts of an air warmed at a predetermined temperature or passage through a heating room kept at a predetermined temperature.

The optically anisotropic layer is formed by fixing the aligned liquid crystalline compound molecules while keeping the aligned state. Fixation of the liquid crystalline compound molecules can be performed by cooling down to the solid phase transition temperature, or by polymerization reaction. The fixation by polymerization reaction is preferable. The polymerization reaction includes thermal polymerization reaction using a thermal polymerization initiator and photo-polymerization reaction using a photopolymerization initiator. The photopolymerization reaction is preferable.

Examples of a photopolymerization initiator usable herein include the α-carbonyl compounds (disclosed in U.S. Pat. Nos. 2,367,661 and 2,367,670), the acyloin ethers (disclosed in U.S. Pat. No. 2,448,828), the α-hydrocarbon-substituted aromatic acyloin compounds (disclosed in U.S. Pat. No. 2,722,512), the polynuclear quinone compounds (disclosed in U.S. Pat. Nos. 3,046,127 and 2,951,758), the combinations of triarylimidazole dimers and p-aminophenyl ketones (disclosed in U.S. Pat. No. 3,549,367), the acridine and phenazine compounds (disclosed in JP-A-60-105667 and U.S. Pat. No. 4,239,850) and the oxadiazole compounds (disclosed in U.S. Pat. No. 4,212,970).

The amount of a photopolymerization initiator used is preferably from 0.01% to 20% by mass, far preferably from 0.5% to 5% by mass, of the solids content in the coating solution.

In light irradiation for promoting polymerization of liquid crystalline compound molecules and thereby fixing their aligned state, it is preferable to use ultraviolet rays. The irradiation energy is preferably from 20 mJ/cm$^2$ to 50 J/cm$^2$, far preferably from 20 mJ/cm$^2$ to 5,000 mJ/cm$^2$, especially preferably from 100 mJ/cm$^2$ to 800 mJ/cm$^2$. For speeding up the photopolymerization reaction, the light irradiation may be carried out under heating. The light irradiation can be carried out under a situation that the transparent substrate coated with a coating solution for an optically anisotropic layer is made to pass along the traveling course above or under which, or at the left or light of which a light source is placed.

Before progression to the process (4), it is also possible to provide a protective layer on the optically anisotropic layer formed in the process (3). For instance, a protective film made in advance may be stacked continuously on the surface of the optically anisotropic layer made in a long length.

In the process (4), a long length of the layered product provided with the optically anisotropic layer is wound into a roll. For instance, the continuously transported substrate having the optically anisotropic layer may be wound around a cylindrical core.

The optical compensation film obtained in the process (4) has the form of a roll, so the handling thereof is easy even when the film is made in large quantity. In addition, the film obtained can be stored and transported as its form is retained.

(Polarizing Plate)

The polarizing plate generally has a polarizer and two transparent protective films arranged on both sides of the polarizer. As at least one of the protective films, the present optical compensation film can be used. As the other protective film, a currently used cellulose acetate film may be used. Examples of the polarizer include an iodine polarizer, a dye polarizer using a dichroic dye, and a polyene polarizer. The iodine polarizer and the dye polarizer are generally produced using polyvinyl alcohol films. When the present optical compensation film is used as protective film of the polarizing plate, the polarizing plate has no particular restrictions as to its production method, but it can be produced using general methods. For instance, there is a method in which the optical compensation film obtained is treated with an alkali and stacked on either side of a polarizer, which is made by immersing a polyvinyl alcohol film in an iodide solution and then stretching the resultant film, with the aid of an aqueous solution of completely saponified polyvinyl alcohol. In place of the alkali treatment, the optical compensation film may undergo the processing for easy adhesion as disclosed in JP-A-6-94915 or JP-A-6-118232. Examples of an adhesive used for laminating a polarizer on the processed surface of the protective film include adhesives of polyvinyl alcohol type, such as a polyvinyl alcohol adhesive or polyvinyl butyral adhesive, and vinyl latex, such as butyl acrylate. The polarizing plate is made up of a polarizer and protective films for protection of the both sides of the polarizer, and further has a protect film on one side and a separate film on the other side in a stacked state. The protect film and the separate film are stacked for the purpose of protecting the polarizing plate at shipment time and product inspection time. Herein, the protect film is stacked for the purpose of protecting the surface of the polarizing plate, so it is arranged opposite to the side on which the polarizing plate is bonded to a liquid crystal plate. On the other hand, the separate film is used for the purpose of covering the adhesive layer for bonding to a liquid crystal plate, and so it is arranged on the side where the polarizing plate is bonded to the liquid crystal plate.

As to the way to stack the present optical compensation film on the polarizer, it is preferable to bond them together so that the transmission axis of the polarizer accords with the slow axis of the cellulose acylate film according to the invention. As a result of making evaluation of the thus made polarizing plate under the condition of a crossed Nicol arrangement, it has been found that the polarization degree of the polarizing plate in a crossed Nicol arrangement was lowered and light leakage occurred when the accuracy with which the slow axis of the cellulose acylate film and the absorption axis (the axis orthogonal to the transmission axis) of the polarizer crossed each other at right angles was greater than 1°. Under such a condition, the combination of the polarizing plate and a liquid crystal cell cannot deliver a satisfactory black level and contrast. Therefore, the disparity between the direction of the principal refractive index Nx of the present cellulose acylate film and the direction of the transmission axis of the polarizing plate is preferably within 1°, far preferably within 0.5°.

It is preferable that the polarizing plate according to the invention has at least one optical property selected from a single transmittance TT, a parallel transmittance PT, a cross transmittance CT or a polarization degree P satisfying the following expression (a), (b), (c) or (d), respectively, when measured under conditions of 25° C. and 60% RH:

$$40.0 \leq TT \leq 45.0 \quad (a)$$

$$30.0 \leq PT \leq 40.0 \quad (b)$$

$$CT \leq 2.0 \quad (c)$$

$$95.0 \leq P \quad (d)$$

In the foregoing ranges (a) to (c), $40.5 \leq TT \leq 45.0$, $32 \leq PT \leq 39.5$ and $CT \leq 1.5$ are preferable by far, respectively, and the preferred in particular are $41.0 \leq TT \leq 44.5$, $34 \leq T \leq 39.0$ and $CT \leq 1.3$, respectively. The polarization degree P is preferably 95.0% or above, far preferably 96.0% or above, and further preferably 97.0% or above.

When the cross transmittance measured at a wavelength λ nm is denoted as $CT_{(\lambda)}$, it is preferable that the polarizing plate according to the invention has at least one of $CT_{(380)}$, $CT_{(410)}$ and $CT_{(700)}$ satisfying the following expressions (e) to (g), respectively:

$$CT_{(380)} \leqq 2.0 \qquad (e)$$

$$CT_{(410)} \leqq 1.0 \qquad (f)$$

$$CT_{(700)} \leqq 0.5 \qquad (g)$$

In the foregoing ranges, $CT_{(380)} \leqq 1.95$, $CT_{(410)} \leqq 0.9$ and $CT_{(700)} \leqq 0.5$ are preferable by far, respectively, and $CT_{(380)} \leqq 1.90$, $CT_{(410)} \leqq 0.8$ and $CT_{(700)} \leqq 0.48$ in particular are favored, respectively.

It is appropriate for the polarizing plate according to the invention to have at least either an amount of change in a cross transmittance ΔCT or an amount of change in a polarization degree ΔP satisfying the following expression (j) or (k), respectively, when the polarizing plate is allowed to stand for 500 hours under conditions of 60° C. and 95% RH:

$$-6.0 \leqq \Delta CT \leqq 6.0 \qquad (j)$$

$$-10.0 \leqq \Delta P \leqq 0.0 \qquad (k)$$

(wherein the amount of change is defined as a value obtained by subtracting a measurement value before testing from a measurement value after testing).

In the foregoing ranges (j) and (k), $-5.8 \leqq \Delta CT \leqq 5.8$ and $-9.5 \leqq \Delta P \leqq 0.0$ are preferable, respectively, and $-5.6 \leqq \Delta CT \leqq 5.6$ and $-9.0 \leqq \Delta P \leqq 0.0$ are preferable by far, respectively.

When the polarizing plate is allowed to stand for 500 hours under conditions of 60° C. and 90% RH, it is appropriate for the polarizing plate according to the invention to have at least either an amount of change in a cross transmittance ΔCT or an amount of change in a polarization degree ΔP satisfying the following expression (h) or (i), respectively:

$$-3.0 \leqq \Delta CT \leqq 3.0 \qquad (h)$$

$$-5.0 \leqq \Delta P \leqq 0.0 \qquad (i)$$

When the polarizing plate is allowed to stand for 500 hours under 80° C., it is appropriate for the polarizing plate according to the invention to have at least either an amount of change in a cross transmittance ΔCT or an amount of change in a polarization degree ΔP satisfying the following expression (l) or (m), respectively:

$$-3.0 < \Delta CT \leqq 3.0 \qquad (l)$$

$$-2.0 \leqq \Delta P \leqq 0.0 \qquad (m)$$

The value used as each of these single transmittance TT, parallel transmittance PT and cross transmittance CT of the polarizing plate is a value obtained by performing measurements over 10 times within the wavelength region of 380 nm to 780 nm by means of a spectrophotometer UV3100PC (made by Shimadzu Corporation) and averaging out the measurement values (in the range of 400 nm to 700 nm). The polarization degree P can be determined by the following relation:

Polarization degree (%)=100×[(parallel transmittance−cross transmittance)/(parallel transmittance+cross transmittance)]$^{1/2}$.

The polarizing plate durability test is performed on two samples in different forms, (1) a polarizing plate alone and (2) a polarizing plate stacked on glass via an adhesive. In the measurement made on the polarizing plate alone, two samples are each prepared by combining the cellulose acylate film according to the invention with two polarizers in the orthogonal state or the same state so that the film is sandwiched between the polarizers. In the case of the glass-stacked polarizing plate, two samples measuring about 5 cm×5 cm in size are prepared by laminating the polarizing plate on glass so that the present cellulose acylate film is situated on the glass side. The single transmittance measurements are made on such samples in a state that they face a light source on the film side. The mean of measured values of the two samples is taken as the single transmittance.

(Moisture-proof Bag)

The term "moisture-proof bag" as used in the invention is specified by the moisture permeation degree determined on the basis of a cup method (JIS-Z208). It is preferable to use a material having a moisture permeation degree of 30 g/(m² day) or below as measured under a 40° C.-90% RH condition. When the moisture permeation degree is increased beyond 30 g/(m² day), it becomes impossible to avoid the influence of ambient humidity outside the bag. The moisture permeation degree of a bag used is far preferably 10 g/(m² day) or below, particularly preferably 5 g/(m² day) or below.

The material of a moisture-proof bag has no other particular restrictions so far as it satisfies the foregoing requirement for moisture permeation degree, but they may be any of known materials (See *Hoso Zairyo Binran* (Handbook on Packaging Materials), Japan Packaging Institute (1995); *Hoso Zairyo no Kiso Tishiki* (Basic Knowledge of Packaging Materials), Japan Packaging Institute (November 2001); and Kinosei Hoso Nyumon (Introduction to Functional Packaging), 21 Seiki Hoso Kenkyu Kyokai (1st Ed., Feb. 28, 2002)). In the invention, it is preferable to use a material low in moisture permeation degree, light in weight and easy to handle, so a composite material, such as a film prepared by evaporating silica, alumina or a ceramic material onto a plastic film, or a plastic film stacked with an aluminum foil, can be used to particular advantage. The thickness of a packaging material is not particularly limited so far as the humidity inside the bag is not influenced by ambient humidity, but it is preferably from several μm to several hundred μm, far preferably from 10 μm to 500 μm. It is preferable that the humidity inside a moisture-proof bag used in the invention satisfies either of the following requirements.

The humidity inside the bag in a polarizing plate-packed state is from 43% RH to 70% RH, preferably from 45% RH to 65% RH, far preferably from 45% RH to 63% RH, at 25° C.

A difference between the humidity inside the bag in a polarizing plate-packed state and ambient humidity at the time of lamination of the polarizing plate on a liquid crystal panel is within the range of 15% RH or below.

(Antireflective Layer)

It is preferable that the transparent protective film disposed on one side of the polarizing plate, where a liquid crystal cell is not placed, is provided with functional films, such as an antireflective layer. In the invention, it is especially preferable that the transparent protective film is provided with an antireflective layer having at least a light-scattering layer and a lower refractive-index layer which are stacked in this order or an antireflective layer having an intermediate refractive-index layer, a higher refractive-index layer and a lower refractive-index layer which are stacked in this order. Suitable examples of these antireflective layers are described below.

Suitable examples of an antireflective layer having a light-scattering layer and a lower refractive-index layer, which are provided on the transparent protective film, are mentioned below.

In a light-scattering layer relating to the invention, matting particles are dispersed. The refractive index of a material forming the matting particles-free region of light-scattering layer is preferably 1.50 to 2.00, and the refractive index of a lower refractive-index layer is preferably from 1.35 to 1.49. In the invention, the light-scattering layer combines anti-glaring properties with hard coat properties, and it may be a single layer or constituted of a plurality of layers, e.g., two to four layers.

From the viewpoint of achieving sufficient anti-glaring properties and a visually uniform matte feeling, it is preferable to design the antireflective layer so as to have the following surface asperity profile. More specifically, the center-line average roughness Ra is from 0.08 to 0.40 µm, the ten-point average roughness Rz is at most 10 times as great as Ra, the average mountain-valley distance Sm is from 1 to 100 µm; the standard deviation of the convexity heights-from the deepest point of asperity is 0.5 µm or below, the standard deviation of average mountain-valley distance Sm based on the center line is 20 µm or below and the proportion of faces having a slope angle of 0 to 5 degrees is 10% or above.

In addition, the color hue of reflected light is favorably made neutral by adjusting the chromaticity of reflected light under a C light source to such ranges that a* value is from −2 to 2 and b* value is from −3 to 3, and beside, by adjusting the ratio between the minimum reflectivity and the maximum reflectivity in the wavelength range of 380 nm to 780 nm to a range of 0.5 to 0.99. Further, a yellow tinge in white-display sate when the antireflective layer is used in a liquid crystal display is favorably reduced by adjusting the b* value of a transmitted light under a C light source to the range of 0 to 3.

Moreover, when the standard deviation of brightness distribution is 20 or below when the brightness distribution is measured on the present antireflective film under a condition that 120 µm×40 µm mesh is inserted between a planar light source and the film, the application of the present film to a high-definition panel can favorably reduce glare.

With respect to the optical characteristics of the antireflective layer relating to the invention, when the specular reflectivity is adjusted to 2.5% or below, the transmittance to 99% or above and the 60-degree glossiness to 70% or below, reflection of extraneous light is favorably controlled and the viewability can be enhanced. It is particularly preferable that the specular reflectivity is adjusted to 1% or below, especially to 0.5% or below. Furthermore, it is favorable from the viewpoint of achieving glare prevention and reduction in blurred letters on a high-definition LCD panel that the haze is adjusted to a range of 20% to 50%, the inside haze/total haze ratio to a range of 0.3 to 1, the drop in the haze value by further forming a lower refractive-index layer on a light-scattering layer provided on the antireflective layer to 15% or below, the transmission image definition in the comb width of 0.5 mm to a range of 20% to 50% and the transmittance ratio of light transmitted vertically to the antireflective layer surface to light transmitted in the direction slanting at an angle of 2 degrees from the vertical direction to a range of 1.5 to 5.0.

(Lower Refractive-index Layer)

The lower refractive-index layer of the antireflective layer for use in the invention has a refractive index of 1.20 to 1.49, preferably 1.30 to 1.44. Further, it is advantageous from the viewpoint of reducing the reflectivity that the lower refractive-index layer satisfies the following mathematical expression (XI).

$$(m/4) \times 0.7 < n1 d1 < (m/4) \times 1.3 \quad \text{(XI)}$$

In the above expression, m is a positive odd number, n1 is the refractive index of the lower refractive-index layer and d1 is the thickness (nm) of the lower refractive-index layer. In addition, λ is a wavelength and it is a value ranging from 500 to 550 nm.

Materials forming the lower refractive-index layer for use in the invention are described below.

The lower refractive-index layer for use in the invention contains a fluorine-containing polymer as lower refractive-index binder. Fluorine-containing polymers used suitably as the binder are those which have their kinetic friction coefficients in the range of 0.03 to 0.20, their contact angles to water in the range of 90° to 120° and their purified-water sliding angles in the range of 70° or below and can form cross-links when heat or ionizing radiation is applied. When the antireflective film according to the invention is inserted into an image display unit, it is favorable that the strength to peel a commercially available adhesive tape off the lower refractive-index layer is adjusted to as small a value as possible, preferably 500 gf or below, far preferably 300 gf or below, particularly preferably 100 gf or below. By doing so, a sticker and a memo affixed to the layer are easy to peel away. Furthermore, the higher the surface hardness measured with a microhardness meter, the less scratch-prone the lower refractive-index layer. So the surface hardness is preferably 0.3 GPa or above, and far preferably 0.5 GPa or above.

Examples of a fluorine-containing polymer usable in the lower refractive-index layer include hydrolysis products and dehydration condensation products of silane compounds containing perfluoroalkyl groups (e.g., heptadecafluoro-1,1,2,2-tetrahydrodecyl)triethoxysilane), and fluorine-containing copolymers having as constituents fluorine-containing monomer units and constitutional units for imparting cross-linking reactivity.

Examples of a fluorine-containing monomer include fluoroolefins (such as fluoroethylene, vinylidene fluoride, tetrafluoroethylene, perfluorooctylethylene, hexafluoropropylene and perfluoro-2,2-dimethyl-1,3-dioxol), partially or completely fluorinated alkyl ester derivatives of (meth)acrylic acid (such as Biscoat 6FM, trade name, a product of Osaka Organic Chemical Industry Ltd., and M-2020, trade name, a product of Daikin Industries, Ltd.) and completely or partially fluorinated vinyl ethers. Of these monomers, perfluoroolefins are preferred over the others, and hexafluoropropylene in particular can be used to advantage from the viewpoints of refractive index, solubility, transparency and availability.

Examples of a constitutional unit for imparting cross-linking reactivity include constitutional units obtained by polymerization of monomers having in advance self-cross-linking functional groups in their individual molecules, such as glycidyl (meth)acrylate and glycidyl vinyl ether, constitutional units obtained by polymerization of monomers having carboxyl, hydroxyl, amino or sulfo groups (e.g., (meth)acrylic acid, methylol (meth)acrylate, hydroxylalkyl (meth)acrylate, allyl acrylate, hydroxyethyl vinyl ether, hydroxybutyl vinyl ether, maleic acid, crotonic acid), and constitutional units obtained by introducing groups capable of causing cross-linking reaction, such as (meth)acryloyl group, into the constitutional units as recited above by macromolecular reaction (wherein such groups can be introduced by use of, e.g., a technique of reacting acrylic acid chloride with hydroxyl group).

In addition to the foregoing fluorine-containing monomer units and the constitutional units for imparting cross-linking reactivity, it is also possible to copolymerize monomers having no fluorine atoms in view of transparency of the coating. The monomer units usable in combination with the foregoing constitutional units have no particular restrictions, but examples thereof can include olefins (such as ethylene, propylene, isoprene, vinyl chloride and vinylidene chloride), acrylic acid esters (such as methyl acrylate, ethyl acrylate and 2-ethylhexyl acrylate), methacrylic acid esters (such as methyl methacrylate, ethyl methacrylate, butyl methacrylate and ethylene glycol dimethacrylate), styrene derivatives (such as styrene, divinylbenzene, vinyltoluene and α-methylstyrene), vinyl ethers (such as methyl vinyl ether, ethyl vinyl ether and cyclohexyl vinyl ether), vinyl esters (such as vinyl acetate, vinyl propionate and vinyl succinate), acrylamides (such as N-tert-butylacrylamide and N-cyclohexylacrylamide), methacrylamides, and acrylonitrile derivatives.

In combination with the polymers recited above, curing agents may be used as appropriate, as disclosed in JP-A-10-25388 and JP-A-10-147739.

(Light-scattering Layer)

A light-scattering layer is formed for the purposes of giving the film light diffusibility by surface scattering and/or internal scattering and hard coating properties for enhancement of scratch resistance. Accordingly, the light-scattering layer formed contains a binder for imparting hard coating properties, matting particles for imparting light diffusibility and, if needed, inorganic fillers for an increase in refractive index, prevention of shrinkage by cross-linking and enhancement of strength.

The thickness of the light-scattering layer is preferably from 1 to 10 μm, far preferably from 1.2 to 6 μm, from the viewpoints of imparting hard coating properties to the layer and preventing the layer from curling and becoming brittle.

The binder in the scattering layer is preferably a polymer having as its main chain a saturated hydrocarbon chain or a polyether chain, far preferably a polymer having as its main chain a saturated hydrocarbon chain. Further, it is advantageous that the binder polymer has a cross-linking structure. The binder polymer having a saturated hydrocarbon chain as its main chain is preferably a polymer prepared from an ethylenic unsaturated monomer. As a binder polymer having a saturated hydrocarbon chain as its main chain and a cross-linked structure, a (co)polymer prepared from a monomer having two or more ethylenic unsaturated groups is suitable. For making the binder polymer have a higher refractive-index, it is possible to choose a monomer having in its molecular structure an aromatic ring, a halogen atom other than a fluorine atom, and at least one atom selected from a sulfur atom, a phosphorus atom or a nitrogen atom, too.

Examples of a monomer having at least two ethylenic unsaturated groups include polyhydric alcohol esters of (meth)acrylic acid [such as ethylene glycol di(meth)acrylate, butanediol di(meth)acrylate, hexanediol di(meth)acrylate, 1,4-cyclohexane diacrylate, pentaerythritol tetra(meth)acrylate], pentaerythritol tri(meth)acrylate, trimethylolpropane tri(meth)acrylate, trimethylolethane tri(meth)acrylate, dipentaerythritol tetra(meth)acrylate, dipentaerythrithol penta(meth)acrylate, dipentaerythritol hexa(meth)acrylate, pentaerythritol hexa(meth)acrylate, 1,2,3-cyclohexanetetramethacrylate, polyurethane polyacrylate and polyester polyacrylate], ethylene oxide modification products of the esters as recited above, vinylbenzene and derivatives thereof [such as 1,4-divinylbenzene, 2-acryloylethyl 4-vinylbenzoate, and 1,4-divinylcyclohexanone], vinyl sulfones (such as divinyl sulfone), acrylamides (such as methylenebisacrylamide) and methacrylamides. These monomers may be used as combinations of two or more thereof.

Examples of a high reflective-index monomer include bis (4-methacryloylthiophenyl) sulfide, vinylnaphthalene, vinyl phenyl sulfide, and 4-methacryloxyphenyl-4'-methoxyphenylthioether. These monomers also may be used as combinations of two or more thereof.

These monomers having ethylenic unsaturated groups can be polymerized by irradiation with ionizing radiation or heating in the presence of a photo-radical initiator or a thermo-radical initiator.

Accordingly, the antireflective film can be formed by preparing a coating solution containing a monomer having an ethylenic unsaturated group as recited above, a photo-radical initiator or a thermo-radical initiatoer, matting particles and an inorganic filler, coating the solution on a transparent support, and then curing the solution through polymerization reaction caused by ionizing radiation or heat. As these photo-radical and thermo-radical initiators, known initiators can be used.

Polymers having polyether chains in their respective main chains are preferably polymers obtained by ring opening polymerization of multifunctional epoxy compounds. The ring opening polymerization of multifunctional epoxy compounds can be performed by irradiation with ionizing radiation or heating in the presence of a photo-acid generator or a thermo-acid generator.

Accordingly, it is also possible to form the antireflective film by preparing a coating solution containing a multifunctional epoxy compound, a photo-acid generator or a thermo-acid generator, matting particles and an inorganic filler, coating the solution on a transparent support, and then curing the composition through polymerization reaction caused by ionizing radiation or heat.

A cross-linked structure may be introduced into a binder polymer by using a monomer having a cross-linkable functional group in place of or in addition to a monomer having two or more ethylenic unsaturated groups to introduce cross-linkable functional groups into the binder polymer, and further by allowing these cross-linkable functional groups to undergo reaction.

Examples of such a cross-linkable functional group include an isocyanate group, an epoxy group, an aziridine group, an oxazoline group, an aldehyde group, a carbonyl group, a hydrazino group, a carboxyl group, a methylol group and an active methylene group. And vinylsulfonic acid, acid anhydrides, cyanoacrylate derivatives, melamine, etherified methylol, ester and urethane, and further metal alkoxides also, such as tetramethoxysilane, can be utilized as monomers for introduction of cross-linked structures. Further, functional groups showing cross-linkability as a result of decomposition reaction, such as blocked isocyanate groups, may be used. In other words, cross-linkable functional groups used in the invention needn't cause reaction immediately but may be those showing reactivity as a result of decomposition.

Binder polymers having those cross-linkable functional groups can form cross-linked structures by heating after they are coated.

For the purpose of imparting antiglare properties, matting particles, such as particles of an inorganic compound or particles of a resin, having an average particle diameter greater than that of filler particles, which ranges preferably from 1 to 10 μm, far preferably from 1.5 to 7.0 μm, are incorporated in the light-scattering layer.

Suitable examples of such matting particles include particles of an inorganic compound, such as silica particles and $TiO_2$ particles; and resin particles, such as acrylic resin particles, cross-linked acrylic resin particles, polystyrene particles, cross-linked polystyrene particles, melamine resin particles and benzoguanamine resin particles. Of these particles, cross-linked polystyrene particles, cross-linked acrylic resin particles, cross-linked acrylic styrene resin particles and silica particles are preferred over the others.

As to the shape of the matting particles, a spherical shape and an indefinite shape are both usable.

Two or more types of matting particles different in particle diameter may be used together. It is possible to impart an antiglare property by use of matting particles greater in particle diameter and other optical properties by use of matting particles smaller in particle diameter.

As to the particle diameter distribution of the matting particles, a monodisperse distribution is best. The closer their particle sizes are to one another, the more suitable the particles are for use. When the particles whose diameters are greater by 20% or more than the average particle diameter are defined as coarse particles, it is appropriate that the proportion of the coarse particles to the all particles used is 1% or below by number, preferably 0.1% or below by number, far preferably 0.01% or below by number. The matting particles having such a narrow particle diameter distribution can generally be obtained by size classification after synthesis reaction. The more desirable distribution can be achieved by increasing the number of times the classification is carried out, or by making the degree of classification stricter.

The matting particles are incorporated in a light-scattering layer so that the amount of matting particles in the light-scattering layer formed is preferably from 10 to 1,000 mg/m$^2$, far preferably from 100 to 700 mg/m$^2$.

The size distribution of matting particles is measured according to the Coulter Counter method, and the distribution measured is converted to the number distribution of particles.

In addition to the matting particles, it is favorable for further heightening the refractive index of the light-scatting layer to incorporate in the layer an inorganic filler including at least one metal oxide chosen from oxides of titanium, zirconium, aluminum, indium, zinc, tin and antimony and having an average particle diameter of 0.2 μm or below, preferably 0.1 μm or below, far preferably 0.06 μm or below.

Contrary to the above, it is preferable in the light-scattering layer using matting particles of higher refractive-index that silicon oxide is used for the purpose of widening a difference in refractive index from the matting particles and keeping the refractive index of the layer rather low. The suitable particle size range of silicon oxide is the same as that of the foregoing inorganic filler.

Examples of the inorganic filler usable in the light-scattering layer include $TiO_2$, $ZrO_2$, $Al_2O_3$, $In_2O_3$, ZnO, $SnO_2$, $Sb_2O_3$, ITO and $SiO_2$. Of these fillers, $TiO_2$ and $ZrO_2$ are preferred over the others from the viewpoint of heightening the refractive index. It is also preferable that the surfaces of these inorganic fillers are treated with a silane coupling agent or a titanate coupling agent, and it is advantageous to use a surface treatment agent giving a functional group capable of reacting with the binder to the filler surface.

The usage of such inorganic fillers is preferably from 10 to 90%, far preferably from 20 to 80%, particularly preferably from 30 to 75%, of the total mass of the light-scattering layer.

Since the particle sizes of those inorganic fillers are sufficiently smaller than the wavelengths of light, no scattering is caused, so the dispersion of those inorganic fillers in the binder polymer can behave like an optically uniform material.

The bulk refractive index of a mixture of the binder and the inorganic filler in the light-scattering layer is preferably from 1.48 to 2.00, far preferably from 1.50 to 1.80. For adjusting the refractive index to such a range, it is adequate that the kinds of the optically transparent resin and the inorganic filler and the mixing proportions thereof are chosen properly. How to make a proper choice can be experimentally found in advance.

In order to secure uniformity in surface condition for the light-scattering layer, especially by eliminating unevenness of coating, unevenness of drying and point defects, either of fluorine- and silicon-containing surfactants or a mixture of these surfactants is incorporated into a coating solution for forming an anti-glaring layer. A fluorine-containing surfactant in particular is used to advantage because even addition in a smaller amount can produce effects of lessening troubles on the surface of an antireflective film according to the invention, such as unevenness of coating, unevenness of drying and point defects. These surfactants are added with the intention of increasing productivity by imparting high-speed coating suitability to the coating solution while enhancing uniformity in surface condition.

Next an antireflective layer formed by laminating an intermediate refractive-index layer, a higher refractive-index layer and a lower refractive-index layer on a transparent protective film in order of mention is described.

The antireflective layer has a layer structure including, in the order presented, at least an intermediate refractive-index layer, a higher refractive-index layer and a lower refractive-index layer (outermost layer) in a state of lamination on a base, and is designed to satisfy the following refractive index relationship among constituent layers.

More specifically, the refractive index relationship is:

Refractive index of higher refractive-index layer>refractive index of intermediate refractive-index layer>refractive index of transparent support>refractive index of lower refractive-index layer.

In addition, a hard coating layer may be placed between the transparent support and the intermediate refractive-index layer. Alternatively, the antireflective layer may include an intermediate refractive-index hard coating layer, a higher refractive-index layer and a lower refractive-index layer (as disclosed, e.g., in JP-A-8-122504, JP-A-8-110401, JP-A-10-300902, JP-A-2002-243906 and JP-A-2000-111706). Further, another function may be imparted to each constituent layer. For instance, soil resistance may be imparted to a lower refractive-index layer, or an antistatic function may be imparted to a higher refractive-index layer (as disclosed, e.g., in JP-A-10-206603 and JP-A-2002-243906).

The suitable strength of the film is H or higher, preferably 2H or higher, particularly preferably 3H or higher, when evaluated by the pencil hardness test according to JIS K5400.

(Higher Refractive-index Layer and Intermediate Refractive-index Layer)

The layer having a higher refractive-index, which is a constituent layer of the antireflective film, is formed of a curable film containing at least a matrix binder and superfine particles of inorganic compound having an average particle size of 100 nm or below and a higher refractive-index.

In particulate inorganic compounds having high refractive indices, inorganic compounds having refractive indices of 1.65 or higher, preferably 1.9 or higher, are included. Examples of such compounds include oxides of Ti, Zn, Sb, Sn, Zr, Ce, Ta, La and In, and compound oxides which each contain two or more of the metal atoms recited above.

Such superfine particles can be obtained by treating particle surfaces with a surface treatment agent (such as the silane coupling agents disclosed in JP-A-11-295503, JP-A-11-153703 and JP-A-2000-9908, the anionic compounds or the organometallic coupling agents as disclosed in JP-A-

2001-310432), giving particles a core/shell structure whose core is a particle having a higher refractive-index (as disclosed in JP-A-2001-166104 and JP-A-2001-31043), or using a specific dispersing agent (as disclosed in JP-A-11-153703, U.S. Pat. No. 6,210,858 and JP-A-2002-2776069).

Examples of a material forming the matrix include films of thermoplastic resins and thermosetting resins hitherto known.

Further, at least one composition selected from compositions containing multifunctional compounds which individually contain at least two radical polymerizable and/or cation polymerizable groups or compositions containing organometallic compounds having hydrolyzable groups and partial condensates thereof is suitable as the matrix-forming material. Examples of such a composition include the compositions disclosed in JP-A-2000-47004, JP-A-2001-315242, JP-A-2001-31871 and JP-A-2001-296401.

In addition, curable films formed from colloidal metal oxides obtained from metal alkoxide hydrolysis condensates and metal alkoxide compositions are also used to advantage. Descriptions thereof can be found, e.g., in JP-A-2001-293818.

The higher refractive-index layer generally has its refractive index in a range of 1.70 to 2.20. The thickness of the higher refractive-index layer is preferably from 5 nm to 10 µm, far preferably from 10 nm to 1 µm.

The refractive index of the intermediate refractive-index layer is adjusted so as to lie somewhere between the refractive index of the lower refractive-index layer and that of the higher refractive-index layer. The suitable refractive index of the intermediate refractive-index layer is from 1.50 to 1.70. The suitable thickness of the intermediate refractive-index layer is from 5 nm to 10 µm, preferably from 10 nm to 1 µm.

(Lower Refractive-index Layer)

The lower refractive-index layer is stacked on the higher refractive-index layer. The refractive index of the lower refractive-index layer is generally from 1.2 to 1.55, preferably from 1.30 to 1.50.

It is appropriate that the lower refractive-index layer be structured as the outermost layer having scratch resistance and soil resistance. For substantial enhancement of scratch resistance, it is effective to impart slippability to the layer surface, and thin-film layer techniques hitherto known, which include introduction of silicone or fluorine, can be adopted.

For the foregoing purpose, it is appropriate that the fluorine-containing compound used have its refractive index in a range of 1.35 to 1.50, preferably 1.36 to 1.47. Further, the fluorine-containing compound used is preferably a compound having a cross-linkable or polymerizable functional group containing fluorine atoms in a proportion of 35 to 80% by mass.

Examples of such a fluorine-containing compound include the compounds disclosed in JP-A-9-222503, paragraph numbers [0018] to [0026]; JP-A-11-38202, paragraph numbers [0019] to [0030]; JP-A-2001-40284, paragraph numbers [0027] to [0028]; and JP-A-2000-284102.

The silicone compound usable for the foregoing purpose is a compound having a siloxane structure, the macromolecular chain of which preferably has curable functional groups or polymerizable functional groups to form a cross-linked structure in a film formed. Examples of such a compound include reactive silicones (e.g., Silaplaine, produced by Chisso Corporation) and polysiloxanes containing silanol groups at their respective both ends (as disclosed in JP-A-11-25840).

The cross-linking or polymerizing reaction of cross-linkable or polymerizing group-containing fluoropolymer and/or siloxane polymer is favorably carried out by light exposure or heating simultaneously with or subsequently to the coating operation of a coating solution for forming the outermost layer containing a polymerization initiator and a sensitizer.

Alternatively, it is also preferable to form a cured film by sol-gel conversion, wherein curing is performed by causing condensation reaction between an organometallic compound, such as a silane coupling agent, and a specific silane coupling agent containing a fluorohydrocarbon group in the presence of a catalyst.

Examples of such a specific silane coupling agent include polyfluoroalkyl-containing silane compounds or partial hydrolysis condensates thereof (such as the compounds disclosed in JP-A-58-142958, JP-A-58-147483, JP-A-58-147484, JP-A-9-157582 and JP-A-11-106704) and silyl compounds containing poly(perfluoroalkyl ether) groups as fluorine-containing long-chain groups (such as the compounds disclosed in JP-A-2000-117902, JP-A-2001-48590 and JP-A-2002-53804).

As additives other than the above, the low regractive-index layer can contain a filler (e.g., silicon dioxide (silica), an inorganic compound having a lower refractive-index and an average primary-grain size of 1 to 150 mm, such as fluorine-containing grains (magnesium fluoride, calcium fluoride or barium fluoride grains), the organic fine particles disclosed in JP-A-11-3820, paragraph numbers [0020] to [0038]), a silane coupling agent, a slipping agent and a surfactant.

When the lower refractive-index layer is situated underneath the outermost layer, it may be formed by use of a vapor-phase method (such as a sputtering method, an ion plating method or a plasma CVD method). In point of low-priced production, coating methods are preferable.

The thickness of the lower refractive-index layer is preferably from 30 to 200 nm, far preferably from 50 to 150 nm, especially preferably from 60 to 120 nm.

(Layer Other than Antireflective Layer)

Furthermore, a hard coating layer, a forward scattering layer, a primer layer, an antistatic layer, an undercoat layer and a protective layer may be provided.

(Hard Coating Layer)

The hard coating layer is provided on the surface of the transparent support in order to impart physical strength to a transparent protective film included in the antireflective layer. And it is especially preferable that the hard coating layer is provided between the transparent support and the higher refractive-index layer. The hard coating layer is preferably formed by cross-linking reaction or polymerizing reaction of a light- and/or heat-curable compound. The suitable functional groups having curability are photopolymerizable functional groups, and the suitable organometallic compounds containing hydrolyzable functional groups are organic alkoxysilyl compounds.

Examples of such compounds include the same ones as recited in the descriptions of the higher refractive-index layer. Examples of a composition constituting the hard coating layer include those disclosed in JP-A-2002-144913, JP-A-2000-9908 and WO 00/46617 brochure.

The higher refractive-index layer can serve as a hard coating layer. In this case, it is preferable that the hard coating layer is formed so as to contain particulates in a finely dispersed state by use of the technique covered in the description of the higher refractive-index layer.

The hard coating layer can serve as an anti-glare layer also when an anti-glare function is imparted thereto by addition of particles having an average size of 0.2 to 10 µm.

The hard coating layer can be designed to have a proper thickness according to the intended purpose. The suitable thickness of the hard coating layer is from 0.2 to 10 μm, preferably from 0.5 to 7 μm.

The suitable strength of the hard coating layer is H or higher, preferably 2H or higher, particularly preferably 3H or higher, when evaluated by the pencil hardness test according to JIS K5400. In addition, the hard coating layer is more useful the smaller is the amount of abrasion that a sample piece thereof suffers by Taber test according to JIS K5400.

(Antistatic Layer)

When an antistatic layer is provided, it is preferable to give the antistatic layer an electric conductivity expressed in a volume resistivity of $10^{-8}$ ($\Omega cm^{-3}$) or below. The use of a hygroscopic substance, a water-soluble inorganic salt, some type of surfactant, a cationic polymer, an anionic polymer or colloidal silica makes it possible to impart the volume resistivity of $10^{-8}$ ($\Omega cm^{-3}$), but the volume resistivity imparted varies greatly depending on ambient temperature and humidity. In low-humidity surroundings, there occurs a problem that sufficient electric conductivity cannot be secured. Accordingly, metal oxides are suitable as materials for the conductive layer. However, colored metal oxides are unsuitable, because the film to which they are added is colored throughout. Examples of a metal producing colorless metal oxide include Zn, Ti, Sn, Al, In, Si, Mg, Ba, Mo, W and V, and it is preferable to use metal oxides containing these metals as their respective main components. Suitable examples of a colorless metal oxide include ZnO, $TiO_2$, $SnO_2$, $Al_2O_3$, $In_2O_3$, $SiO_2$, MgO, BaO, $MoO_3$, $WO_3$, $V_2O_5$, and compound oxides thereof. Of these oxides, ZnO, $TiO_2$ and $SnO_2$ are used to particular advantage. In the case of adding atoms of different kinds to these oxides, addition of Al and In to ZnO, addition of Sb, Nb and halogen elements to $SnO_2$ and addition of Nb and Ta to $TiO_2$ are effective. Further, as disclosed in JP-B-59-6235, materials prepared by depositing the metal oxides as recited above on crystalline metal grains or fibrous materials (e.g., titanium oxide) may be used. Although volume resistance and surface resistance are different physical characteristic values and a simple comparison cannot be drawn between them, it is adequate for securing the conductivity expressed in a volume resistance of $10^{-8}$ ($\Omega cm^{-3}$) or below that the conductive layer has a surface resistance of about $10^{-10}$ ($\Omega/\square$) or below, preferably $10^{-8}$ ($\Omega/\square$). The surface resistance of the conductive layer is required to be determined as the value in the case of arranging the antistatic layer as the outermost layer, and can be measured at a stage during the process of forming the stacked film described in the invention.

(Liquid Crystal Display)

The present cellulose acylate film, the optical compensation film formed of the present film and the polarizing plate using the present film can be used in various display-mode liquid crystal cells and liquid crystal displays. Various display modes, including TN (Twisted Nematic), IPS (In-Plane Switching), FLC (Ferroelectric Liquid crystal), AFLC (Antiferroelectric Liquid crystal), OCB (Optically Compensatory Bend), STN (Super Twisted Nematic), VA (Vertically Aligned) and HAN (Hybrid Aligned Nematic) modes, have been proposed. Of these modes, the OCB mode or the TN mode can be preferably used.

An OCB-mode liquid crystal cell is a liquid crystal display using a liquid crystal cell of bend alignment mode in which rod-shaped liquid crystalline molecules in the upper part of the liquid crystal cell and those in the lower part are forced to align in substantially opposite directions (symmetrically). Cells of such an OCB mode are disclosed in U.S. Pat. Nos. 4,583,825 and 5,410,422. Since the rod-shape liquid crystal molecules are symmetrically aligned in the upper part and the lower part of the liquid crystal cell, the bend orientation mode of liquid crystal cell has an optically self-compensation function. Therefore, this liquid crystal mode is referred to as an OCB (Optically Compensatory Bend) liquid crystal mode. The liquid crystal display of the bend orientation mode has an advantage of high response speed.

EXAMPLES

The invention will now be illustrated in the concrete by reference to the following examples, but these examples should not be construed as limiting the scope of the invention.

(Measurement Methods)

Various properties of cellulose acylate film were determined by measurements made in accordance with the methods described below.

(Retardation)

The retardation value Re(λ) was measured with KOBRA 21ADH (made by Oji Scientific Instruments) wherein light with a wavelength of λ nm is made to strike upon a film in the direction of the normal to the film surface. In addition, the retardation value Rth(λ) was calculated using as its basis three retardation values measured in three different directions, namely the retardation value Re(λ), a retardation value measured under conditions that the in-plane slow axis is taken as an axis of tilt (rotation axis) and light with a wavelength of λnm is made to strike from a direction tilting to +40° with respect to the direction of the normal to the film and a retardation value measured under conditions that the in-plane slow axis is taken as an axis of tilt and light with a wavelength of λnm is made to strike from a direction tilting to −40° with respect to the direction of the normal to the film, and inputting the value 1.48 assumed as the average refractive index and the film thickness. Additionally, the wavelength at which the Re and Rth measurements were made was 550 nm unless otherwise indicated.

(Moisture Content Rate)

The moisture content in a sample measuring 7 mm by 35 mm was determined by use of a moisture meter according to the Karl Fischer method and a sample dryer (CA-03 and VA-05, respectively, made by Mitsubishi Chemical Corporation ). And the moisture content rate was calculated by dividing the moisture content (g) by the mass of the sample (g).

(Thermal Shrinkage Rate)

Samples measuring 30 mm by 120 mm were allowed to sand for 24 hours and 120 hours, respectively, under conditions of 90° C. and 5% RH, and holes of 6 mm φ were punched at intervals of 100 mm along the both edges of each sample by use of an automatic pin gauge (made by Shinto Scientific Co., Ltd.). The actual size (L1) of each interval was read down to the least division of the scale, 1/1000 mm. Each sample was further allowed to stand for 24 hours under a 60° C.-95% RH condition or a 90° C.-5% RH condition, and allowed to stand again for 2 hours under conditions of 25° C. and 60% RH, and then the dimension (L2) of each punched interval was measured. And thermal shrinkage rate was determined by the expression $\{(L1-L2)/L1\} \times 100$.

(Glass Transition Temperature Tg)

A film sample (undergoing no stretching treatment) measuring 5 mm by 30 mm underwent moisture control for at least 2 hours in the 25° C.-60% RH atmosphere, and then examined for Tg using a dynamic viscoelasticity measuring equipment (Vibron DVA-225, made by I.T. Keisoku Seigyo K.K.) at settings that the intergrip distance was 20 mm, the speed of rising in temperature was 2° C./min, the temperature range of measurement was from 30° C. to 200° C. and the frequency was 1 Hz. When the storage elasticity modulus was plotted as ordinate with a logarithmic scale and the temperature (° C.) as abscissa with a linear scale, sharp reductions in storage elasticity modulus were found at the occasion of transfer from the solid region to the glass transition region. A straight line 1 was drawn along the sharp reduction in the solid region and a straight line 2 along the sharp reduction in the glass transition region. The intercept of the straight line 1 and the straight line 2 was taken as a glass transition temperature Tg (dynamic viscoelasticity) because it corresponded to a temperature at which the film sample began softening by sudden decrease in the storage elasticity modulus under rise in temperature and the transfer to the glass transition region started.

(Photoelasticity Coefficient)

Tensile stress was applied to the major axis of a film sample measuring 10 mm by 100 mm, and the retardation value Re wider this tensile stress was measured with an ellipsometer (M150, made by JASCO Corporation). The photoelasticity coefficient was calculated from the amount of the change in retardation in relation to the stress applied.

(Haze)

Haze measurement of a sample measuring 40 nm by 80 mm was made with a haze meter (HGM-2DP, made by Suga Test Instruments Co., Ltd.) at 25° C. and 60% RH in accordance with JIS K6714.

(Method of Measuring Water Permeability)

To the measurement of water permeability (water vapor permeability) can be applied the methods of measuring vapor permeation (including the weight method, the thermometer method, the vapor pressure method and the adsorbed quantity method) as described in *Kobunshi no Bussei II* (volume 4 of *Kobunshi Jikken Koza*, published by Kyoritsu Shuppan Co., Ltd.), pp. 285-294. In Examples of this specification, measurements were carried out at the temperature of 40° C. under the humidity of 90% RH in accordance with Condition B of the Japanese Industrial Standards JISZ0208:

Example 1

Formation of Cellulose Acylate Film (1) Cellulose Acylate

Cellulose acylates having different degrees of acyl substitution as shown in Table 1 were prepared. More specifically, acylation reaction was carried out at 40° C. by addition of sulfuric acid as a catalyst (in an amount of 7.8 parts by mass per 100 parts by mass of cellulose) besides carboxylic acids. Thereafter, the total degree of substitution and the degree of 6-position substitution were adjusted by controlling the quantity of sulfuric acid catalyst, the water content and the ripening time. The ripening was performed at 40° C. Further, low molecular components of the cellulose acylates thus prepared were removed by washing with acetone.

(2) Dope Preparation

Each of the cellulose acylates shown in Table 1, a plasticizer (a 2:1 mixture of triphenyl phosphate and biphenyl-diphenyl phosphate) and a retardation developer having the structure illustrated below were charged into a mixed solvent (a 87/13 by mass mixture of dichloromethane and methanol) in amounts to adjust a solids concentration of 19 mass %, and heated with stirring to prepare a solution. Simultaneously therewith, fine particles [silicon dioxide (primary particle size: 20 mm, Mohs hardness: about 7)], an ultraviolet Absorbent B (TINUVIN327, a product of Ciba Specialty Chemicals) and an ultraviolet Absorbent C (TINUVIN328, a product of Ciba Specialty Chemicals) were charged into the solution in amounts of 0.05 parts by mass, 0.375 parts by mass and 0.75 parts by mass, respectively, per 100 parts by mass of cellulose acylate and heated with stirring. The proportion of the retardation developer added to each cellulose acylate is expressed in parts by mass when the amount of the cellulose acylate is taken as 100 parts by mass, and the numeric value thereof is shown in Table 2. From the thus prepared dopes, films F1 to F5 were formed in the process described below.

Retardation Developer

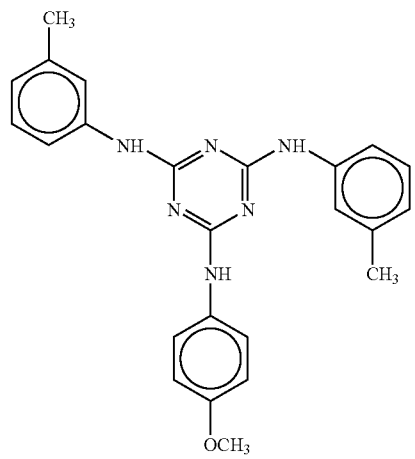

(Flow Casting)

Each of the dopes was flow-cast into film by use of a band-type casting machine. Each film was stripped away from the band when the content of the residual solvent reached a range of 25 to 35 mass %, and stretched in the direction of the width at a stretch ratio ranging from 15% to 23% (as shown in Table 2) by means of a tenter, thereby forming a cellulose acylate film. In the tenter, each film was stretched in the direction of the width as it was dried by exposure to hot air, and then made to shrink by about 5%. Thereafter, the tenter conveyance was changed to roll conveyance, and each film was further dried, subjected to knurling, and reeled up. As the stretch factor of each film, the value calculated from the film width measured at the entrance of the tenter and the film width measured at the exit of the tenter is shown in Table 2.

The thus formed cellulose acylate films (optical compensation films) were each measured for Re and Rth retardation values at a wavelength of 550 nm under a 25° C.-60% RH condition. In addition, two specimens of each film were subjected to at least 2 hours of humidity conditioning under conditions of 25° C.-10% RH and 25° C.-80% RH, respectively, and then each specimen was sealed up by being sandwiched between two sheets of glass via silicone and measured for retardation values. The amounts of the changes in retardation values of each cellulose acylate film by the humidity change from 80% RH to 10% RH (Re (10% RH)-Re(80% RH) and Rth(10% RH)-Rth(80% RH)) are symbolized as ΔRe and ΔRth and shown in Table 2.

TABLE 1

|  | Raw Cotton No. | Acetyl Substitution Degree | Propionyl Substitution Degree | 6-Position Substitution Degree | Ratio of 6-position Substitution Degree to Total substitution Degree |
|---|---|---|---|---|---|
| Example | CA1 | 2.849 | 0.000 | 0.934 | 0.328 |
| Example | CA2 | 2.847 | 0.000 | 0.947 | 0.333 |
| Example | CA3 | 2.785 | 0.000 | 0.910 | 0.327 |
| Example | CA4 | 2.753 | 0.000 | 0.903 | 0.328 |
| Example | CA5 | 2.745 | 0.000 | 0.882 | 0.321 |
| Example | CA6 | 1.952 | 0.808 | 0.897 | 0.325 |
| Compar. Example | CA7 | 2.751 | 0.000 | 0.844 | 0.307 |

The term "total substitution degree" refers to the sum of the acyl substitution degrees on the 2-, 3- and 6-positions. And the total substitution degree is equal to the value obtained by adding the acetyl substitution degree to the propionyl substitution degree.

TABLE 2

| Film | Raw Cotton | Developer | Stretch Ratio (%) | Tenter Temp. (° C.) | Dry Thickness (μm) | Re (nm) | Rth (nm) | ΔRe | ΔRth | Water Content (%) | Water Permeability (g/m² 24 hrs) | Tg (° C.) |
|---|---|---|---|---|---|---|---|---|---|---|---|---|
| F1 | CA2 | | 7.8 | 18 | 135 | 75 | 40 | 205 | 10 | 29 | 2.94 | 854 | 143 |
| F2 | CA3 | | 4.5 | 22 | 135 | 108 | 45 | 200 | 8 | 28 | 2.96 | 1022 | 142 |
| F3 | CA3 | | 6.9 | 19 | 135 | 80 | 38 | 175 | 5 | 22 | 2.94 | 1190 | 142 |
| F4 | CA3 | | 5.3 | 17 | 135 | 92 | 38 | 175 | 5 | 23 | 2.95 | 1037 | 142 |
| F5 | CA7 | | 4 | 15 | 135 | 92 | 40 | 180 | 9 | 40 | 3.2 | 1136 | 142 |
Further, the films formed were each measured for the glass transition temperature (Tg), the water content after the humidity conditioning under the 25° C.-80% RH condition and the moisture transmission rate (water permeability) for 24 hours under the 60° C.-95% RH condition, and the measurement results obtained are shown in Table 2. In addition, it was found that all the films had their haze values in the range of 0.1 to 0.9, the average diameter of secondary particles of the matting agent used therein was 1.0 μm or below, their tensile elasticity moduli was 4 GPa or above, and their mass changes by 48-hour standing under the 80° C.-90% RH condition were from 0% to 3%. Moreover, the dimensional changes by 24-hour standing under the 60° C.-95% RH condition and those by 24-hour standing under the 90° C.-5% RH condition were all in the range of 0% to 4.5%. And every sample film had a photoelasticity coefficient of $50 \times 10^{-13}$ dyne/cm² ($5 \times 10^{-13}$ N/m²) or below.

On the side where it had been in contact with the band surface, each of the cellulose acylate films (F1 to F5) was coated with 10 cc/m² of a 1.0N potassium hydroxide solution (solvent: water/isopropyl alcohol/propylene glycol=69.2 parts by mass/15.0 parts by mass/15.8 parts by mass), and kept at about 40° C. for 30 seconds. Then, the alkaline solution was scraped off, and the resulting film was washed with purified water, and the drops of water remaining thereon were removed with an air knife. Thereafter, each of the thus treated films was dried at 100° C. for 15 seconds.

When the alkali-treated surface of each of the resulting films was measured for a contact angle with respect to purified water, the contact angle was found to be 42°.

(Formation of Alignment Film)

An alignment film coating solution having the following composition was applied to the alkali-treated surface of each of the cellulose acylate films (F1 to F5) at a coverage of 28 ml/m² by means of a #16 wire bar coater. The solution applied was dried with 60° C. hot air for 60 seconds, and further with 90° C. hot air for 150 seconds, thereby forming an alignment film.

Composition of Alignment Film Coating Solution:

| | |
|---|---|
| Modified polyvinyl alcohol illustrated below | 10 parts by mass |
| Water | 371 parts by mass |
| Methanol | 119 parts by mass |
| Glutaraldehyde (cross-linking agent) | 0.5 parts by mass |
| Citric acid ester (AS3, produced by Sankyo Chemical Co., Ltd.) | 0.35 parts by mass |

Modified polyvinyl alcohol

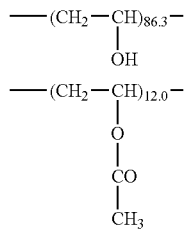

-continued

Composition of Alignment Film Coating Solution:

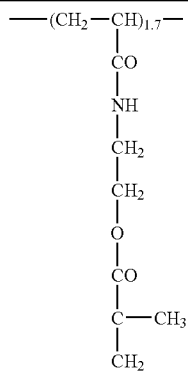

(Rubbing Treatment)

The transparent substrate on which the alignment film was formed was fed at a speed of 20 m/min, and rubbing treatment was given to the surface of the alignment film under conditions that a rubbing roll (measuring 300 mm in diameter) was adjusted to nib against the alignment film surface at an angle of 45° with respect to the direction of the length and the number of revolutions thereof was set at 650 rpm. The length of contact between the rubbing roll and the transparent substrate was adjusted to 18 mm.

(Optically Anisotropic Layer Formation I)

In 102 Kg of methyl ethyl ketone were dissolved 41.01 Kg of a discotic liquid crystalline compound illustrated below, 4.06 Kg of ethylene oxide-modified trimethylolpropane triacrylate (V#360, produced by Osaka Organic Chemical Industry Ltd.), 0.35 Kg of cellulose acetate butyrate (CAB531-1, produced by of Eastman Chemical Company), 1.35 Kg of a photopolymerization initiator (Irgacure 907, produced by Ciba-Geigy) and 0.45 Kg of a sensitizer (Kayacure DETX, produced by Nippon Kayaku Co., Ltd.). To this solution, 0.1 Kg of a copolymer having fluorinated aliphatic groups (Megafac F780, produced by Dainippon Ink and Chemicals, Incorporated) was added to prepare a coating solution. The coating solution thus prepared was applied continuously to the alignment film surface of each of the transparent substrates (F3 to F5) being transported at a speed of 20 m/min while turning a #3.2 wire bar 391 rpm in the same direction as the traveling direction of the film.

Discotic Liquid Crystalline Compound

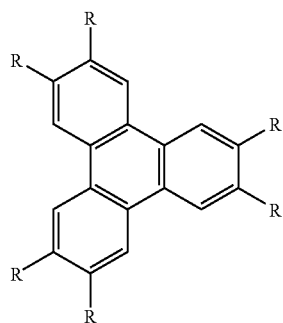

-continued

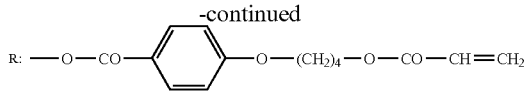

The coating solution applied was heated at temperatures raised continuously up to 100° C. from room temperature to evaporate the solvent, and then the discotic liquid crystalline compound was oriented by further heating for about 90 seconds in a 130° C. drying zone where the wind velocity at the film surface of the discotic optically-anisotropic layer was adjusted to 2.5 m/sec. Subsequently thereto, the film was transported into a 80° C. drying zone, and it was irradiated with ultraviolet rays at a illumination of 600 mW for 4 seconds by use of ultraviolet irradiation apparatus (ultraviolet lamp: output of 160 W/cm, light-emitting length of 1.6 m) while it had the surface temperature of about 100° C., resulting in progress of cross-linking reaction and thereby fixation of the orientation of the discotic liquid crystal compound. Thereafter, the film was cooled to room temperature, and wound around a cylindrical-shaped core to take a roll form. In this way, roll-form optical compensation films (KH-3 to KH-5) were made.

(Optically Anisotropic Layer Formation II)

The same coating solution as mention above was applied continuously to the alignment film surface of each of the transparent substrates (F1 and F2) being transported at a speed of 20 m/min while turning a #4.0 wire bar 391 rpm in the same direction as the traveling direction of the film.

The coating solution applied was heated at temperatures raised continuously up to 100° C. from room temperature to evaporate the solvent, and then the discotic liquid crystalline compound was oriented by further heating for about 90 seconds in a 130° C. drying zone where the wind velocity at the film surface of the discotic optically-anisotropic layer was adjusted to 2.5 in/sec. Subsequently thereto, the film was transported into a 80° C. drying zone. While it had the surface temperature of about 100° C., the film was irradiated with ultraviolet rays at a illumination of 600 mW for 4 seconds by use of ultraviolet irradiation apparatus (ultraviolet lamp: output of 160 W/cm, light-emitting length of 1.6 m) to result in progress of cross-linking reaction and thereby fixation of the orientation of the discotic liquid crystal compound. Thereafter, the film was cooled to room temperature, and wound around a cylindrical-shaped core to take a roll form. In the foregoing manner, roll-form optical compensation films (KH-1 and KH-2) were made.

When the optically anisotropic layer was measured for its viscosity at the film surface temperature of 127° C., the viscosity was found to be 695 cp. This viscosity value was a result obtained by measurement of a liquid crystal layer having the same composition (except for the solvent) as the optically anisotropic layer with a heating E-type viscometer.

A sample piece was cut from each of the thus made roll-form optical compensation films, and measured for optical properties. The Re retardation value of each optically anisotropic layer was found to be 38 nm as measured at the wavelength of 546 nm. Further, it was found that the angles (tilt angles) which the disc planes of discotic liquid crystalline compound molecules in the optically anisotropic layer formed with the substrate surface varied continuously in the direction of the layer's depth and the average thereof was 28°. In addition, when the optically anisotropic layer alone was peeled off each of the sample pieces and an average direction of the molecular symmetry axes in the optically anisotropic layer was determined, the average direction was found to be 45° with respect to the direction of the length of the optical compensation film.

(Making of Polarizing Plates)

Each of the optical compensation films (KH-1 to KH-5) was stacked on a polarizing film with the aid of an adhesive of polyvinyl alcohol type so that its transparent substrate lay on the polarizing film side. In addition, commercially available 80 μm-thick triacetyl cellulose film (TD-80U, made by Fuji Photo Film Co., Ltd.) was subjected to saponification treatment, and then stacked on the other side of the polarizing film with the aid of the adhesive of polyvinyl alcohol type.

In the lamination, the polarizing film, the transparent substrate and the commercially available triacetyl cellulose film were disposed so that their length directions were parallel to one another. In this way, polarizing plates having their respective optical compensation films were made.

On the other hand, each of the optical compensation films was stacked on one side of a polarizing film with the aid of the adhesive of polyvinyl alcohol type so that its transparent substrate was in contact with the polarizing film. Further, an antireflective film (Fuji Film CV Clear View UA, made by Fuji Photo Film Co., Ltd.) was given saponification treatment, and then stacked on the other side of the polarizing film with the aid of the adhesive of polyvinyl alcohol type.

In the lamination, the polarizing film, the transparent substrate and the commercially available antireflective film were disposed so that their length directions were parallel to one another. In this way, polarizing plates having their respective optical compensation films and the same antireflective films were made.

These pairs of polarizing plates were each combined with the cellulose acylate films made in Example inside, and measured for single transmittance TT, parallel transmittance PT and cross transmittance CT in the wavelength region of 380 nm to 780 nm under the 25° C.-60% RH condition by use of a spectrophotometer (UV3100PC). From these measurements, the average values thereof in the wavelength region of 400 to 700 nm and the polarization degree P were determined. As a result, TT was found to be from 40.8 to 44.7, PT from 34 to 38.8, CT 1.0 or below and P 99.98 to 99.99. In addition, cross transmittances at the wavelengths 380 nm, 410 nm and 700 nm, $CT_{(380)}$, $CT_{(410)}$ and $CT_{(700)}$, were 1.0 or below, 0.5 or below and 0.3 or below, respectively. Further, in the durability test by 500-hour standing under the 60° C.-95% RH condition, all the polarizing plates fell within the ranges $-0.1 \leq \Delta CT \leq 0.2$ and $-2.0 \leq \Delta P \leq 0$, while in theq durability test at 60° C. and 90% RH, they fell within the ranges $-0.05 \leq \Delta CT \leq 0.15$ and $-1.5 \leq \Delta P \leq 0$.

One part of each of the thus made polarizing plates A1 to A5 was stored in a moisture-proof bag as it was, and the other part underwent 2-hour moisture control at 25° C. and 60% RH and then stored in a moisture-proof bag. The moisture-proof bag was a package made of a lamination of polyethylene terephthalate, aluminum and polyethylene, and the moisture permeability thereof was 0.01 mg/m² or below (24 hours).

(Making of Bend-Alignment Liquid Crystal Cell)

A polyimide film as an alignment film was provided on a glass substrate equipped with ITO electrodes, and rubbing treatment was given to the alignment film. Two sheets of the glass substrate thus obtained were placed so that they faced each other and their rubbing directions became parallel, and a cell gap was adjusted to 4.5 μm. A liquid crystalline compound having An of 0.1396 (ZLI132, produced by Merck & Co., Inc.) was injected into the cell gap, thereby making a bend-alignment liquid crystal cell. The size of the liquid crystal cell was 20 inches. The rubbing treatment was made in the direction of 45° relative to the long sides of the liquid crystal cell.

(Making of Liquid Crystal Display)

The polarizing plate having each optical compensation film (alone) and the polarizing plate having not only the optical compensation film but also the antireflective film were stacked so that the bend-alignment cell made in the foregoing manner was sandwiched between them. Herein, the polarizing plate having both the optical compensation film and the antireflective film was disposed on the viewing side. Each polarizing plate was disposed so that the optically anisotropic layer thereof faced the cell substrate and the rubbing direction of the liquid crystal cell and that of the optically anisotropic layer facing the cell became anti-parallel.

(Evaluation of Liquid Crystal Display)

A 55-Hz rectangular-wave voltage was applied to each liquid crystal cell. The black-state display was set at 0V and the white-state display at 5V. The transmittance ratio (white-state display/black-state display ratio) was taken as a contrast ratio, and viewing angles were measured at 8 stages from the black-state display (L1) to the white-state display (L8) by means of a measuring instrument (EZ-Contrast 160D, made by ELDIM). In addition, the frontal contrast (CR: white-state display brightness/black-state display brightness ratio) was also determined.

Further, each liquid crystal display after 1-week storage under the 25° C.-80% RH condition and the 25° C.-10% RH condition, respectively, was examined for viewing angle characteristics, and each liquid crystal display after 3-day storage in 80° C. surroundings was examined for light leakage.

Results obtained are shown in Table 3.

TABLE 3

| Optical compensation film | Frontal CR | Viewing angle (CR > 10) | | Viewing angle characteristics | | Light leakage |
| --- | --- | --- | --- | --- | --- | --- |
| | | top/bottom | left/right | 25° C./80% | 25° C./10% | 80° C. |
| KH-1 (Invention) | 430 | 80°/80° | 80°/80° | nothing wrong | nothing wrong | nothing wrong |
| KH-2 (Comparative example) | 420 | 80°/80° | 80°/80° | nothing wrong | nothing wrong | light leakage from corners |
| KH-3 (Invention) | 520 | 80°/80° | 80°/80° | nothing wrong | nothing wrong | nothing wrong |
| KH-4 (Comparative example) | 480 | 80°/80° | 80°/80° | nothing wrong | nothing wrong | light leakage from corners |
| KH-5 (Comparative example) | 500 | 80°/80° | 80°/80° | lateral reversal | vertical reversal | light leakage from corners |

INDUSTRIAL CAPABILITY

The invention can be used in a liquid crystal display to reduce change of viewing angle characteristics of the liquid crystal display.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application Nos. JP2005-235804 filed Aug. 16, 2005, the contents of which are incorporated herein by reference.

The invention claimed is:

1. An optical compensation film comprising:
a cellulose acylate film having a thickness of 40 to 85 μm, the cellulose acylate film comprises cellulose having a glucose unit, wherein a hydroxyl group of the glucose unit is substituted with an acyl group having at least two carbon atoms, and the cellulose acylate film satisfies relations (I) and (II):

$$2.0 \leq DS2+DS3+DS6 \leq 3.0 \quad (I)$$

$$DS6/(DS2+DS3+DS6) \geq 0.315 \quad (II)$$

wherein DS2 stands for a substitution degree of the hydroxyl group at 2-position of the glucose unit with the acyl group, DS3 stands for a substitution degree of the hydroxyl group at 3-position of the glucose unit with the acyl group, and DS6 stands for a substitution degree of the hydroxyl group at 6-position of the glucose unit with the acyl group; and
an optically anisotropic layer comprising a liquid crystalline compound.

2. The optical compensation film according to claim 1, wherein the cellulose acylate film has an Re retardation value and an Rth retardation value satisfying relations (V) and (VI), respectively:

$$20 \text{ nm} \leq Re(550) \leq 50 \text{ nm} \quad (V)$$

$$160 \text{ nm} \leq Rth(550) \leq 250 \text{ nm} \quad (VI)$$

wherein $Re(\lambda)$ is an in-plane retardation value expressed in the unit nm at a wavelength of $\lambda$ nm, and $Rth(\lambda)$ is a thickness-direction retardation value expressed in the unit nm at a wavelength of $\lambda$ nm.

3. The optical compensation film according to claim 1, wherein the cellulose acylate film comprising a retardation developer, the retardation developer being at least one of a rod-shaped compound and a discotic compound.

4. The optical compensation film according to claim 1, wherein the cellulose acylate film has a ΔRe(Re10% RH-Re80% RH) of 12 nm or below and a ΔRth(Rth10% RH-Rth80% RH) of 32 nm or below, wherein the ΔRe(Re10% RH-Re 80% RH) represents a difference between Re(550) values of the cellulose acylate film under 25° C.-10% RH and 25° C.-80% RH, the ΔRth(Rth10% RH-Rth80% RH) represents a difference between Rth(550) values of the cellulose acylate film under 25° C.-10% RH and 25° C.-80% RH conditions, $Re(\lambda)$ is an in-plane retardation value expressed in the unit nm at a wavelength of $\lambda$ nm, and $Rth(\lambda)$ is a thickness-direction retardation value expressed in the unit nm at a wavelength of $\lambda$ nm.

5. The optical compensation film according to claim 1, wherein the liquid crystalline compound is a discotic liquid crystalline compound.

6. A polarizing plate comprising: a polarizer; and an optical compensation film according to claim 1.

7. A liquid crystal display comprising: a liquid crystal cell; and an optical compensation film according to claim 1.

8. The liquid crystal display according to claim 7, which is of an OCB mode.

* * * * *